United States Patent
Wu et al.

(10) Patent No.: US 11,834,353 B2
(45) Date of Patent: Dec. 5, 2023

(54) WATER TREATMENT SYSTEM

(71) Applicant: Access Business Group International LLC, Ada, MI (US)

(72) Inventors: Ziqi Wu, Grand Rapids, MI (US); Joshua B. Taylor, Rockford, MI (US); Daniel L Schlenk, Grand Rapids, MI (US); Jeffrey A. Shumate, Comstock Park, MI (US)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 17/744,972

(22) Filed: May 16, 2022

(65) Prior Publication Data
US 2022/0380230 A1 Dec. 1, 2022

Related U.S. Application Data

(63) Continuation of application No. 16/943,407, filed on Jul. 30, 2020, now Pat. No. 11,365,134.
(Continued)

(51) Int. Cl.
*C02F 1/32* (2023.01)
*C02F 1/00* (2023.01)

(52) U.S. Cl.
CPC .............. *C02F 1/325* (2013.01); *C02F 1/001* (2013.01); *C02F 2201/004* (2013.01);
(Continued)

(58) Field of Classification Search
CPC .. C02F 1/003; C02F 2307/02; C02F 2307/04; C02F 1/002; C02F 1/32; A45F 2003/163
See application file for complete search history.

(56) References Cited

U.S. PATENT DOCUMENTS

| | | | |
|---|---|---|---|
| 5,780,860 A | * | 7/1998 | Gadgil .................... C02F 1/325 250/435 |
| 6,221,260 B1 | | 4/2001 | Chahine et al. |

(Continued)

FOREIGN PATENT DOCUMENTS

| | | |
|---|---|---|
| CN | 204111492 U | 1/2015 |
| CN | 205698628 U | 11/2016 |

(Continued)

OTHER PUBLICATIONS

Invitation to Pay Additional Searching Fees, Partial International Search Report, and Provisional Written Opinion for International Application No. PCT/US2020/044132 dated Oct. 15, 2020.
(Continued)

*Primary Examiner* — Walter D. Griffin
*Assistant Examiner* — Cameron J Allen
(74) *Attorney, Agent, or Firm* — Warner Norcross + Judd LLP

(57) ABSTRACT

A UV reactor for disinfecting water. The UV reactor may include a cooling chamber in which heat from a UV source may be transferred to the water flowing through the UV reactor. The UV reactor may include driver circuitry operable to determine status information, such as health, of the UV source. The UV reactor may include a gas discharge path operable to substantially prevent accumulation of gas within a water treatment chamber.

20 Claims, 43 Drawing Sheets

Related U.S. Application Data

(60) Provisional application No. 62/880,688, filed on Jul. 31, 2019.

(52) U.S. Cl.
 CPC .............. C02F 2201/3222 (2013.01); C02F 2201/3228 (2013.01); C02F 2303/04 (2013.01)

(56) References Cited

U.S. PATENT DOCUMENTS

| | | |
|---|---|---|
| 6,454,952 B1 | 9/2002 | Thorpe |
| 6,657,205 B1 | 12/2003 | Wong |
| 6,753,186 B2 | 6/2004 | Moskoff |
| 6,773,584 B2 | 8/2004 | Saccomanno |
| 6,875,988 B1 | 4/2005 | Sauska et al. |
| 7,001,571 B2 | 2/2006 | Forney et al. |
| 7,166,230 B2 | 1/2007 | Nilsen et al. |
| 7,169,311 B2 | 1/2007 | Saccomanno |
| 7,217,938 B2 | 5/2007 | Hoffmeier |
| 7,507,370 B2 | 3/2009 | Forney et al. |
| 7,511,281 B2 | 3/2009 | Cooper |
| 7,520,978 B2 | 4/2009 | Harbers |
| 7,651,660 B2 | 1/2010 | Kaiser et al. |
| 7,691,343 B2 | 4/2010 | Ueberall |
| 7,695,675 B2 | 4/2010 | Kaiser et al. |
| 7,741,617 B2 | 6/2010 | Matthews et al. |
| 7,767,158 B2 | 8/2010 | Kawai et al. |
| 7,838,845 B2 | 11/2010 | Abe et al. |
| 7,857,972 B2 | 12/2010 | Foret |
| 7,862,728 B2 | 1/2011 | Yencho |
| 8,066,940 B2 | 11/2011 | Denkewicz, Jr. et al. |
| 8,080,165 B2 | 12/2011 | Forney |
| 8,110,100 B2 | 2/2012 | Foret |
| 8,246,839 B2 | 8/2012 | Ueberall |
| 8,329,037 B2 | 12/2012 | Carew |
| 8,398,928 B2 | 3/2013 | Bagwell et al. |
| 8,420,022 B2 | 4/2013 | Soler et al. |
| 8,421,032 B2 | 4/2013 | Dornseifer |
| 8,444,918 B2 | 5/2013 | Tanaka |
| 8,501,004 B2 | 8/2013 | Lee et al. |
| 8,587,185 B2 | 11/2013 | Negley et al. |
| 8,632,678 B2 | 1/2014 | Carew |
| 8,696,192 B2 | 4/2014 | Sprague |
| 8,714,811 B2 | 5/2014 | Sprague |
| 8,742,364 B2 | 6/2014 | Boodaghians et al. |
| 8,764,978 B2 | 7/2014 | Foret |
| 8,802,007 B2 | 8/2014 | Kaiga et al. |
| 8,816,298 B2 | 8/2014 | Tanaka |
| 8,816,300 B1 | 8/2014 | Walker et al. |
| 8,968,578 B1 | 3/2015 | Kamolvathin et al. |
| 8,970,125 B2 | 3/2015 | Inui et al. |
| 9,017,613 B2 | 4/2015 | Owen et al. |
| 9,131,667 B2 | 9/2015 | Carew |
| 9,168,321 B2 | 10/2015 | Oestergaard et al. |
| 9,233,857 B2 | 1/2016 | Nikamoto |
| 9,260,323 B2 | 2/2016 | Boodaghians et al. |
| 9,321,658 B2 | 4/2016 | Chen et al. |
| 9,376,333 B2 | 6/2016 | Boodaghians et al. |
| 9,381,458 B2 | 7/2016 | Blechschmidt et al. |
| 9,409,797 B2 | 8/2016 | Wipprich |
| 9,421,288 B2 | 8/2016 | Lowe |
| 9,422,171 B2 | 8/2016 | Kosak et al. |
| 9,446,371 B2 | 9/2016 | Foret |
| 9,475,708 B2 | 10/2016 | Rajagopalan et al. |
| 9,499,415 B2 | 11/2016 | Deguchi et al. |
| 9,511,344 B2 | 12/2016 | Cooper et al. |
| 9,533,896 B2 | 1/2017 | Lee et al. |
| 9,586,838 B2 | 3/2017 | Hansson et al. |
| 9,617,171 B2 | 4/2017 | Rajagopalan et al. |
| 9,624,115 B2 | 4/2017 | Leonard et al. |
| 9,649,401 B2 | 5/2017 | Nagao et al. |
| 9,695,062 B2 | 7/2017 | Rajagopalan et al. |
| 9,737,862 B2 | 8/2017 | Smith |
| 9,745,209 B2 | 8/2017 | Chen et al. |
| 9,808,544 B2 | 11/2017 | Cooper et al. |
| 9,834,456 B2 | 12/2017 | Collins et al. |
| 9,855,363 B2 | 1/2018 | Stokes et al. |
| 9,861,721 B2 | 1/2018 | Stokes et al. |
| 9,938,165 B2 | 4/2018 | Taghipour |
| 10,029,026 B2 | 7/2018 | Stokes et al. |
| 10,173,909 B2 | 1/2019 | Kim |
| 10,294,124 B2 | 5/2019 | Khan et al. |
| 10,368,557 B2 | 8/2019 | Foret |
| 10,377,644 B2 | 8/2019 | Kolch et al. |
| 10,408,478 B2 | 9/2019 | Staniforth et al. |
| 10,427,955 B2 | 10/2019 | Rimbault et al. |
| 10,472,260 B2 | 11/2019 | Mochizuki et al. |
| 10,519,051 B2 | 12/2019 | Fahs, II et al. |
| 10,570,029 B2 | 2/2020 | Arbeus et al. |
| 10,570,030 B2 | 2/2020 | Kolch et al. |
| 10,604,423 B2 | 3/2020 | McNulty |
| 10,640,397 B2 | 5/2020 | Taghipour |
| 10,662,079 B1 | 5/2020 | Wachtl |
| 10,669,167 B2 | 6/2020 | Ochi et al. |
| 10,675,124 B2 | 6/2020 | Burseth et al. |
| 10,676,375 B2 | 6/2020 | Lee et al. |
| 10,736,980 B2 | 8/2020 | Mochizuki et al. |
| 10,759,679 B2 | 9/2020 | Asano |
| 10,800,673 B2 | 10/2020 | Shiga et al. |
| 10,828,382 B2 | 11/2020 | Asano |
| 10,829,394 B2 | 11/2020 | Taghipour |
| 10,829,395 B2 | 11/2020 | Ochi et al. |
| 10,954,151 B1 | 3/2021 | McDonald |
| 10,961,131 B2 | 3/2021 | Henderson et al. |
| 10,961,132 B2 | 3/2021 | Dhiman et al. |
| 10,988,389 B1 | 4/2021 | Guduru |
| 11,000,605 B2 | 5/2021 | Cooper et al. |
| 11,072,543 B2 | 7/2021 | Benzerrouk |
| 2004/0046127 A1 | 3/2004 | Wong |
| 2005/0263444 A1 | 12/2005 | Baca et al. |
| 2010/0282661 A1 | 11/2010 | Fraser |
| 2011/0024646 A1 | 2/2011 | Abe et al. |
| 2011/0079551 A1* | 4/2011 | Olson ............... C02F 1/003 210/446 |
| 2012/0318749 A1 | 12/2012 | Stokes et al. |
| 2013/0319925 A1 | 12/2013 | Yee et al. |
| 2014/0263091 A1 | 9/2014 | Carter, III et al. |
| 2015/0034545 A1 | 2/2015 | Park et al. |
| 2015/0129777 A1 | 5/2015 | Nikamoto |
| 2015/0314024 A1 | 11/2015 | Khan et al. |
| 2016/0083272 A1 | 3/2016 | Rajagopalan et al. |
| 2016/0207795 A1 | 7/2016 | Tanada |
| 2016/0214873 A1 | 7/2016 | Abe et al. |
| 2016/0278424 A1 | 9/2016 | Liao et al. |
| 2016/0280562 A1 | 9/2016 | Liao et al. |
| 2016/0355412 A1 | 12/2016 | Collins et al. |
| 2017/0072078 A1 | 3/2017 | Lee et al. |
| 2017/0166457 A1 | 6/2017 | Rimbault et al. |
| 2017/0217791 A1 | 8/2017 | McNulty |
| 2017/0225971 A1 | 8/2017 | Henderson et al. |
| 2017/0296690 A1 | 10/2017 | Matsui et al. |
| 2017/0303555 A1 | 10/2017 | Livne et al. |
| 2017/0305762 A1 | 10/2017 | Kolch et al. |
| 2017/0320755 A1 | 11/2017 | Chen et al. |
| 2017/0355622 A1 | 12/2017 | Kim |
| 2018/0008741 A9 | 1/2018 | Stokes et al. |
| 2018/0011020 A9 | 1/2018 | Pagan et al. |
| 2018/0037485 A1 | 2/2018 | Foss et al. |
| 2018/0051447 A1 | 2/2018 | Hills et al. |
| 2018/0155215 A1 | 6/2018 | Torii |
| 2018/0177908 A1 | 6/2018 | Ochi et al. |
| 2018/0228928 A1 | 8/2018 | Ochi et al. |
| 2018/0244543 A1 | 8/2018 | Ochi et al. |
| 2018/0257952 A1 | 9/2018 | Wada et al. |
| 2018/0257953 A1 | 9/2018 | Mochizuki et al. |
| 2019/0030510 A1 | 1/2019 | Taghipour |
| 2019/0062180 A1 | 2/2019 | Taghipour |
| 2019/0184045 A1 | 6/2019 | Mochizuki et al. |
| 2019/0225509 A1 | 7/2019 | Dhiman et al. |
| 2019/0256378 A1 | 8/2019 | Shiga et al. |
| 2019/0263681 A1 | 8/2019 | Shiga et al. |
| 2020/0048111 A1 | 2/2020 | Roitel et al. |
| 2020/0055749 A1 | 2/2020 | Goeschel et al. |
| 2020/0121715 A1 | 4/2020 | Bishop et al. |

(56) References Cited

U.S. PATENT DOCUMENTS

| | | |
|---|---|---|
| 2020/0140291 A1 | 5/2020 | Babaie et al. |
| 2020/0206374 A1 | 7/2020 | Cordoba et al. |
| 2020/0230270 A1 | 7/2020 | Taghipour |
| 2020/0247689 A1 | 8/2020 | McNulty |
| 2020/0253689 A1 | 8/2020 | Burseth et al. |
| 2020/0255305 A1 | 8/2020 | Gerchman et al. |
| 2020/0283311 A1 | 9/2020 | Wong et al. |
| 2020/0300278 A1 | 9/2020 | Taghipour |
| 2020/0317538 A1 | 10/2020 | Taghipour |
| 2020/0330629 A1 | 10/2020 | Massey et al. |
| 2020/0399144 A1 | 12/2020 | Klink |
| 2021/0032086 A1 | 2/2021 | Zohar et al. |
| 2021/0032127 A1 | 2/2021 | Wu et al. |
| 2021/0122650 A1 | 4/2021 | Taghipour |
| 2021/0198137 A1 | 7/2021 | McDonald |
| 2021/0244833 A1 | 8/2021 | Cooper et al. |

FOREIGN PATENT DOCUMENTS

| | | |
|---|---|---|
| CN | 205856047 U | 1/2017 |
| CN | 206511954 U | 9/2017 |
| CN | 206654758 U | 11/2017 |
| CN | 107619086 U | 1/2018 |
| CN | 108178401 U | 6/2018 |
| CN | 208182660 U | 12/2018 |
| CN | 208429900 U | 1/2019 |
| DE | 102014015642 A1 | 4/2016 |
| EP | 2 160 770 | 3/2010 |
| EP | 2 379 193 | 6/2018 |
| EP | 2 678 277 | 8/2018 |
| EP | 3 183 493 | 10/2018 |
| JP | 2016-523594 | 8/2016 |
| JP | 2017-051290 | 3/2017 |
| JP | 2017-158829 | 9/2017 |
| JP | 2017-158900 | 9/2017 |
| JP | 2017-159251 | 9/2017 |
| JP | 2017-169810 | 9/2017 |
| JP | 2017-169945 | 9/2017 |
| JP | 2017-205700 | 11/2017 |
| JP | 2017-209293 | 11/2017 |
| JP | 2017-210256 | 11/2017 |
| JP | 2018-008213 | 1/2018 |
| JP | 2018-034020 | 3/2018 |
| JP | 2018-038946 | 3/2018 |
| JP | 2018-038956 | 3/2018 |
| JP | 2018-051423 | 4/2018 |
| JP | 2018-509287 | 4/2018 |
| JP | 2018-069144 | 5/2018 |
| JP | 2018-069224 | 5/2018 |
| JP | 2018-164873 | 10/2018 |
| JP | 2018-192451 | 12/2018 |
| JP | 2019-013876 | 1/2019 |
| JP | 2019-505350 | 2/2019 |
| KR | 10-0553225 | 2/2006 |
| KR | 10-0562948 | 3/2006 |
| KR | 10-0678333 | 2/2007 |
| KR | 10-0696847 | 3/2007 |
| KR | 10-0764332 | 10/2007 |
| KR | 10-0795275 | 1/2008 |
| KR | 10-0895201 | 4/2009 |
| KR | 10-1180420 | 9/2012 |
| KR | 10-1294965 | 8/2013 |
| KR | 10-2013-0107221 | 10/2013 |
| KR | 10-1324983 | 11/2013 |
| KR | 10-2014-0137903 | 12/2014 |
| KR | 10-2015-0049953 | 5/2015 |
| KR | 10-1617989 | 5/2016 |
| KR | 10-1648613 | 8/2016 |
| KR | 10-2016-0144586 | 12/2016 |
| KR | 10-2017-0028472 | 3/2017 |
| KR | 10-2017-0037777 | 4/2017 |
| KR | 10-2017-0038878 | 4/2017 |
| KR | 10-2018-0058751 | 6/2018 |
| KR | 10-2018-0059859 | 6/2018 |
| KR | 10-2018-0081571 | 7/2018 |
| KR | 10-2018-0084653 | 7/2018 |
| KR | 10-1887621 | 9/2018 |
| KR | 10-2018-0115978 | 10/2018 |
| KR | 10-2019-0006581 | 1/2019 |
| KR | 10-1939332 | 1/2019 |
| WO | 2003059821 A1 | 7/2003 |
| WO | 2004101162 A1 | 11/2004 |
| WO | 2005044734 A1 | 5/2005 |
| WO | 2010040721 A1 | 4/2010 |
| WO | 2010/130031 | 11/2010 |
| WO | 2015/046014 | 4/2015 |
| WO | 2016/150718 | 9/2016 |
| WO | 2017/003347 | 1/2017 |
| WO | 2017/018294 | 2/2017 |
| WO | 2017/055093 | 4/2017 |
| WO | 2018/079265 | 5/2017 |
| WO | 2017/099663 | 6/2017 |
| WO | 2017/124191 | 7/2017 |
| WO | 2017/140790 | 8/2017 |
| WO | 2017/202508 | 11/2017 |
| WO | 2018147325 A1 | 8/2018 |
| WO | 2018/190667 | 10/2018 |
| WO | 2018/213936 | 11/2018 |
| WO | 2018/221084 | 12/2018 |
| WO | 2019/014770 | 1/2019 |
| WO | 2019/076780 | 4/2019 |
| WO | 2019080127 A1 | 5/2019 |
| WO | 2020035666 A1 | 2/2020 |
| WO | 2020054246 A1 | 3/2020 |
| WO | 2020239466 A1 | 12/2020 |
| WO | 2021073028 A1 | 4/2021 |
| WO | 2021081646 A1 | 5/2021 |

OTHER PUBLICATIONS

International Search Report and the Written Opinion of the International Searching Authority for International Application No. PCT/US2020/044132 dated Dec. 9, 2020.

* cited by examiner

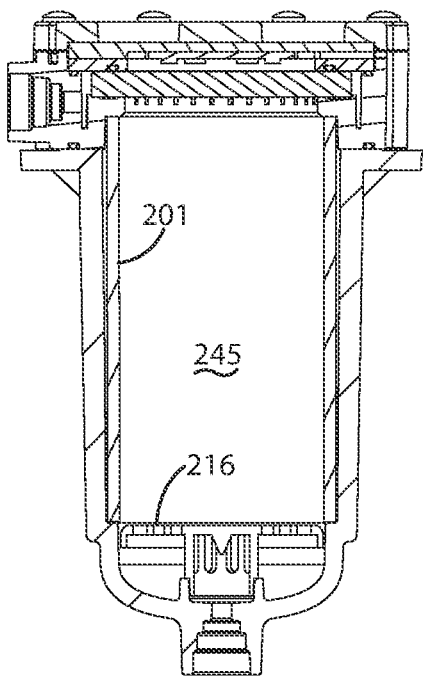
(a) Fig. 6
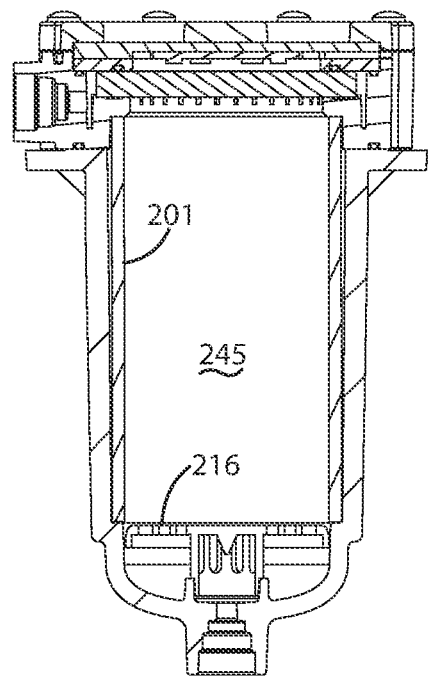
(b) Fig. 7
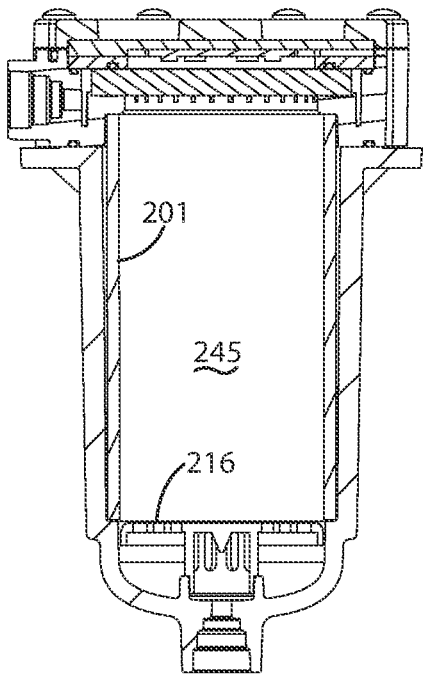
(c) Fig. 8
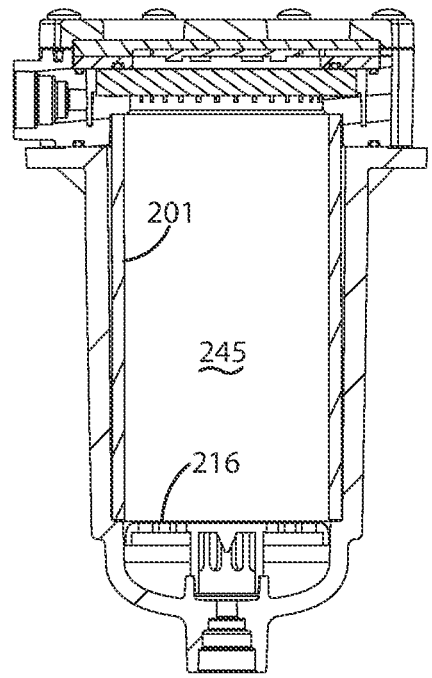
(d) Fig. 9

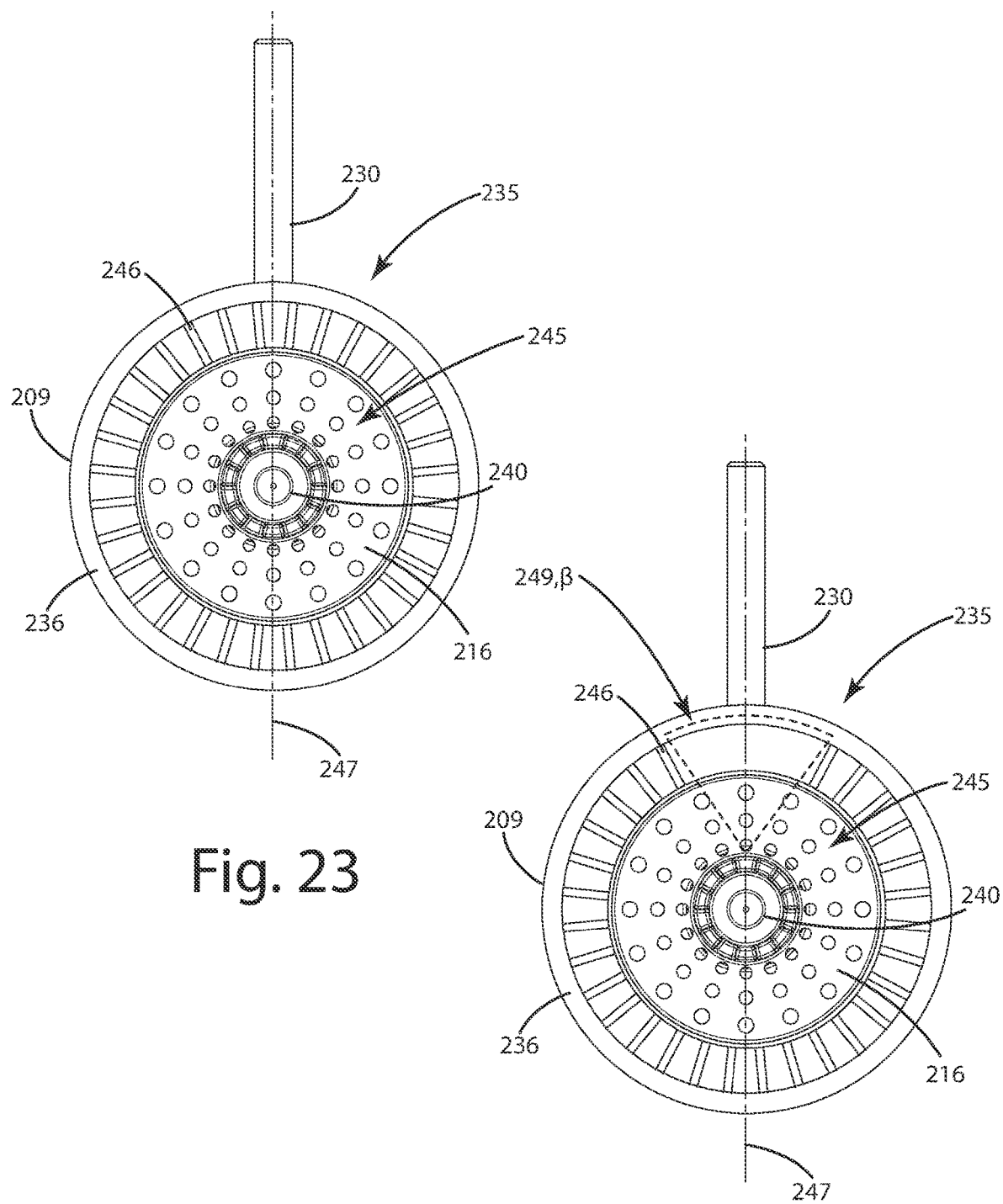

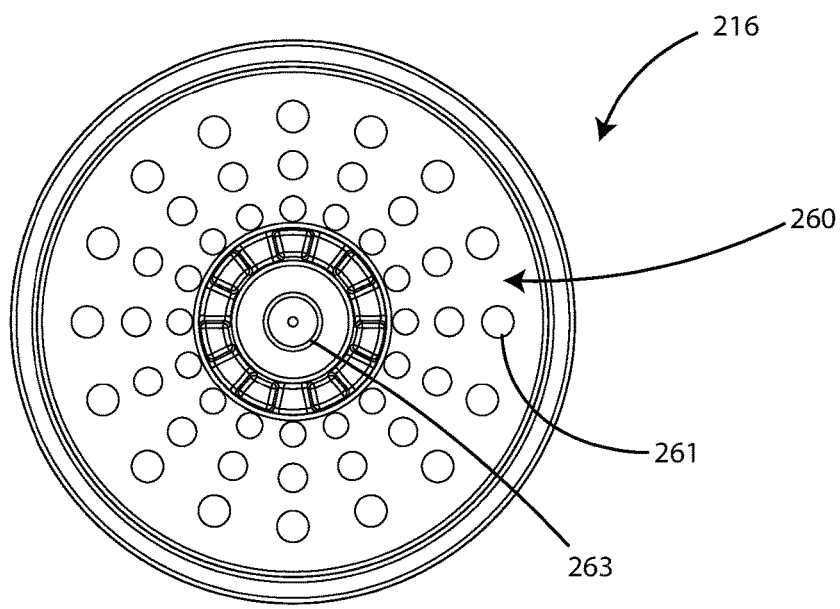
Fig. 30
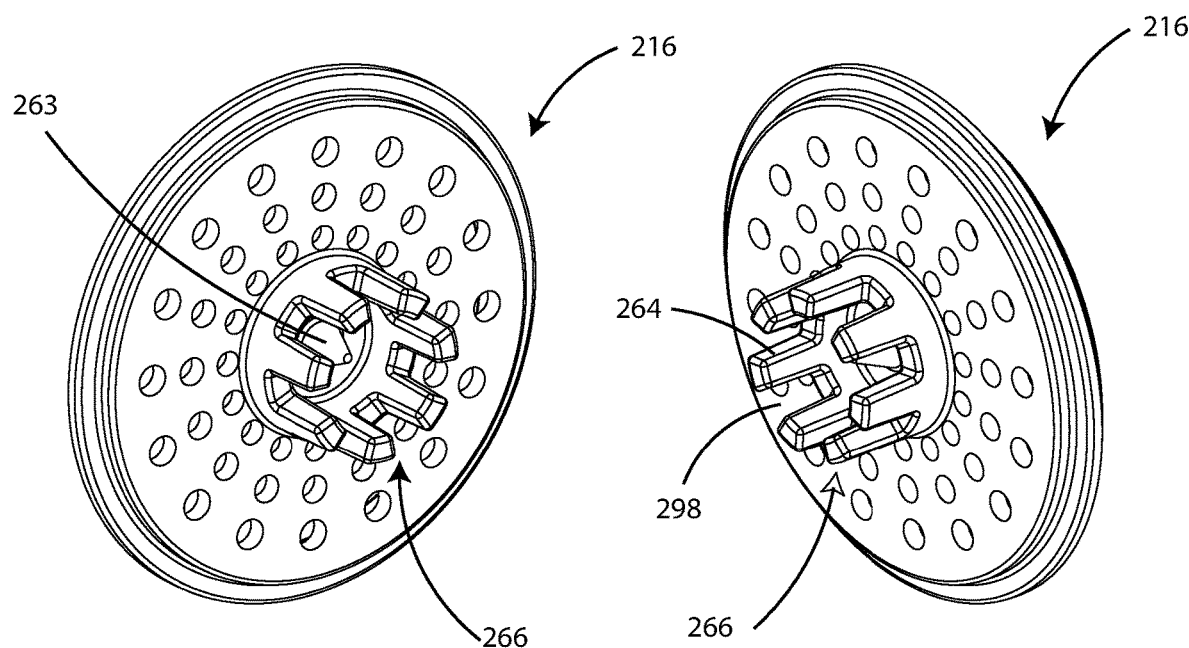
Fig. 31
Fig. 32

WATER TREATMENT SYSTEM

FIELD OF INVENTION

The present disclosure relates to a water treatment system, and more particularly toward a point-of-use water treatment system for a residential or commercial application.

BACKGROUND

Conventional water treatment systems are often used to treat water intended for human consumption. Such treatment systems can be configured to remove pathogens, chemical contaminants and turbidity from water. Many conventional treatment methods can be broadly classified as either solid separation using physical processes and/or chemical processes or as sterilization using heat, irradiation or chemical additives. For example, conventional water treatment systems often include carbon filtration, non-carbon filtration, distillation, ozone treatment, reverse osmosis, ion exchange components, chlorination components, aeration components, advanced oxidation process components, coagulation components, sedimentation components or ultraviolet radiation components.

Conventional point-of-use water treatment systems are designed for use at a single water outlet, such as a sink or water dispenser. The conventional point-of-use water treatment system is connected to a pressurized water supply to treat water as it is being dispensed. In some applications, the water treatment system is positioned on a countertop adjacent to a sink. In countertop applications, the water treatment system is often times connected to the end of the water faucet so that water exiting the faucet can be routed through the water treatment system before it is dispensed.

In some conventional point-of-use water treatment systems, ultraviolet (UV) energy can be used to substantially disinfect fluids. Exposure to ultraviolet light is believed to detrimentally alter the genetic (DNA) material in cells, thereby reducing the population of potentially pathogenic microorganisms such as bacteria, viruses, molds, algae and the like. Typically, water flows past UV lamps in UV disinfection systems thereby exposing microorganisms in the water to a dose of UV energy sufficient to substantially neutralize the microorganism. Typical water disinfection systems and devices emit UV light at approximately 254 nm, which is believed to penetrate the outer cell membrane of microorganisms, pass through the cell body, reach the DNA and alter the genetic material of the microorganism.

In some cases, the UV lamps provided in conventional UV disinfection systems generate heat during operation. This heat can sometimes be detrimental to the operating life of the UV lamps. To dissipate such heat, conventional UV disinfection systems utilize convection cooling in conjunction with the surrounding air. A metal heat sink may be provided that facilitates transfer of heat to the surrounding air. These types of cooling systems can be ineffective, particularly in confined spaces where air flow is minimal, such as when the system is installed in a cabinet under a sink.

SUMMARY

A UV reactor for disinfecting water is provided. In one embodiment, the UV reactor may include a cooling chamber in which heat from a UV light source may be transferred to the water flowing through the UV reactor. In one embodiment, the UV reactor may include driver circuitry operable to determine status information, such as health, of the UV light source. The UV reactor, in one embodiment, may include a gas discharge path operable to substantially prevent accumulation of gas within a water treatment chamber.

In one embodiment, a UV reactor is provided for treating water, and including a water inlet operable to receive water, and a water outlet for discharging water from the UV reactor. The UV reactor may include a water treatment chamber having a first end and a second end with a longitudinal axis extending therebetween, where the water treatment chamber includes a chamber inlet in fluid communication with the water inlet to receive water to be decontaminated, and where the water treatment chamber includes a plurality of chamber outlets operable to direct water substantially non-parallel to the longitudinal axis of the water treatment chamber. The UV reactor may include a UV source configured to provide UV energy to the water treatment chamber, said UV energy being directed substantially parallel to said longitudinal axis.

In one embodiment, the UV reactor may include a cooling chamber in fluid communication with the plurality of chamber outlets of the water treatment chamber. The cooling chamber may be in thermal communication with the UV source to facilitate transfer of thermal energy from the UV source to water in fluid communication with the water outlet. The cooling chamber may be constructed to direct water to the water outlet.

In one embodiment, the UV reactor may include a water treatment chamber having an interior side surface defined between first and second end surfaces. The water treatment chamber may have a longitudinal axis extending from the first end surface to said second end surface. The water treatment chamber may include a chamber inlet in fluid communication with the water inlet to receive water to be decontaminated, and a plurality of chamber outlets operable to direct water substantially non-parallel to the longitudinal axis of the water treatment chamber. The plurality of chamber outlets may be provided by the interior side surface proximal to the second end surface such that, in use, gas is substantially prevented from collecting proximal to the second end surface. The UV reactor may include a UV source configured to provide UV energy to the water treatment chamber, the UV energy being directed substantially parallel to the longitudinal axis.

In one embodiment, the UV reactor may include a water treatment chamber having an interior side surface defined between first and second end surfaces, where the water treatment chamber may include a longitudinal axis extending from the first end surface to the second end surface. The water treatment chamber may include a chamber inlet in fluid communication with the water inlet to receive water to be decontaminated, and a chamber outlet in fluid communication with the water outlet. The UV reactor may include a laminar flow element disposed to define the first end surface, the laminar flow element being operable to condition water downstream of the laminar flow element to flow in a substantially laminar manner. The laminar flow element may include a plurality of flow paths, where a first flow path of the plurality is larger than a second flow path of the plurality and closer to the interior side surface of the water treatment chamber than the second flow path.

In one embodiment, the UV reactor may include a UV source configured to provide UV energy to the water treatment chamber, and a UV transmissive window disposed to form at least a portion of a barrier between the UV source and the water treatment chamber. The UV transmissive window may include a water chamber side and a UV source side, and may be positioned to facilitate transmission of UV energy from the UV source to the water treatment chamber. The UV source side of the UV transmissive window may include a coating that facilitates substantially one-way passage of UV energy from the UV source through the UV transmissive window.

In one embodiment, a driver circuit for an UV reactor is provided, and includes a power source operable to supply power to a UV source. The driver circuit may include a sensor operably coupled to the UV source, where the sensor is configured to sense a characteristic of power provided to the UV source. The driver circuit may include a control unit operable to direct the flow of power to the UV source to forward bias the UV source and to reverse bias the UV source. The control unit may be configured to determine health information about the UV source based on sensor output obtained with respect to at least one of a forward bias condition and a reverse bias condition.

In one embodiment, a water treatment system is provided as a point of use system configured to receive water from a potable source. When water is dispensed from the water treatment system, water moves through the system due to line pressure from the source. There may be no pump in the system. The water from the potable source may enter the water treatment system and then pass through a carbon filter. After leaving the carbon filter, water may enter the UV reactor in accordance with one or more embodiments described herein.

In one embodiment, the UV reactor may include one or more of the following: a reactor body having reflective material (diffusive or specular, e.g., PTFE or stainless); an outlet endcap with a patterned outlet channel; a UV transmissive window or quartz window to allow UV energy passing to the reactor body; one or more O-rings or alternative sealing features to provide a seal between a water facing thermal coupler (e.g., a stainless steel ring) and the endcap; the water facing thermal coupler being operable as a lens holder (e.g., to provide support for the UV transmissive window and operable to facilitate cooling the UV LED with water); a heat sink (e.g., a UV LED(s) back support in direct in contact with a printed circuit board assembly for the UV LED(s), and which may be aluminum or copper for thermal conductivity); the printed circuit board assembly, potentially a metal clad printed circuit board, with a metal core that can be aluminum or copper for thermal conductivity; a top cap to provide support for the heat sink and one or more other components of the UV reactor; one or more O-rings or alternative sealing features to provide a seal between the UV transmissive window and the water facing thermal coupler; a reactor body support operable as an inlet endcap; one or more screws to provide fastening; and a laminar flow element or baffle (disposed at the bottom of the reactor body and operable to provide a flow pattern change).

In one embodiment, a UV reactor is provided that includes a UV LED reactor hydraulic construction that is optimized. The LED pattern may achieve disinfection, and LED cooling may be through a water-cooling path. The UV reactor, in one embodiment, may be more compact than conventional UV reactors and may consume less electrical power while achieving a similar disinfection target. The UV reactor may not be susceptible to ON/OFF cycle limitations, and can be turned ON instantly for operation (e.g., in response to detecting the flow of water). The UV reactor may also have a longer life than a conventional low pressure (LP) mercury lamp, and may not contain mercury. The UV reactor may include LEDs that do not emit heat from the front surface toward the water being disinfected, thereby reducing solarization on reactor material.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 6 shows a sectional view of the UV reactor in accordance with one embodiment.

FIG. 7 shows a sectional view of the UV reactor in accordance with one embodiment.

FIG. 8 shows a sectional view of the UV reactor in accordance with one embodiment.

FIG. 9 shows a sectional view of the UV reactor in accordance with one embodiment.

FIG. 23 shows outlet channels and a collection trough of an end cap of the UV reactor in accordance with one embodiment.

FIG. 24 shows outlet channels and a collection trough of an end cap of the UV reactor in accordance with one embodiment.

FIG. 30 shows a bottom view of a laminar flow element in accordance with one embodiment.

FIG. 31 depicts a perspective view of a laminar flow element in FIG. 30.

FIG. 32 shows another perspective view of the laminar flow element in FIG. 30.

DETAILED DESCRIPTION

I. UV Reactor

Figure 1:
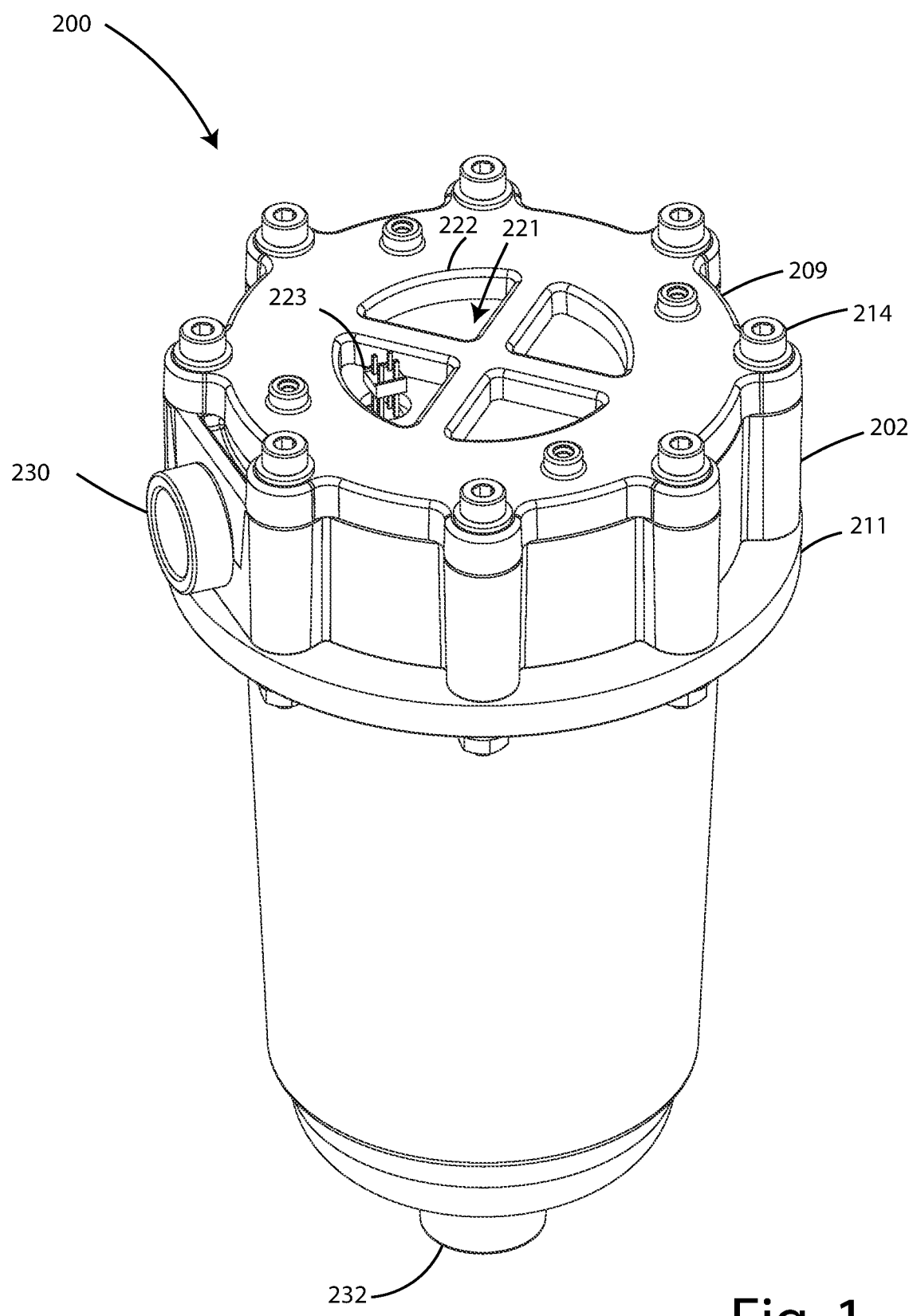
FIG. 1 shows a perspective view of a UV reactor in accordance with one embodiment.
Figure 2:
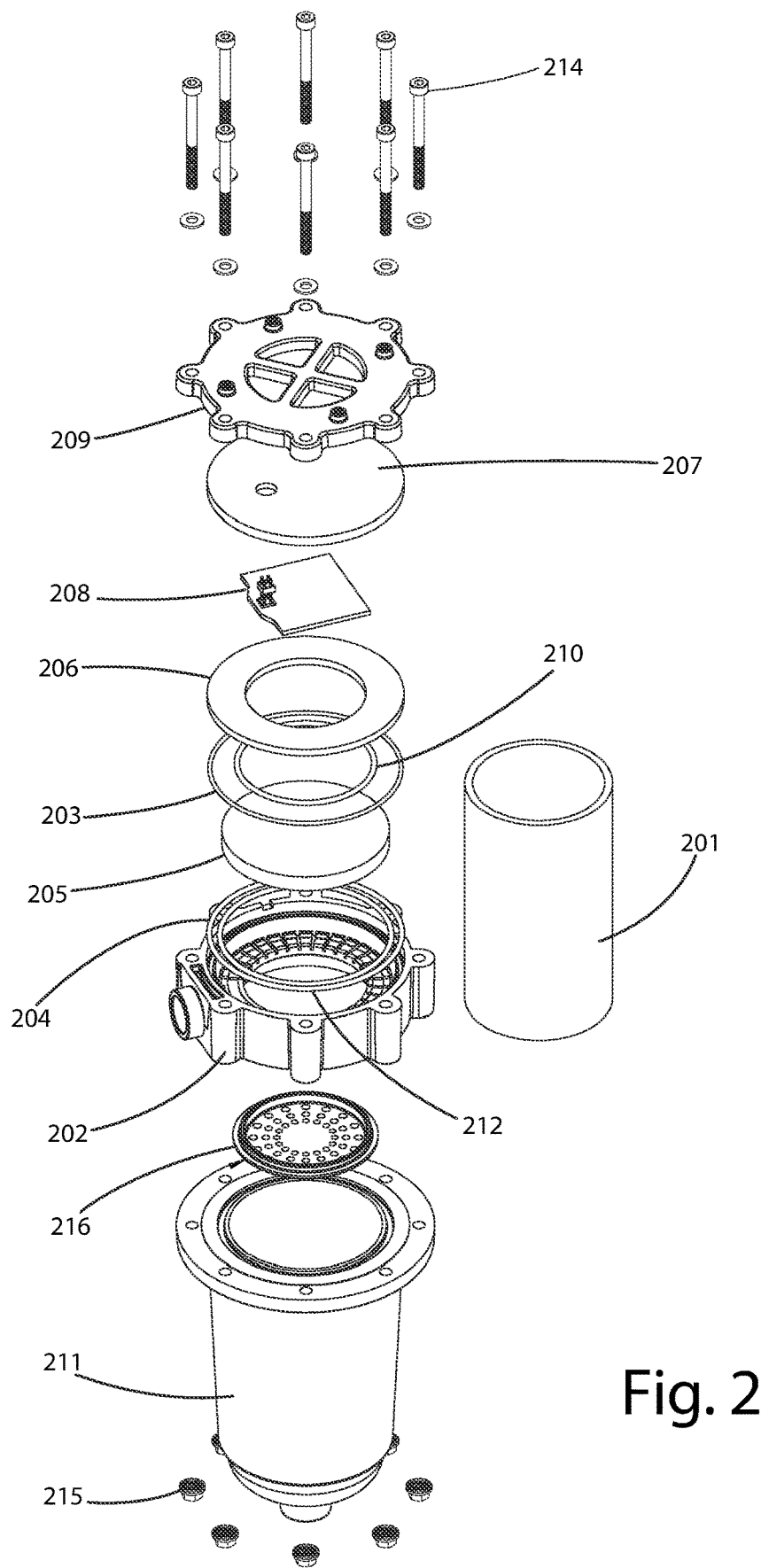
FIG. 2 shows an exploded view of the UV reactor in FIG. 1.
Figure 3:
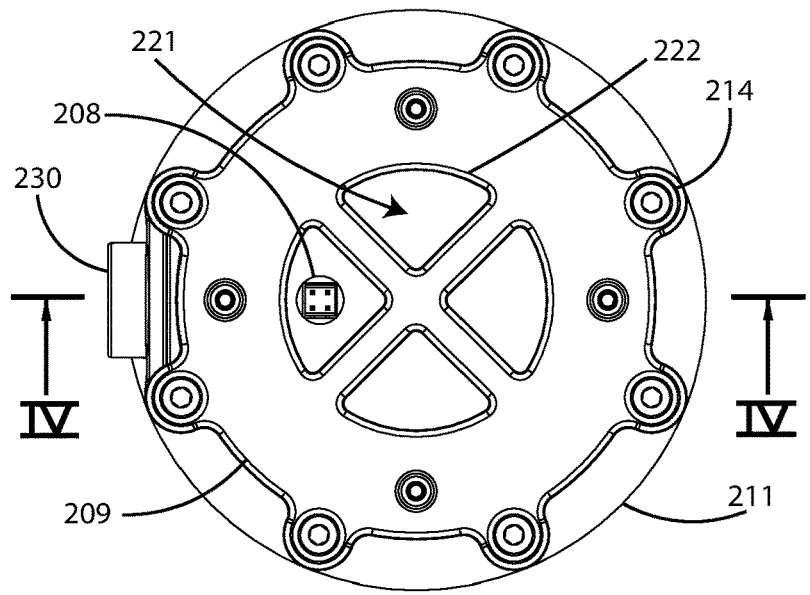
FIG. 3 shows a top view of the UV reactor in FIG. 1.

A UV reactor 200 in accordance with one embodiment is shown in FIGS. 1-5. The UV reactor 200 as discussed herein includes a UV reactor inlet 232 for receiving water and a UV reactor outlet 230 for discharging disinfected water, which has been subjected to UV light. The UV reactor 200 may be configured to direct UV light to water received via the reactor inlet 232 in order to disinfect the water.

In the illustrated embodiment, the UV reactor 200 is operable to transfer heat generated from a UV light source to water flowing through the UV reactor 200. This way, the UV reactor 200 can dissipate heat from the UV light source in an efficient manner relative to reliance solely on convection heat transfer to the surrounding air. A thermal coupler in one embodiment may be in thermal communication with a UV light source internal to the UV reactor 200. The UV light source may be an LED light source that generates heat during operation. This heat may be transferred to the thermal coupler and ultimately to the water that is being treated or discharged from the UV reactor 200, or both, via the thermal coupler. In other words, the thermal coupler may be operable to dissipate heat from the UV light source into water flowing through the reactor, thereby cooling the UV light source.

The UV reactor 200 in the illustrated embodiments of FIGS. 1-5 includes the UV reactor inlet 232 and the UV reactor outlet 230. The UV reactor 200 may include one or more of the following components:

- a reactor body 201;
- an end cap 202 having at least one outlet in fluid communication with the UV reactor outlet 230;
- a UV transmissive window 205;
- a water facing thermal coupler 206;
- a first seal 210 disposed at least between the water facing thermal coupler 206 and the end cap 202 to substantially prevent leakage across the seal interface between the water facing thermal coupler 206 and the end cap 202;
- a second seal 203 disposed between the water facing thermal coupler 206 and the UV transmissive window 205 to substantially prevent leakage across the seal interface between the second seal 203 and the UV transmissive window 205;
- a UV light source assembly 208 having one or more UV light sources as described herein;
- a source-based thermal coupler 207 operable to transfer heat from the UV light source to the water facing thermal coupler 206, which can be separate from or integrated into the UV light source assembly 208 as described herein;
- a support cap 209 disposed to interface with the end cap 202 and to hold in place the source-based thermal coupler 207, the first and second seals 210, 203, the UV transmissive window 205, and the water facing thermal coupler 206;
- reactor body support 211 operable to hold the reactor body 201 in order to facilitate formation of the water treatment chamber 245, and operable to couple to the end cap 202 in a leaktight manner in conjunction with seals 204, 212;
- a laminar flow element 216 disposable within the water treatment chamber 245 to generate laminar flow of water therein; and
- fasteners 214 operable to interface with the support cap 209, the end cap 202, and the reactor body support 211 to maintain a water tight seal within the water treatment chamber 245 from the UV reactor inlet 232 to the UV reactor outlet 230.

In use, UV reactor 200 is configured such that water enters the UV reactor inlet 232, defined in the illustrated embodiment by the reactor body support 211. Water may flow through one or more flow paths provided by the laminar flow element 216 prior to entering the water treatment chamber 245.

The water treatment chamber 245 may be defined by an interior surface 290 of the reactor body 201 (e.g., an interior side surface) which extends generally from a first end 291 to a second end 292 of the water treatment chamber 245 with a longitudinal axis 240 extending therebetween. As depicted in the illustrated embodiment of FIG. 4, the interior surface 290 may not define the entirety of interior side surface of the water treatment chamber 245. For instance, one or more portions of the end cap 202, the reactor body support 211, and the laminar flow element 216 may define one or more portions of the interior side surface of the water treatment chamber 245. In a more specific example, a portion of the end cap 202 in the illustrated embodiment that is adjacent the UV transmissive window 205 defines an interior surface portion of the water treatment chamber 245.

Figure 4:
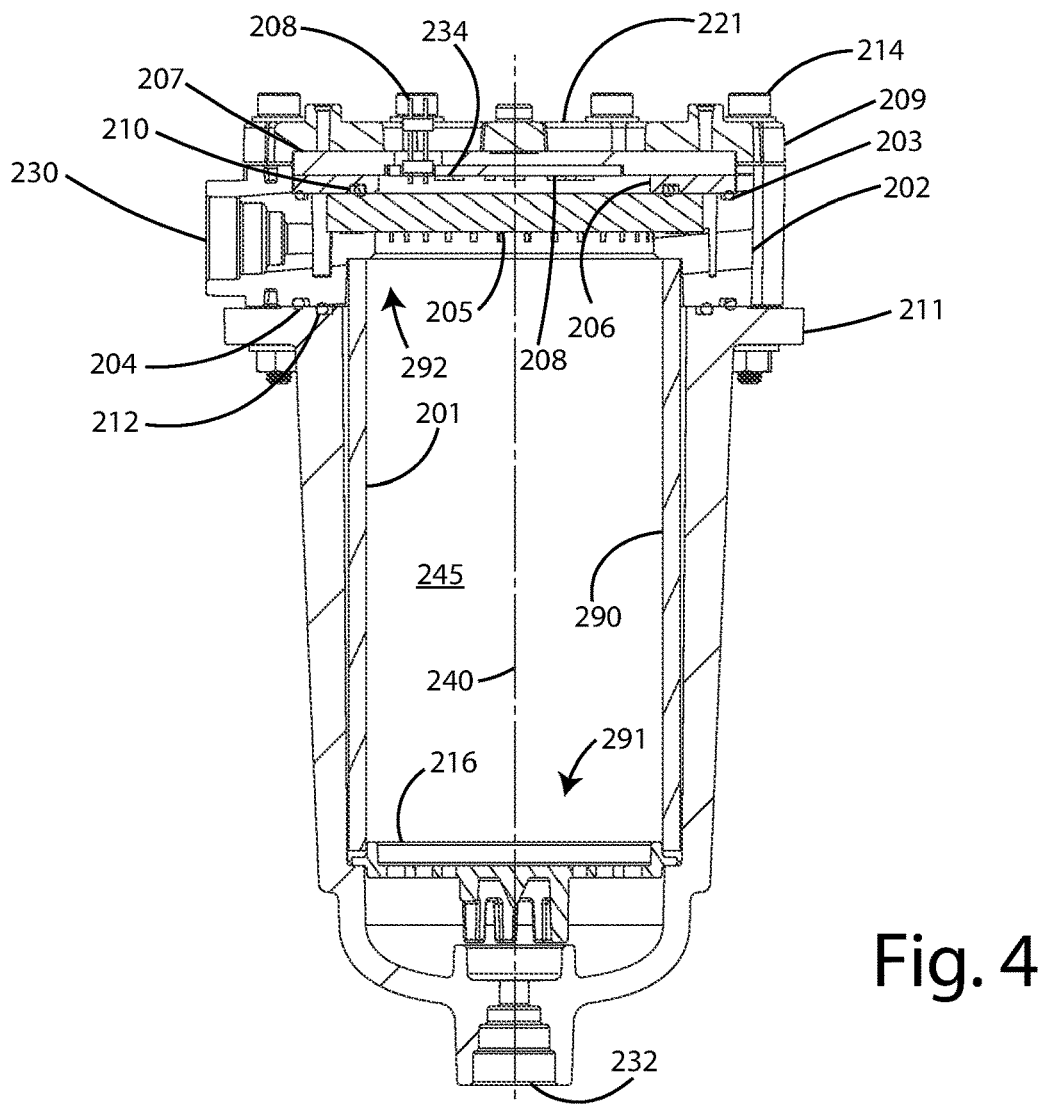
FIG. 4 shows a sectional view of the UV reactor according to the sectional line defined in FIG. 3.

The reactor body 201 may include first and second openings proximal respectively to the first and second ends 291, 292 of the water treatment chamber 245. The reactor body 201 in the illustrated embodiment may be a hollow cylinder with the first and second ends corresponding to the bottom and top of the reactor body 201 as depicted in FIG. 4 and the longitudinal axis of the reactor body 201 corresponding to the longitudinal axis 240. Although the reactor body 201 is shown as a circular cylinder, it is to be understood that the present disclosure is not so limited. The reactor body 201 may be any type of cylinder, such as a curved cylinder (e.g., a circular cylinder) or a polygonal cylinder, or a combination of curves and straight lines to form a cylindrical structure. The thickness of the walls of the hollow cylinder may be variable or substantially uniform. As an example, the thickness may be variable or substantially uniform along the longitudinal axis 240 from the first to second openings. The interior surface 290 of the reactor body 201 may be part of a cylindrical wall of which defines at least a portion of a water treatment chamber 245.

The reactor body 201 in one embodiment may be formed entirely of a UV reflective material, such as polytetrafluoroethylene (PTFE) or expanded PTFE (ePTFE) or stainless steel, to facilitate internal reflection of UV light from the light source within the water treatment chamber 245. PTFE is sold under the brand name Teflon. Alternatively, the reactor body 201 may include two or more different materials, one of which may be the UV reflective material. As an example, the UV reflective material may form the interior surface 290 as a coating on a substrate of the reactor body 201 that supports the coating under pressure during use.

Reflection of UV light within the water treatment chamber 245 by the reactor body 201 may facilitate maintaining intensity of the UV light within the water treatment chamber 245 and substantially block UV light from leaking outside of the water treatment chamber 245.

It is noted that—although the UV reactor 200 is shown operating in a generally upright vertical position with water flowing from the bottom to the top, the UV reactor 200 is not limited to operating in this manner. For instance, the UV reactor 200 may be disposed in a horizontal position, potentially with the UV reactor outlet 230 facing up (e.g., to enable expulsion of gas from the water treatment chamber 245).

In the illustrated embodiment, proximal to the second end 292 of the water treatment chamber, the UV light source assembly 208 is disposed. The UV light source assembly 208 may include a UV LED Printed Circuit Board Assembly (PCBA) and may be configured to direct UV light into the water treatment chamber 245 through the UV transmissive window 205, which may be formed of quartz. The UV light source assembly 208, as described herein, may include a PCB assembly 273 and a UV light source configuration 272 that includes a plurality of UV light sources 234. The UV light sources 234 in one embodiment may be UV LEDs. The UV light source assembly 208 may include a connector 223 operable to facilitate external connection between a power supply and circuitry of the UV light source assembly 208.

In use, within the water treatment chamber 245 with the UV reactor 200 positioned vertically as shown in FIG. 4, water flows up toward the UV light sources 234 and then out of the water treatment chamber 245 through at least one outlet path defined at least in part by the end cap 202. The at least one outlet path may be fluidly coupled to the UV reactor outlet 230 for discharge of treated water from the UV reactor 200. The at least one outlet path may include a plurality of chamber outlets 246, shown in further detail in the illustrated embodiments of FIGS. 21-27. The plurality of chamber outlets 246 may be fluidly coupled to a thermal exchange region 236, described herein as a trough or cooling chamber, in which water thermally conducts heat energy away from the water facing thermal coupler 206 before exiting through the UV reactor outlet 230.

The plurality of chamber outlets 246 in one embodiment may be defined at least in part by a plurality of respective apertures in the interior surface 290 of the water treatment chamber 245, such that water flowing through the water treatment chamber 245 is discharged through the plurality of apertures in a radial manner relative to the longitudinal axis 240 of the water treatment chamber 245. Alternatively, the plurality of chamber outlets 246 may be defined by one or more apertures in a surface of the second end 292 such that water is discharged from the water treatment chamber 245 in a direction (at least initially) that is substantially parallel to the longitudinal axis 240.

In the illustrated embodiment, the plurality of chamber outlets 246 may be defined by respective channels provided in the end cap 202 and a portion of a chamber facing surface of the UV transmissive window 205. Another portion of the chamber facing surface of the UV transmissive window 205 may define the second end of the water treatment chamber 245, such that the portion of the chamber facing surface of the UV transmissive window 205 that defines an interior surface of each chamber outlet 246 is disposed even or parallel with the second end 292. This way, gas accumulation on the portion of the chamber face surface of the UV transmissive window 205 that defines the second end 292 may be substantially avoided. For instance, with the chamber facing surface of the UV transmissive window 205 being substantially flat and forming both the second end 292 and an internal surface of the chamber outlets 246, if gas encounters the second end 292, it will be urged toward an outlet channel or chamber outlet 246 along the chamber facing surface of the UV transmissive window 205.

Figure 20:
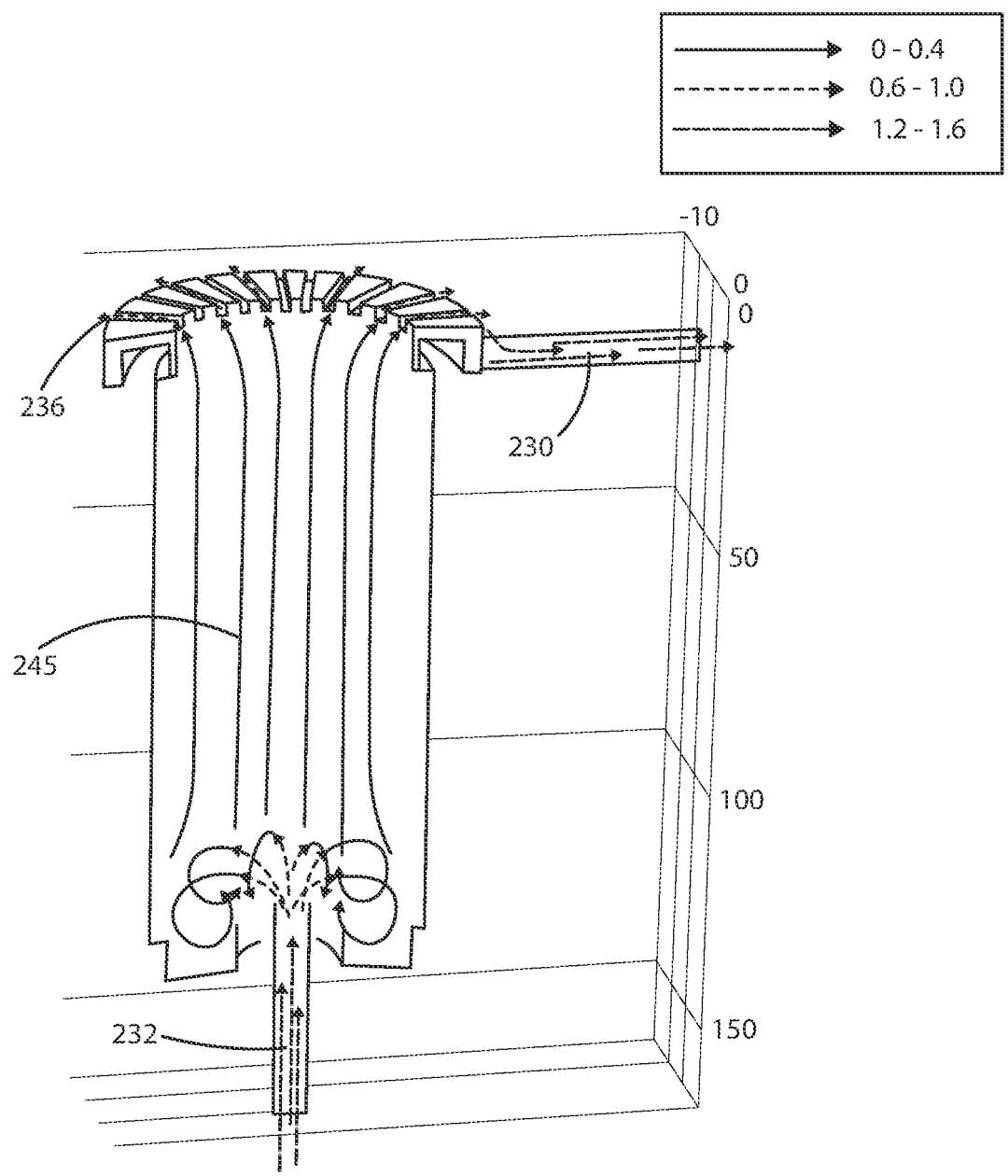
FIG. 20 shows the flow path and flow velocity of water within the UV reactor in accordance with one embodiment.
Figure 21:
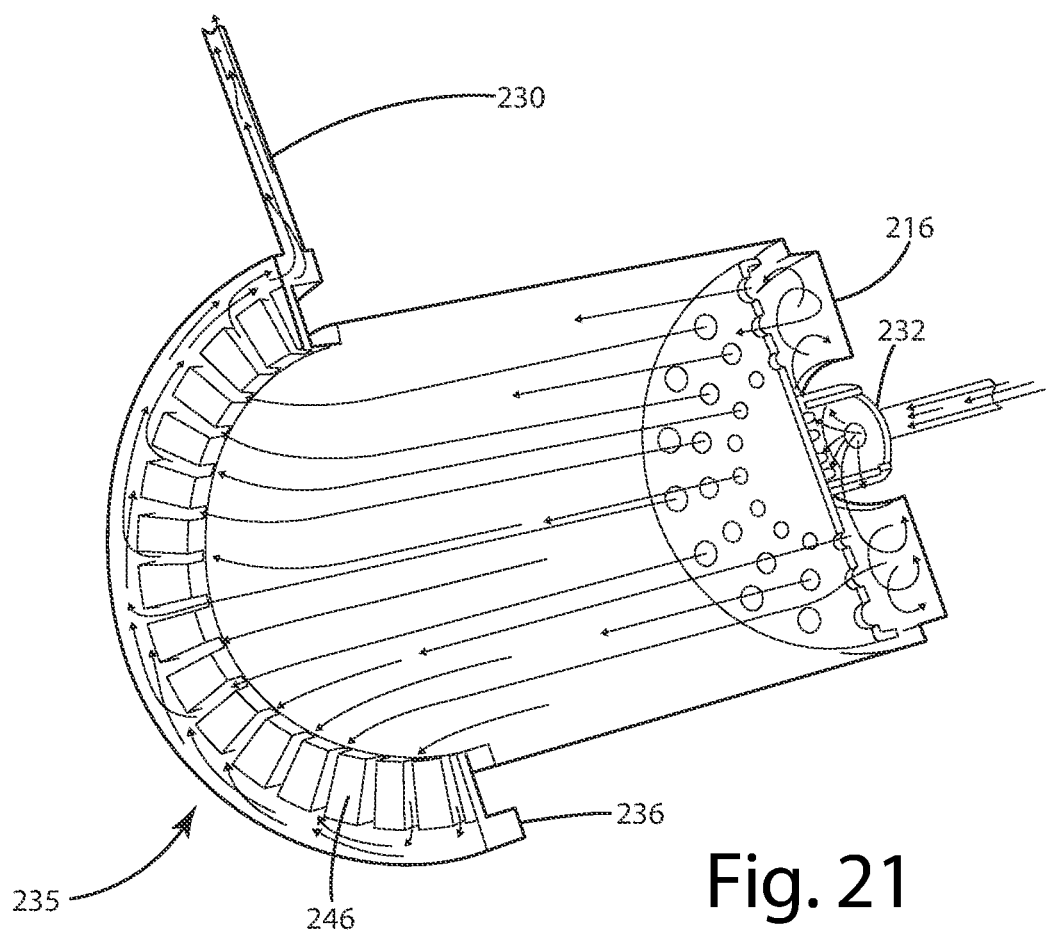
FIG. 21 shows the flow path of water within the UV reactor in accordance with one embodiment.
Figure 22:
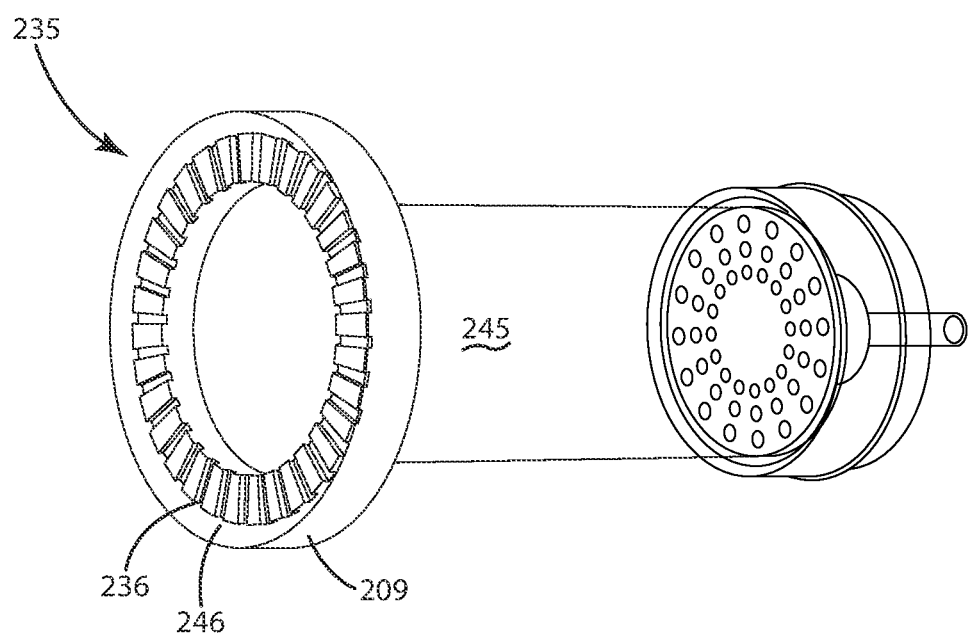
FIG. 22 depicts outlet channels and a collection trough of an end cap of the UV reactor in accordance with one embodiment.

In the illustrated embodiment, a flow path defined by the plurality of chamber outlets 246 may be formed adjacent to the second end 292 of the end cap 202. The plurality of chamber outlets 246 may lead to a collection trough or thermal exchange region 236 in fluid communication with the UV reactor outlet 230 provided by the end cap 202. The collection trough or thermal exchange region 236 may extend around an inner circumference of the end cap 202 as depicted in the illustrated embodiment of FIGS. 20 and 22.

In the illustrated embodiment of FIGS. 1-5, the UV light source assembly 208 is thermally coupled to the source-based thermal coupler 207, which may be an aluminum or copper plate. The source-based thermal coupler 207 may operate as a heat sink drawing thermal energy from the UV light source assembly 208 and facilitating transfer of that energy to one or more other mediums, such as ultimately to the water traversing through the UV reactor outlet 230 and/or the surrounding air.

In the illustrated embodiment, the support cap 209 includes a plurality of apertures 222 that expose the source-based thermal coupler 207 to the surrounding air. The apertures 222 may define a plurality of respective thermal paths 221 for the source-based thermal coupler 207 to dissipate heat, such as by convection heat transfer to the surrounding air. The support cap 209 may also provide access for electrical connection to the UV light source assembly 208 via one or more of the apertures 222.

The UV light source assembly 208 may be thermally coupled to the source-based thermal coupler 207, which as described herein, may be thermally coupled to the water facing thermal coupler 206. As an example, the source-based thermal coupler 207 may be an aluminum backing plate for the UV light source assembly 208, and the water facing thermal coupler 206 may be a metal ring (e.g., stainless steel) in contact with both the source-based thermal coupler 207 and water flowing through the thermal exchange region 236. This may allow water flowing through the collection trough or thermal exchange region 236 to cool the water facing thermal coupler 206 thereby cooling the source-based thermal coupler 207.

The UV reactor 200, as discussed herein, may include the laminar flow element 216 disposed to form a first end of the water treatment chamber 245. The laminar flow element 216, in one embodiment, may be a baffle to facilitate formation of laminar flow from the first end 290 to the second end 292. The laminar flow element 216 may include a plurality of fluid pathways that communicate fluid received by the UV reactor inlet 232 to the water treatment chamber 245. The UV reactor 200 may include a flow director or deflector 266, optionally integrated with the laminar flow element 216, to facilitate generation of turbulent water flow in proximity to the plurality of fluid pathways of the laminar flow element 216 on a side opposite the water treatment chamber 245.

The UV light source assembly 208 in the illustrated embodiment may be positioned relative to the UV transmissive window 205 such that there is a space 233 between the UV light source assembly 208 and the UV transmissive window 205. For instance, the water facing thermal coupler 206 may be disposed between portions of the UV transmissive window 205 and the UV light source assembly 208 in order to form the space 233.

An alternative embodiment of a UV reactor in accordance with the present disclosure is shown in FIGS. 57-68 and is generally designated 200'. The UV reactor 200' may be similar to the UV reactor 200 in several respects with one or more exceptions as described herein. It is to be understood that one or more components, features, and functions described in conjunction with the UV reactor 200' may be incorporated into the UV reactor 200, and that likewise, one or more components, features, and functions described in conjunction with the UV reactor 200 may be incorporated into the UV reactor 200'. It is also to be understood that one or more components, features, and functions described in conjunction with the UV reactor 200' and UV reactor 200 may be absent in an alternative embodiment.

The UV reactor 200' in the illustrated embodiment of FIGS. 57-61 includes a UV reactor inlet 232 and a UV reactor outlet 230. The UV reactor 200', may include one or more of the following components:

- a reactor body 201';
- an end cap 202' having at least one outlet in fluid communication with the UV reactor outlet 230';
- a UV transmissive window 205';
- a water facing thermal coupler 406;
- a first seal 210' disposed at least between the water facing thermal coupler 406 and the end cap 202' to substantially prevent leakage across the seal interface between the water facing thermal coupler 406 and the end cap 202';
- a second seal 203' disposed between the water facing thermal coupler 406 and the UV transmissive window 205' to substantially prevent leakage across the seal interface between the second seal 203' and the UV transmissive window 205';
- a UV light source assembly 408 having one or more UV light sources 434 as described herein;

a source-based thermal coupler integrated with the UV light source assembly 408 and operable to transfer heat from the UV light source to the water facing thermal coupler 406';

a support cap 209' disposed and configured to interface with the end cap 202' and operable to hold in place the UV light source assembly 408, the first and second seals 210', 203', the UV transmissive window 205', and the water facing thermal coupler 406';

reactor body support 211' operable to hold the reactor body 201' in order to facilitate formation of the water treatment chamber 245';

a laminar flow element 216' disposable within the water treatment chamber 245' to generate laminar flow of water therein; and fasteners 214' operable to interface with the support cap 209', the end cap 202', and the reactor body support 211' to maintain a water tight seal within the water treatment chamber 245' from the UV reactor inlet 232' to the UV reactor outlet 230'.

In the illustrated embodiment, the reactor body support 211' and the end cap 202' are joined together in a substantially permanent, leaktight manner. As an example, the reactor body support 211' and the end cap 202' may be spin welded together to form a seal 204'. This type of connection between the reactor body support 211' and the end cap 202' may provide a leaktight connection without the use of a removable seal such as the seals 204, 212 provided in conjunction with the reactor body support 211 and end cap 202 of the UV reactor 200.

Similar to the UV reactor 200, the UV reactor 200' may be configured such that water enters the UV reactor inlet 232', defined at least in part by the reactor support 211'. The UV reactor inlet 232' may include a hose barb connector 233' that is coupled to the reactor support 211' (e.g., via a spin weld) to define at least a portion of the UV reactor inlet 232' to facilitate entry of water into the UV reactor 200' and through the water treatment chamber 245'. Water may flow through one or more flow paths provided by the laminar flow element 216' prior to entering the water treatment chamber 245'. Water may be discharged from the UV reactor 200' via the UV reactor outlet 230', which may include a host barb connector 235' that is coupled to the end cap 202' (e.g., via a spin weld) to define at least a portion of the UV reactor outlet 230'.

In the illustrated embodiment, the UV reactor inlet 232' and the UV reactor outlet 230' are configured to direct water in directions transverse to the longitudinal axis 240' of the UV reactor 200'. This configuration may enable a reduced vertical profile of the UV reactor 200'. It is noted that such water path directions pertaining to the UV reactor inlet 232' and the UV reactor outlet 230' may be different from each other, and are shown separated by an angle Θ relative to the longitudinal axis 240', which may facilitate routing and installation of water supply and water outlet connections to the UV reactor 200' in a water treatment system (e.g., the water treatment system 100 described herein). For instance, the housing configuration of the water treatment system may enable a water supply connection to the UV reactor inlet 232' at a first angle, and a water discharge connection to the UV reactor outlet 230' at a second angle, where the first and second angles are separated by the angle Θ identified in FIG. 62.

The water treatment chamber 245' may be defined in a manner similar to the water treatment chamber 245 of the UV reactor 200, including an interior surface 290' of the reactor body 201' that extends generally from a first end 291' to a second and 292' of the water treatment chamber 245' and the longitudinal axis 240' extending there between. The interior surface 290' of the UV reactor 200' may be configured similarly to the interior surface 290 such that the entirety of the interior side surface of the water treatment chamber 245' may not be defined by the interior surface 290. One or more portions of the end cap 202', the reactor body support 211', and the laminar flow element 216' may define one or more portions of the interior side surface of the water treatment chamber 245'.

Figure 64:
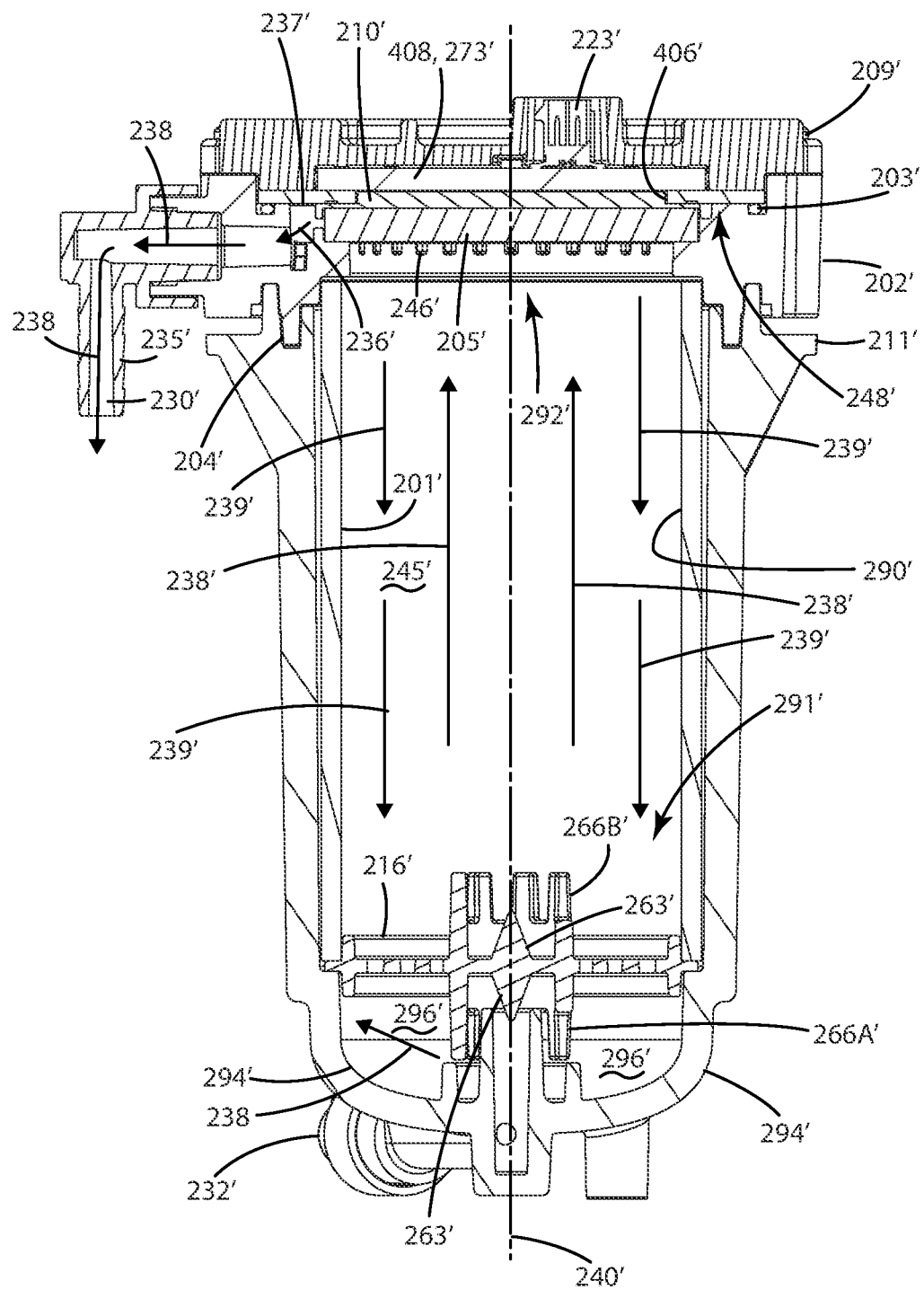
FIG. 64 shows a sectional view of the UV reactor in FIG. 62.
Figure 65:
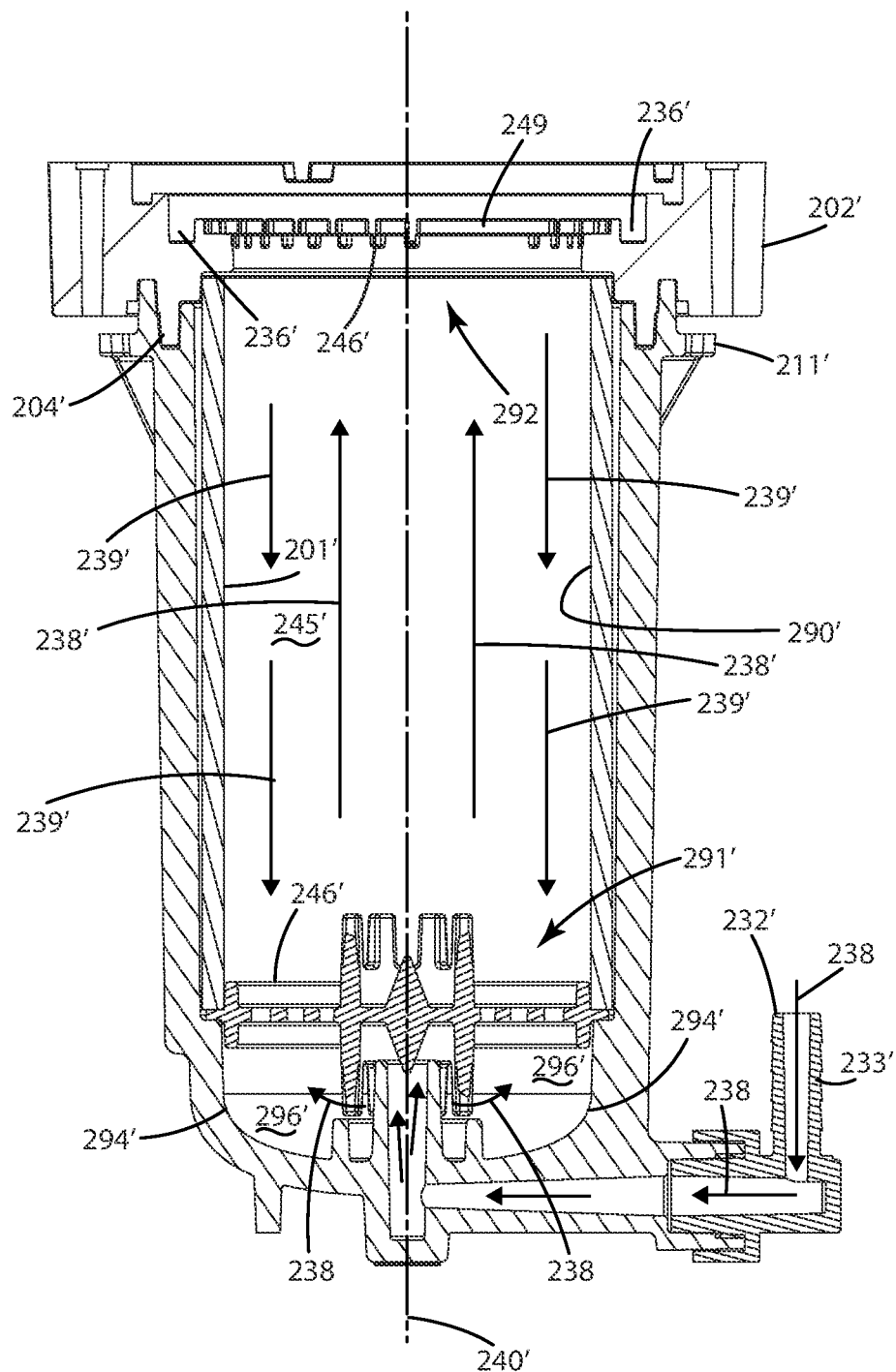
FIG. 65 shows a sectional view of the UV reactor in FIG. 63.
Figure 66:
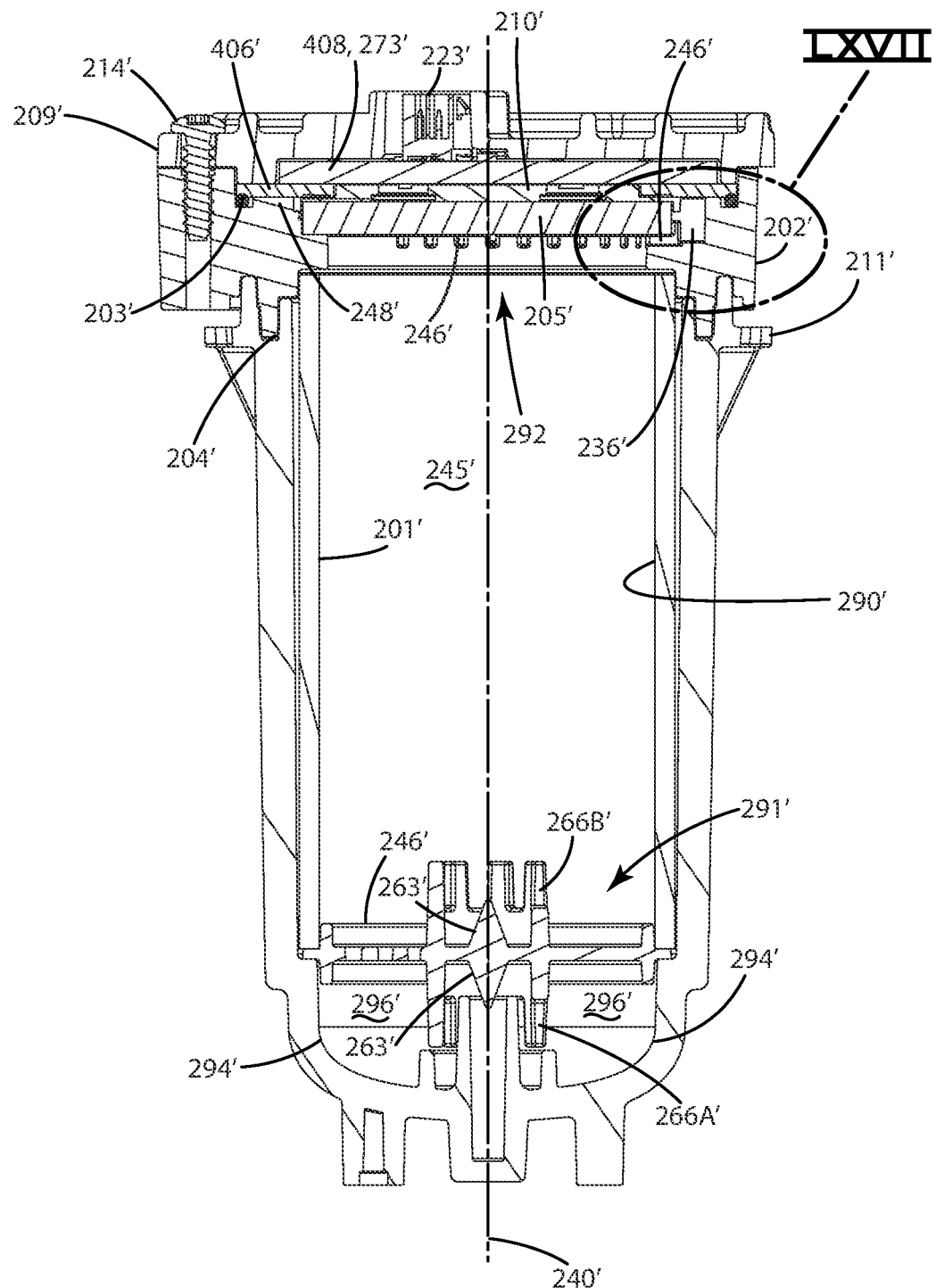
FIG. 66 shows a sectional view of the UV reactor in FIG. 62.

The reactor body 201' may include first and second openings proximal respectively to the first and second ends 291', 292' of the water treatment chamber 245'. For instance, similar to the reactor body 201, the reactor body 201' is provided in the form of a hollow cylinder with the first and second ends corresponding to the bottom and top of the reactor body 201 as depicted in FIGS. 64-66. However, the reactor body 201' may be any type of cylinder, and is not limited to the cylindrical construction depicted in the illustrated embodiment. For instance, the cross-sectional shape of the reactor body 201' may vary depending on the application. As another example, the reactor body 201' may include more than one longitudinal axes, such that the reactor body 201' includes multiple segments having longitudinal axes that are not co-linear.

The reactor body 201' may be constructed of one or more materials similar to the material construction described in conjunction with the reactor body 201. For instance, the reactor body 201' may be formed entirely of a UV reflective material, such as PTFE or ePTFE. Reflection of UV light within the water treatment chamber 245' of the reactor body 201' may facilitate maintaining intensity of the UV light there within and substantially block UV light from leaking outside the water treatment chamber 245'.

In the illustrated embodiment, the UV light source assembly 408 may be disposed proximal to the second end 292' of the water treatment chamber 245'. The UV light source assembly 408 may include a UV LED Printed Circuit Board (PCB) Assembly 273' and may be configured to direct UV light into the water treatment chamber 245' through the UV transmissive window 205', which may be formed of quartz. The UV light source assembly 408, as described herein, may include the PCB assembly 273 and a UV light source arrangement that includes a plurality of UV light sources 434, which may be UV LEDs. The UV light source assembly 408 may include a connector 223' configured to enable supply of power to circuitry of the UV light source assembly 408.

In use, within the water treatment chamber 245', with the UV reactor 200' positioned vertically as shown in FIGS. 64-66, water flows up toward the UV light sources 434 of the PCB assembly 273' of the UV light source assembly 408 and then out of the water treatment chamber 245' through at least one outlet path defined at least in part by the end cap 202'. The at least one outlet path may be fluidly coupled to the UV reactor outlet 230' for discharge of treated water from the UV reactor 200'. The at least one outlet path may include a plurality of chamber outlets 246', shown in further detail in the illustrated embodiments of FIGS. 60-61 and 63-67. The plurality of chamber outlets 246 may be fluidly coupled to a thermal exchange region 236', described herein as a trough or cooling chamber, in which water thermally conducts heat energy away from the water facing thermal coupler 406 before exiting through the UV reactor outlet 230'.

The plurality of chamber outlets 246' may be configured similar to the plurality of chamber outlets 246 described in conjunction with the UV reactor 200. For instance, the plurality of chamber outlets 246' may be defined at least in part by a plurality of respective apertures in the interior surface 290 of the water treatment chamber 245, enabling water to be discharged in a radial manner relative to the longitudinal axis 240' of the water treatment chamber 245'. More specifically, the plurality of chamber outlets 246' may be defined by respective channels provided in the end cap 202' and a portion of a chamber facing surface of the UV transmissive window 205'. The plurality of chamber outlets 246' may be configured differently as described in conjunction with the plurality of chamber outlets 246'.

Similar to UV reactor 200, in the illustrated embodiment of the reactor 200', a flow path defined by the plurality of chamber outlets 246' may be formed adjacent to the second end 292' of the end cap 202'. The plurality of chamber outlets 246' may lead to a collection trough or thermal exchange region 236' in fluid communication with the UV reactor outlet 230' provided by the end cap 202'. The collection trough or thermal exchange region 236' may extend around a portion of or an entirety of an inner circumference of the end cap 202' as depicted in the illustrated embodiment of FIGS. 24, 25, 27, and 63.

In the illustrated embodiment of FIGS. 57-68, the UV light source assembly 408 is thermally coupled to the water facing thermal coupler 406, which may be metal, such as steel, aluminum or copper. The water facing thermal coupler 406 may operate as a heat sink drawing thermal energy from the UV light source assembly 408 and facilitating transfer of that energy to one or more other mediums, such as ultimately to the water traversing through the UV reactor outlet 230. The UV light source assembly 408 may include a thermally conductive element or source-based thermal coupler 407 that is coupled directly to or in contact with the water facing thermal coupler 406. The source-based thermal coupler 407 may by thermally coupled to the one or more UV light sources of the UV light source assembly 408.

The UV light source assembly 408 may include an integral source-based thermal coupler 407, which as described herein, may be thermally coupled to the water facing thermal coupler 406. As an example, the source-based thermal coupler 407 and the water facing thermal coupler 406 may be in contact with each other such that water flowing through the heat exchange region 236' may absorb heat from the UV light source assembly 408. This may allow water flowing through the collection trough or heat exchange region 236' to cool the water facing thermal coupler 406 thereby cooling the source-based thermal coupler 407 and the one or more UV light sources of the UV light source assembly 408.

The UV reactor 200', in the illustrated embodiment, may include the laminar flow element 216' disposed to form a first end of the water treatment chamber 245'. The laminar flow element 216', in one embodiment, may be a baffle to facilitate formation of laminar flow from the first end 290' to the second end 292'. The laminar flow element 216' may include a plurality of fluid pathways that communicate fluid received by the UV reactor inlet 232' to the water treatment chamber 245'. The UV reactor 200' may include a flow director or deflector 266, optionally integrated with the laminar flow element 216, to facilitate generation of turbulent water flow in proximity to the plurality of fluid pathways of the laminar flow element 216' on a side opposite the water treatment chamber 245. The flow director or deflector 266' may be substantially duplicated on each side of the laminar flow element 216', such that regardless of an installation position of the laminar flow element 216, the deflector 266' is positioned to facilitate generation of turbulent water flow in proximity to the plurality of fluid pathways of the laminar flow element 216' on a side opposite the water treatment chamber 245'. The duplicative deflector 266' on the side corresponding to the water treatment chamber 245' may be substantially non-operative with respect to generation of turbulent water upstream of the laminar flow element 216'.

In the illustrated embodiment, the UV light source assembly 408 is spaced apart from the UV transmissive window 205'. As described herein, the first seal 210' may be configured as a spacer operable to fill at least a portion of or a substantial amount of the space between the UV light source assembly 408 and the UV transmissive window 205'. By filling this space, which may otherwise include air or another gas, the first seal 210' may reduce the amount of air or other gas within the space. Reduction in air within the space may substantially prevent the occurrence of condensation within the space. Condensation may cause premature failure with respect to the UV light source or degrade (or cause loss of) UV transmission, or any combination thereof. As a result, condensation can adversely affect or decrease disinfection performance. Reducing the air within the space and substantially preventing the occurrence of condensation within the space may avoid or reduce the possibility of premature failure, degradation of UV transmission, or decreased disinfection performance, or any combination thereof.

As described herein, the first seal 210' may include a plurality of openings 213' corresponding to each of the plurality of UV light sources (e.g., UV LEDs) of the UV light source assembly 408, allowing light from the UV light sources to enter the water treatment chamber 245' via the UV transmissive window 205'. The first seal 210' may include an alignment feature 217' operable to angularly align the first seal 210' with respect to the UV light source assembly 408 and the UV light sources disposed on the UV light source assembly 408, enabling light to be directed from the UV light source assembly 408 to the UV transmissive window 205' and into the water treatment chamber 245'.

In the illustrated embodiment, the first seal 210' is made of a silicone-based material. However, it is to be understood that the present disclosure is not so limited. The first seal 210' may be made of any type of material or combination of materials. For instance, the first seal 210' may be formed of a first material and a second material different from the first material.

II. Water Treatment Chamber Materials

The water treatment chamber 245 in the illustrated embodiments of FIGS. 6-9 may be constructed in a variety of ways, using a variety of materials. The materials that form the water treatment chamber 245 may provide surfaces that are UV reflective. The entire interior surface of the water treatment chamber 245 may be reflective with respect to UV light, or portions of the interior surfaces may be reflective with respect to UV light.

A UV reflective surface can be positioned to reflect UV radiation back toward the water to be purified, to enhance the level of UV radiation within the water sample or to make more efficient use of the UV radiation generated by the source of UV radiation. Compositions to provide a target level of UV reflectance for use in water treatment systems may be utilized. In the illustrated embodiments, compositions may be provided that are suitable for direct contact with water to be purified.

For instance, as depicted in the illustrated embodiment of FIG. 6, the water treatment chamber 245 may include a reactor body 201 and a laminar flow element 216 constructed of a diffusive reflective material, such as PTFE, which provides a reflectivity of at least 80%-90%. The diffusive reflective material may facilitate reflection of light or other waves or particles from a surface such that a ray incident on the surface is scattered at many angles (rather than at just one angle as in the case of specular reflection).

As another example, as depicted in the illustrated embodiment of FIG. 7, the water treatment chamber 245 may include a reactor body 201 and a laminar flow element 216 constructed of a specular reflective material, such as stainless steel. The reactor body 201, for instance, may be manufactured from stainless steel tube that is cut to length and deburred. The reactor body 201 may be polished for greater reflectivity than otherwise without the polishing. The reactor body 201, in one embodiment, may be a tube formed by rolled sheets. The laminar flow element, in one embodiment, may be manufactured from stainless steel sheet stock that is stamped and/or die cut to provide a specified shape and construction in accordance with one embodiment.

The specular reflective material may be constructed to provide a mirror-like reflection of waves, such as the UV light, from the surface thereof. Each incident ray of light may be reflected at the same angle to the surface normal as the incident ray, but on the opposing side of the surface normal in the plane formed by incident and reflected rays. The general result is that an image reflected by the surface is reproduced in mirror-like (specular) manner.

The water treatment chamber 245, in the illustrated embodiment of FIG. 8, may be constructed in part of a quartz tube, potentially pure quartz, and stainless steel. For instance, the reactor body 201 may be constructed of quartz tube, and the laminar flow element 216 may be manufactured from stainless steel. The use of quartz tube in the illustrated embodiment may substantially achieve total internal reflection with respect to UV light provided by the UV light source assembly 208 and the UV light sources 234.

In an alternative embodiment, one or both of the components defining the internal surfaces of the water treatment chamber 245 may be coated to facilitate reflection of UV light within the water treatment chamber 245. For instance, in the illustrated embodiment of FIG. 9, the reactor body 201 may be metal coated quartz (e.g., aluminum oxide coated quartz). The coating on one or more of the components may be disposed to define an internal surface of the water treatment chamber 245. Additionally, or alternatively, the coating on one or more of the components may be disposed on a surface of the component opposite a surface of the component that defines a portion of the internal surface of the water treatment chamber 245. To provide an example, the metal coated quartz used for the reactor body 201 in the illustrated embodiment may be coated on its outside surface such that the internal surface of the quartz tube is in direct contact with water provided in the water treatment chamber 245. A coating applied to a component that defines at least a portion of an internal surface of the water treatment chamber 245 may be internal to the component, such as in the case of the component being formed of two or more laminated materials, one or more of which may be coated on one or both sides.

In the illustrated embodiment of FIG. 9, the laminar flow element 216 may be formed of stainless steel, similar to the embodiment described in connection with FIGS. 7 and 8. It is to be understood that the reactor body 201 and the laminar flow element 216 need not be the same material. One of the reactor body 201 and the laminar flow element 216 may be formed of another material or combination of materials.

Figure 39:
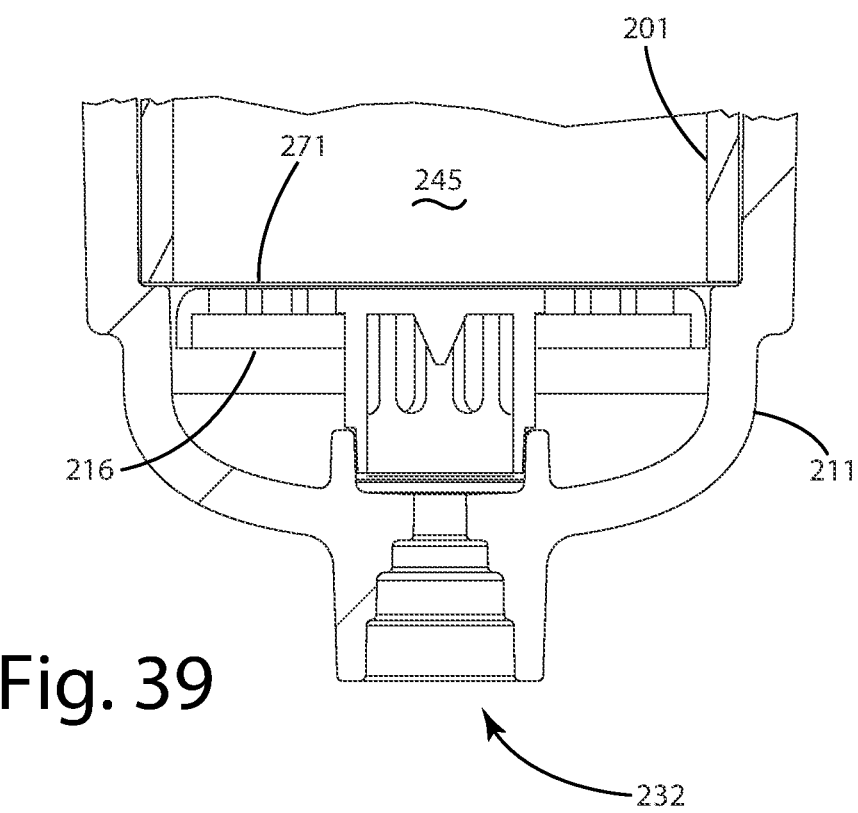
FIG. 39 shows a partial, sectional, and expanded view of the UV reactor in accordance with one embodiment.
Figure 40:
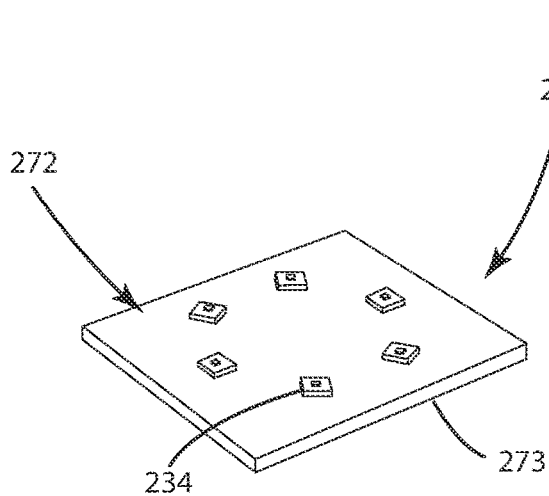
FIG. 40 shows a printed circuit board assembly in accordance with one embodiment.

In the illustrated embodiment of FIG. 39, the laminar flow element 216 is depicted with a reflective material 271 disposed on or coating a substrate component of the laminar flow element. For instance, the substrate of the laminar flow element 216 may be a non-reflective polymer, and the reflective material 271 may be a reflective material, such as expanded PTFE (e.g., an expanded PTFE film), or PTFE, that is bonded to the substrate material. The reflective material may be diffusive or specular. As discussed herein, the laminar flow element 216 may be constructed entirely from a reflective material rather than being formed of a reflective material 271 bonded to a substrate material.

Figure 38:
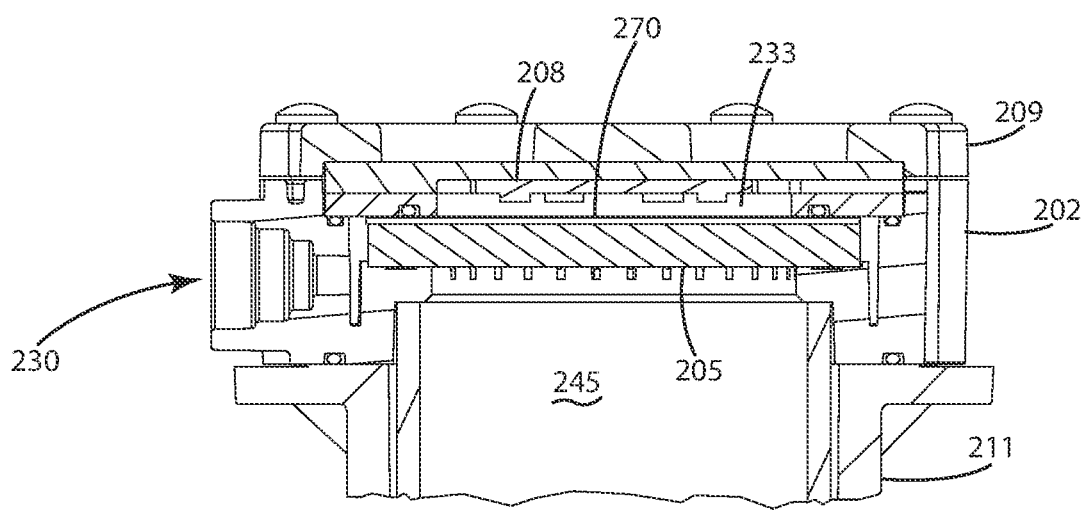
FIG. 38 shows a partial, sectional, and expanded view of the UV reactor in accordance with one embodiment.

The UV transmissive window 205 that forms at least a portion of an internal surface of the water treatment chamber 245, in one embodiment, may be configured to allow UV light into the water treatment chamber 245 but to reflect light internally within the water treatment chamber 245. The UV transmissive window 205, for instance, may be configured to allow UV light to pass substantially in one direction such that UV light can enter the water treatment chamber 245 from the UV light source assembly 208 via the UV transmissive window 205 but UV light directed toward the UV transmissive window 205 from within the water treatment chamber 245 is reflected back within the water treatment chamber 245. In one embodiment, the UV transmissive window 205 as depicted in FIG. 38, includes an anti-reflective coating 270 disposed on a side adjacent to the space 233 (e.g., an air side of the UV transmissive window). The anti-reflective coating 270 may increase UV light throughput, allowing for efficient use of UV light as well as reducing ghost reflection. In one embodiment, if peak UV wavelength is λ, the thickness of the anti-reflective coating 270 (or AR layer) may be an odd integer multiple of λ/4 (e.g., if UV is 265 nm, AR layer thickness can be an odd multiple of 66.25 nm). For material selection, in one embodiment, the anti-reflective coating 270 may have a material refractive index following $n\_AR=\sqrt{(n\_air \cdot n\_quartz)}$, for example n_AR=1.18-1.25, (e.g., F:Al2O3 fluoride doped aluminum oxide).

With reflective components provided in assembly of the water treatment chamber 245, UV light intensity within the water treatment chamber 245 can be maintained efficiently at significant levels (e.g., >5% efficiency improvement with vs. without the AR coating).

The water treatment chamber 245' of the UV reactor 200' in the illustrated embodiments of FIGS. 57-61 may be constructed in a manner similar to the water treatment chamber 245 of the UV reactor 200. For instance, the UV reactor 200' may include a water treatment chamber 245' having an interior surface that is reflective with respect to UV light in order to reflect UV radiation that is received from the UV light source assembly 408. Reflection of such UV radiation may enhance the level of UV radiation with respect to the water present within the water treatment chamber 245', facilitating more efficient use of UV radiation generated by the UV light source. It is noted that UV radiation is described herein as UV light—although the UV radiation or light is substantially invisible to human vision.

Reflectivity of the water treatment chamber 245' may be provided in a variety of ways. As an example, as described herein, materials defining the interior surface of the water treatment chamber 245' may be reflective with respect to UV light. Examples of such materials, as described herein, include PTFE and stainless steel. Additionally, or alternatively, the water treatment chamber 245' may include a quartz tube to facilitate reflection of UV light within the water treatment chamber 245'. Additionally, or alternatively, surfaces of the water treatment chamber 245' may be coated to facilitate reflection of UV light there within.

The laminar flow element 216' of the UV reactor 200' may be constructed in a manner similar to the construction described in conjunction with the laminar flow element 216. For instance, the laminar flow element 216' may be stainless steel. As another example, the laminar flow element 216' may be constructed of more than one material, including a substrate component and a reflective material, such as PTFE, bonded to the substrate material.

The UV transmissive window 205' of the UV reactor 200' may also be constructed in a manner similar to the corresponding component of the UV reactor 200 described herein, including, for example, a quartz construction with an anti-reflective coating.

III. UV Reactor Construction

As described herein, the UV reactor 200 may be constructed in a variety of ways depending on the target use case, such as a flow target and a dosage target for a particular use case.

In one embodiment, the UV reactor 200 is constructed to withstand a target pressure, such as a target pressure considered to be an extreme hydrostatic survivability threshold (e.g., 300 psi). The UV reactor 200, in one embodiment, may be configured to withstand the target pressure in one or more ways, including providing a reactor body support 211 having a tapered wall and/or a curved end to substantially avoid failure points for pressures below the target pressure.

Figure 10A:
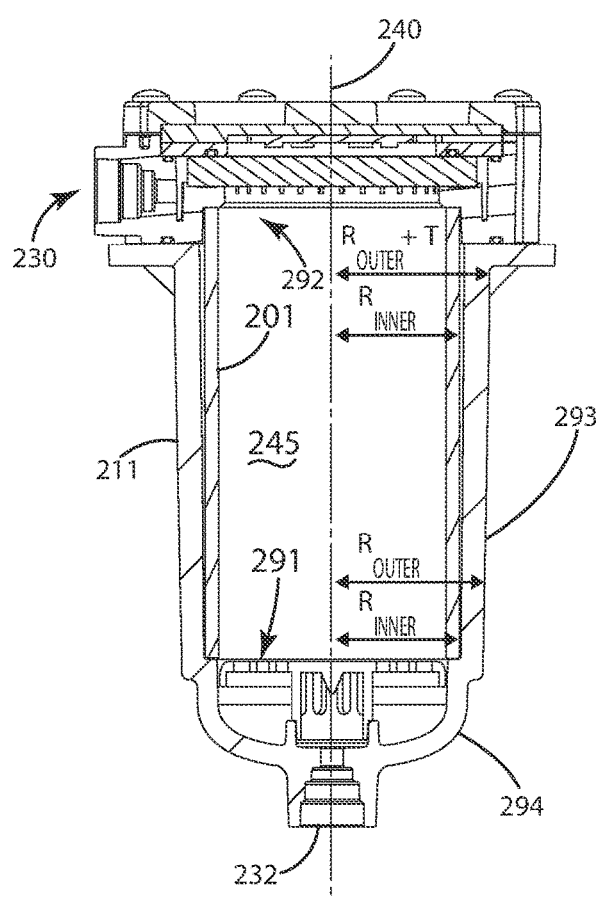
FIGS. 10A and B show a sectional view and a sideview of the UV reactor in accordance with one embodiment.
Figure 10B:
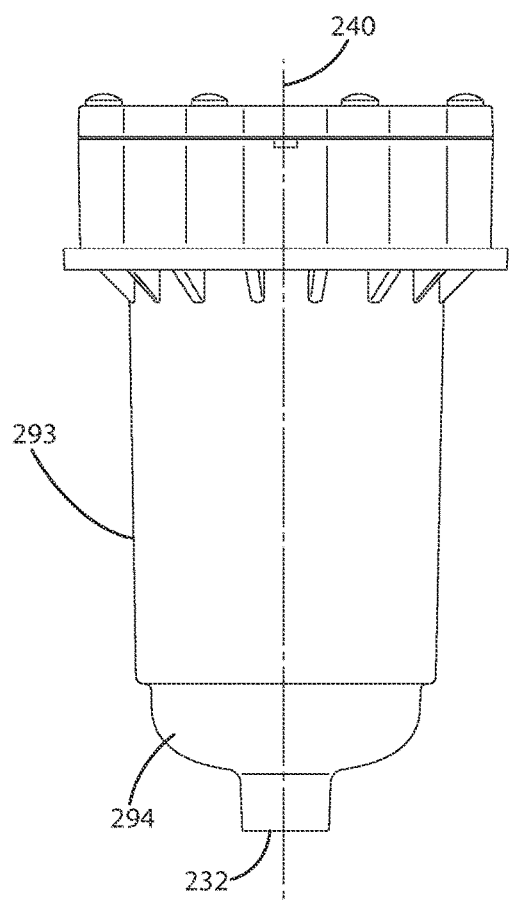
Figure 11:
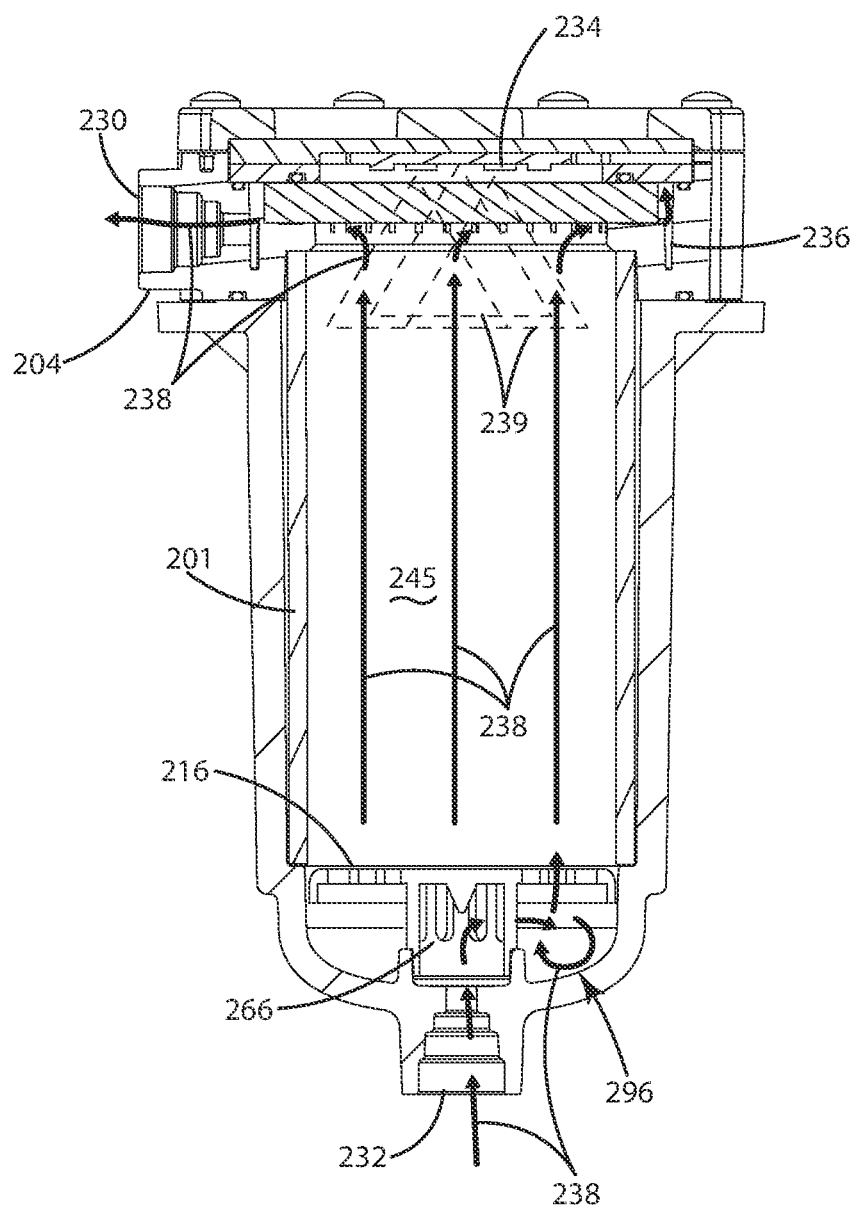
FIG. 11 shows a sectional view of the UV reactor in accordance with one embodiment.

In the illustrated embodiment of FIG. 10, the sidewall 293 of the reactor body support 211 is tapered from the second end 292 to the first end 291 (or relative to the direction of water flow between the UV reactor inlet 232 and the UV reactor outlet 230) of the water treatment chamber 245 along the longitudinal axis 240. The taper, as shown in the illustrated embodiment, is provided with an interior surface of the sidewall 293 of reactor body support 211 being substantially parallel to the longitudinal axis 240 of the UV reactor 200, and the outer surface of the sidewall 293 being farther from the longitudinal axis and farther from the first end 291. For instance, the interior surface of the sidewall 293 may be disposed at a radius R_inner along its length from the first end 291 to the second end 292. The outer surface of the sidewall may be disposed at a radius R_outer proximal to the first end 291 and a radius R_outer+a taper amount proximal to the second end 292. The taper amount and the difference between the R_outer and R_inner values may vary depending on the target pressure.

The reactor body support 211 in the illustrated embodiment may include a curved wall 294 between the first end 291 of the water treatment chamber 245 and the UV reactor inlet 232. The curvature of the curved wall 294 may avoid significant stress on the reactor body support 211 under pressures below the target pressure.

Additionally, or alternatively, one or more aspects of the UV reactor 200 may be varied to account for a target design constraint. For instance, reactor diameter, length, and the diameter to length ratio may be varied in accordance with one or more target design constraints, such as disinfection performance and target flow rate.

In one embodiment, the following equation represents the geometry of the water treatment chamber 245:

$$V = \pi \cdot R^2 \cdot h$$

R is the reactor radius, h is the height of the reactor, V is reactor void volume. The average particle retention time t can be calculated according to the following:

$$t = \frac{V}{Q}$$

where Q is the targeted flow rate (e.g., liter per minute), and V, again, is the reactor void volume. UV optical intensity distribution follows Lambert law of absorption as follows:

$$I(x,y,z) = I_0 \cdot e^{-a \cdot r(x,y,z)}$$

where I(x, y, z) is the light intensity at location (x, y, z) in 3D space, a is light attenuation coefficient, and r(x, y, z) is distance from (x, y, z) to the light source.

Overall UV dose and disinfection efficacy can be determined through total UV fluence:

$$\text{Fluence} = \int \frac{\bar{I}(r)}{\bar{v}(r)} dr$$

where $\bar{I}(r)$ is the average light intensity of a particle travelling for distance of $\Delta r$ in 3D space, and $\bar{v}(r)$ is the average particle velocity of a particle traveling for distance $\Delta r$, which can be defined as follows:

$$\Delta r = \sqrt{\Delta x^2 + \Delta y^2 + \Delta z^2}$$

In one embodiment according to the present disclosure, in order to substantially maximize UV dose (fluence), the following overall relationship is observed:

$$\text{Fluence} \propto \text{Intensity} \cdot \text{Retension Time}$$

$$\max_{R,h} \text{Fluence} \propto I_0 \cdot e^{-m \cdot r(R,h)} \cdot \frac{\pi \cdot R^2 \cdot h}{Q}$$

Therefore, increasing the radius of R and h tends to increase retention time, however, increasing R and h tends also to reduce average UV intensity within the reactor. Also, increasing flow rate Q tends to reduce retention time and therefore reduces overall UV fluences.

Figure 47:
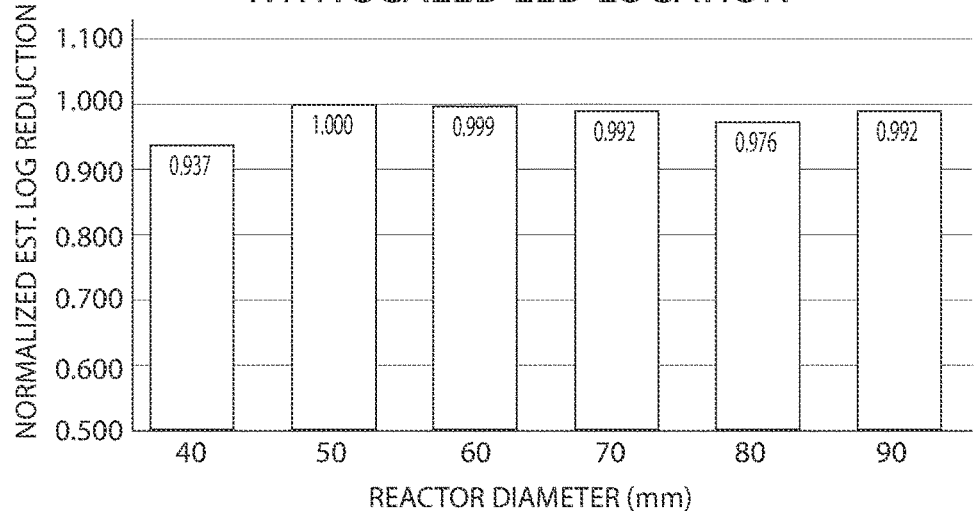
FIG. 47 shows reactor diameter relative to reactor performance in accordance with one embodiment.

At a fixed flow rate of about 0-0.9 gallons per minute and a reactor total length of about 150 mm, the optimized reactor diameter is considered to be >50 mm. 50 mm diameter is determined in order to maintain a small physical footprint of the reactor system, potentially the smallest relative to the identified flow rate and UV dosage constraints. As depicted in the graph of FIG. 47, this yields a small footprint without significantly sacrificing UV dosage.

Figure 48:
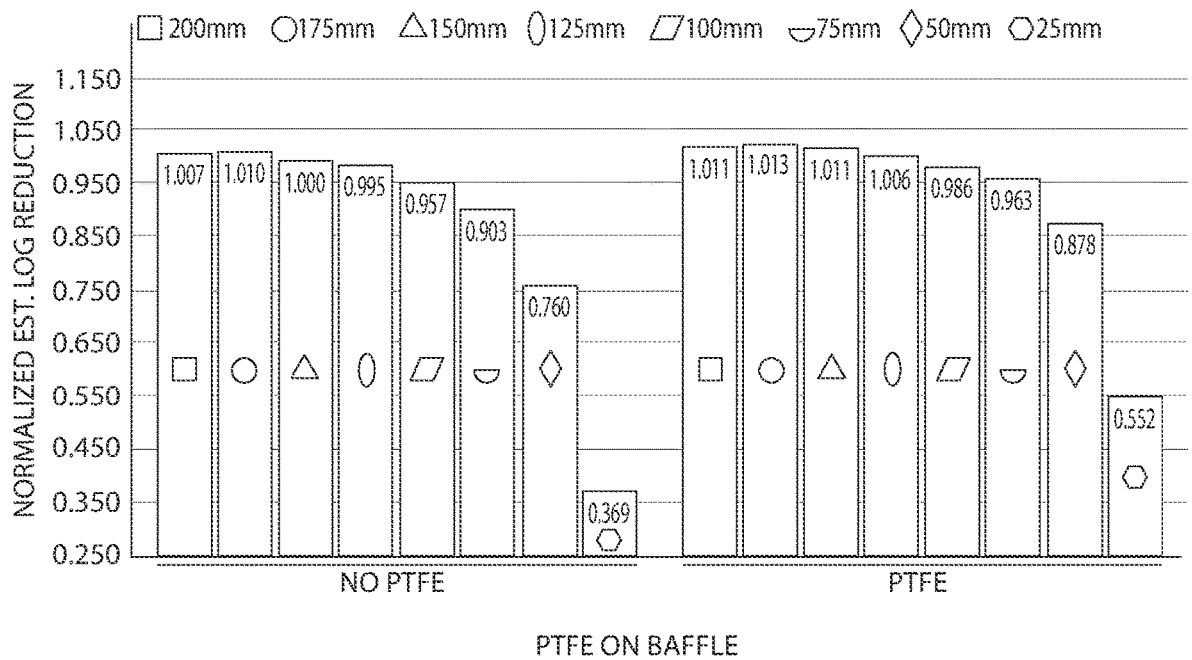
FIG. 48 shows reactor length and reflective properties relative to performance in accordance with one embodiment.

With a fixed reactor diameter of 50 mm, the reactor length has been determined to affect performance as shown in the graph of FIG. 48.

It is noted that without reflective material on the baffle or laminar flow element 216 (e.g., PTFE), disinfection performance drops significantly when the total length is less than 75 mm. In one embodiment, the length of the UV reactor is set to be 100 mm to avoid additional disinfection efficiency loss while maintaining the smallest possible footprint.

Figure 49:
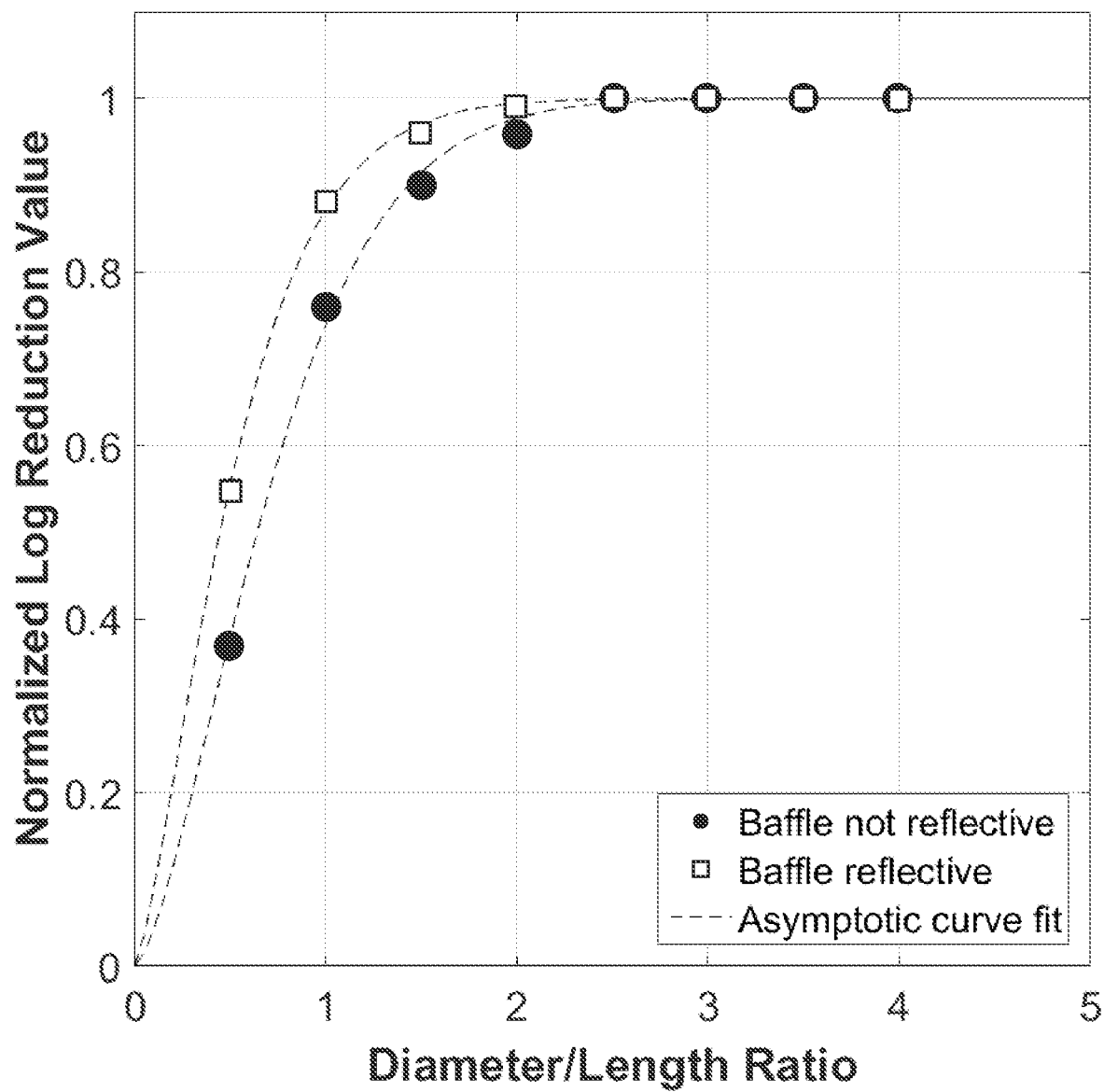
FIG. 49 shows the ratio of diameter and length of the UV reactor relative to performance in accordance with one embodiment.

The ratio between reactor diameter and reactor length has been determined to yield the relationship with disinfection performance (log reduction value) shown in the graph of FIG. 49.

With the upper limit of the reactor diameter/length ratio being about four, two sigmoid functions can be fitted as follows:

For reactor without reflective baffle:

$$LRV = 1 - \exp(-1.343 \cdot \theta^{1.492})$$

For reactor with reflective baffle:

$$LRV = 1 - \exp(-2.050 \cdot \theta^{1.342})$$

where θ is the ratio between reactor diameter and length.

Figure 53:
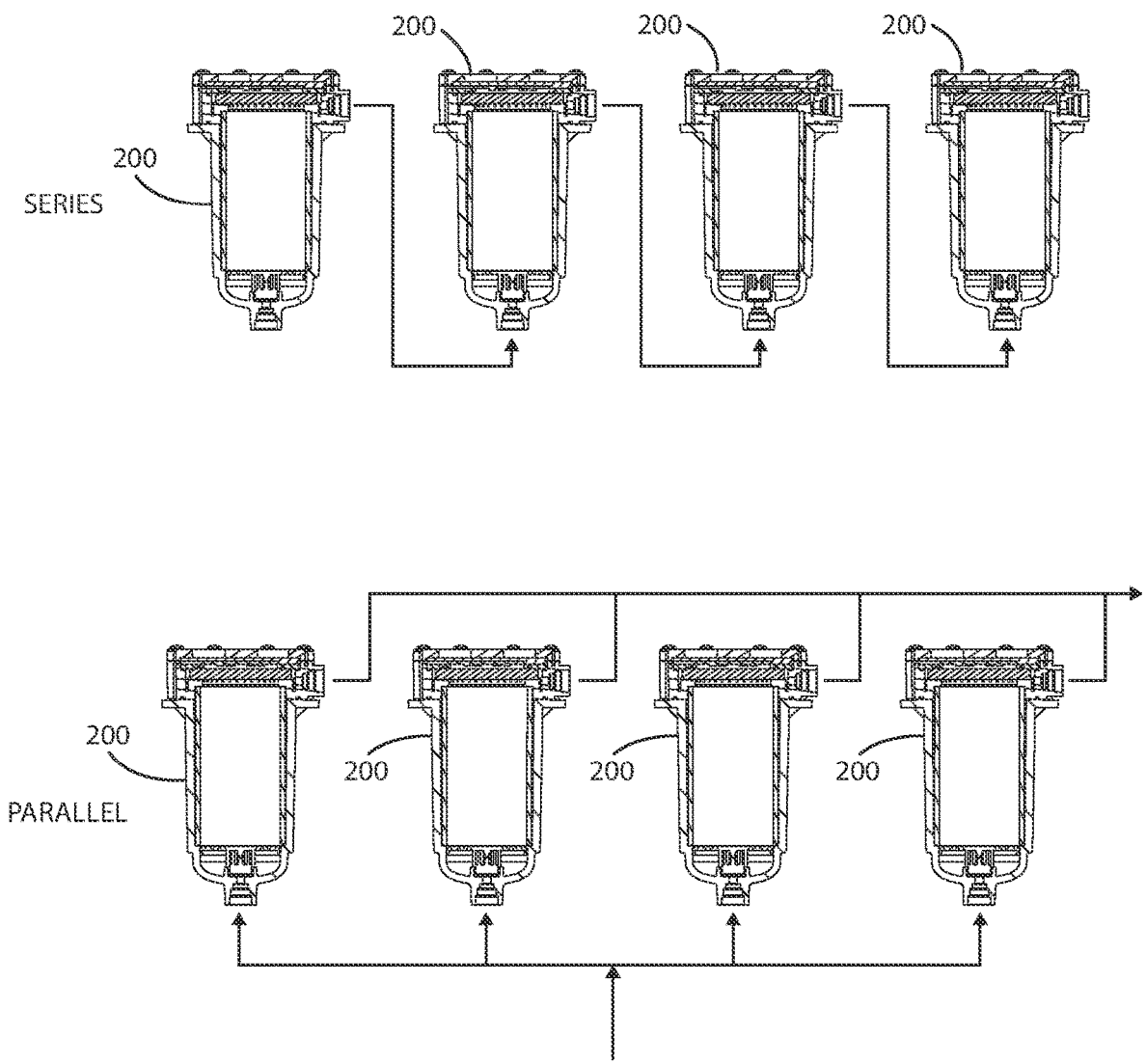
FIG. 53 shows various arrangements of multiple UV reactors in series or parallel in accordance with one embodiment.

For the equivalent size, a single larger reactor is considered to yield better performance than individual small reactors combined—a single 50×100 mm cylindrical reactor outperforms 5 of 10×100 mm cylindrical reactor cells in series or in parallel. However, such a single large reactor may not be an acceptable configuration for some uses, and so multiple individual reactors may be used in conjunction with each other in series or parallel, or a combination thereof. Examples of series and parallel configurations can be seen in the illustrated embodiment of FIG. 53. It is noted that multiple UV reactors 200 can be positioned in series and in parallel with each other, and that series and parallel configurations, or combinations thereof, may be provided based on flow and dosage specifications for an application. Series configurations may provide additional UV dosing (e.g., total system dose=single reactor dose times the number of single reactors), whereas parallel configuration may yield increased flow.

IV. Water Flow Path and UV Light Path

As discussed herein, the UV reactor 200, 200' may be configured to utilize the water flowing through the UV reactor 200, 200' as a medium for cooling the UV light source that substantially disinfects the water. In the illustrated embodiment of FIGS. 11 and 64-66, the water flow path 238, 238' is shown from the UV reactor inlet 232, 232' to the UV reactor outlet 230, 230' with the UV light path 239, 239' within the water treatment chamber 245, 245'.

The laminar flow element 216, 216' is provided within the flow path of water within the UV reactor 200, 200' to form substantially laminar flow of water downstream of the laminar flow element 216, 216' and within the water treatment chamber 245, 245'. This laminar flow of water within the water treatment chamber 245, 245' is aligned substantially with the UV light path 239, 239' for efficient dosing of the water flowing through the water treatment chamber 245, 245'. The UV intensity relative to the UV light path 239, 239' is shown in further detail in the illustrated embodiment of FIG. 19, with the UV intensity shown in a unitless form as determined after a logarithmic operation. The UV intensity shown in FIG. 19 can be converted to mJ/cm^2 by applying the intensity shown as an exponent of 10 (e.g., 10^A with A being the UV intensity value shown in FIG. 19). It is noted that the laminar flow element 216, 216', in one embodiment, may provide water to the water treatment chamber 245, 245' such that one or more fluid outlets of the laminar flow element 216, 216' may form a fluid inlet for the water treatment chamber 245, 245'.

Figure 19:
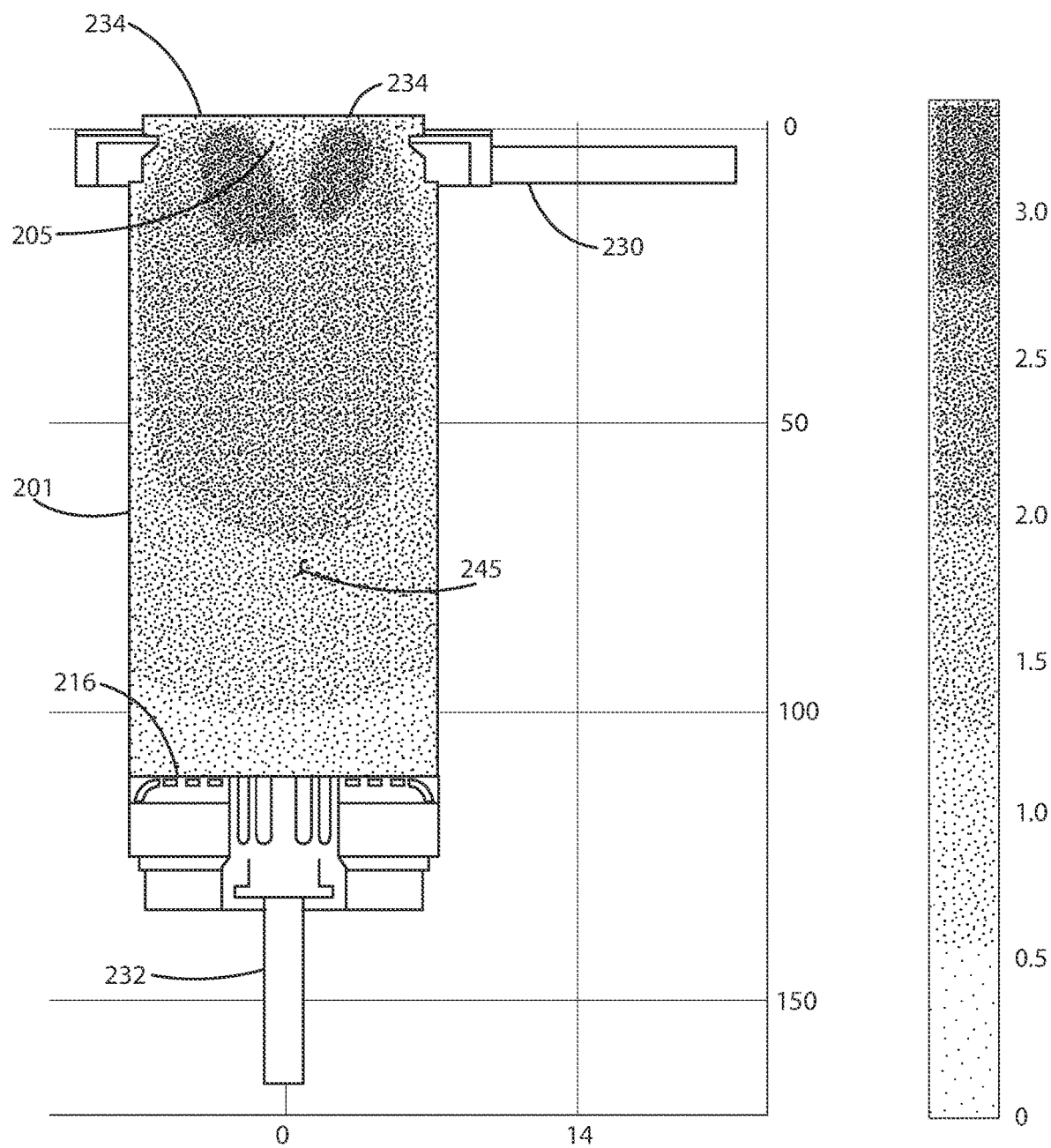
FIG. 19 shows UV intensity within the UV reactor in accordance with one embodiment.

The UV light path 239, 239' and the intensity thereof, as depicted in the illustrated embodiment of FIG. 19, may be a function of the number and placement of the UV light sources 234 with respect to the UV transmissive window 205, 205' and the UV light source assembly 208, 408.

Figure 45:
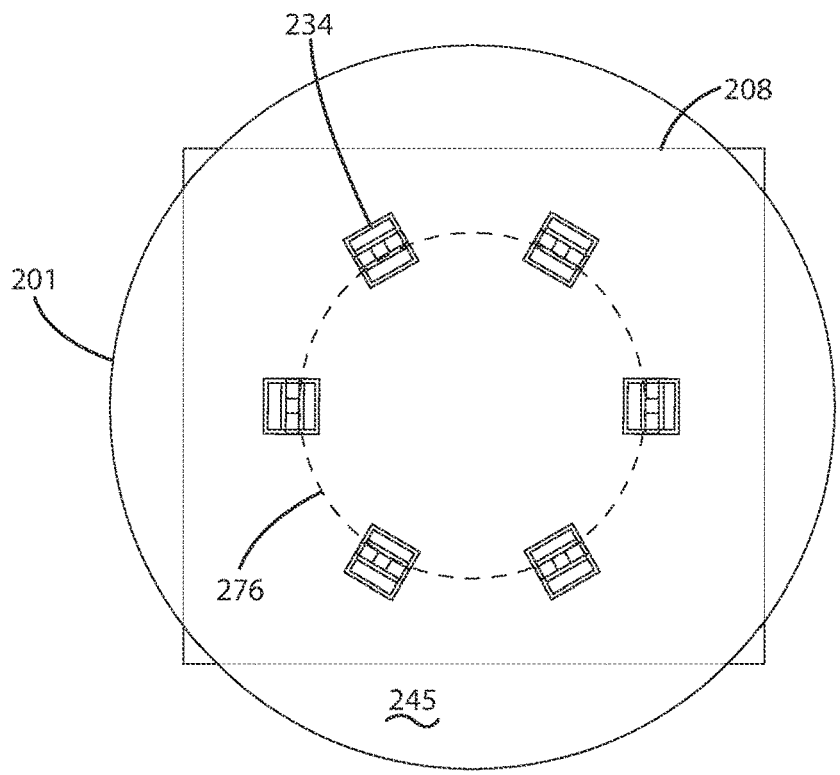
FIG. 45 depicts a top view of a printed circuit board assembly in accordance with one embodiment.

For instance, the UV light sources 234 may be placed near the middle (or within 20% range of middle) of the radius of the reactor body 201, 201'. In other words, the UV light sources may be substantially disposed at a radius ½ the radius of the reactor body 201, 201'. This radius at ½ the radius of the reactor body 201, 201' is designated 276 in the illustrated embodiment of FIG. 45.

Figure 46:
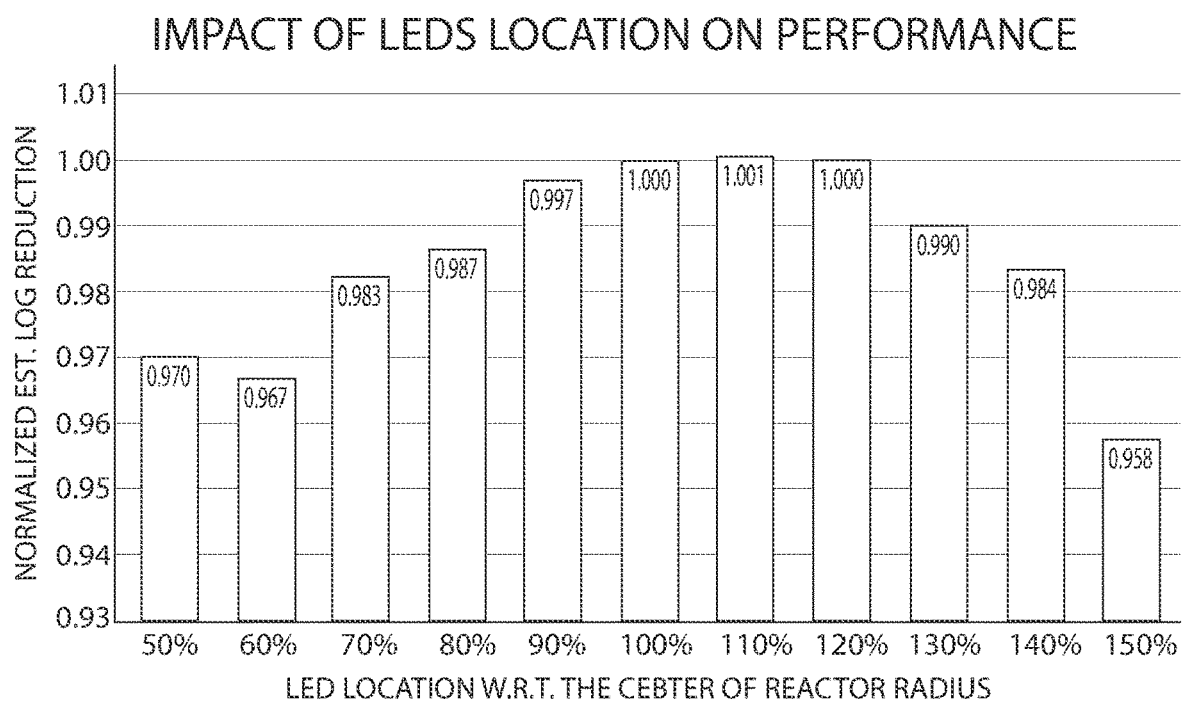
FIG. 46 shows a graph of locations of UV light sources on the printed circuit board assembly relative to reactor performance in accordance with one embodiment.

In one embodiment, the UV light sources 234 may be disposed uniformly (e.g., an evenly spaced pattern) about the radius 276. This configuration, in one embodiment, may provide an optimized disinfection configuration. In one embodiment, changing the position of the UV light sources 234 relative to the radius 276 may affect performance as shown in the graph of FIG. 46. The percent shown in the X-axis is relative to the radius 276, which as mentioned above is defined as ½ the radius of the reactor body 201, 201' in one embodiment. As can be seen in the graph of FIG. 46, placing the UV light sources directly in the center of the UV light source assembly 208 may not appreciably improve disinfection performance over the ½ radius positioning relative to the reactor body 201, 201'.

Figure 41:
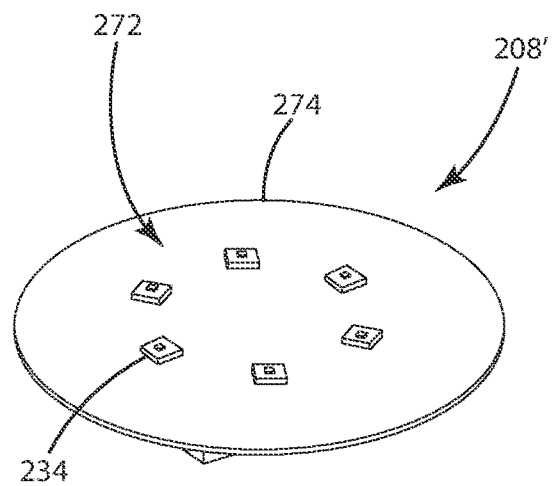
FIG. 41 depicts the printed circuit board assembly of FIG. 41 with a reflector in accordance with one embodiment.

In one embodiment, the UV light source assembly 208 may include one or more reflectors 274, 275 disposed to reflect light from the UV light source configuration 272 toward the water treatment chamber 245, 245'. For instance, in the illustrated embodiment of FIG. 41, the reflector 274 is in the form of a sheet disposed over the PCB assembly 273 on a side facing the water treatment chamber with apertures corresponding to each of the UV light sources 234 to avoid blocking the UV light sources 234 and to allow the UV light sources 234 to direct UV light toward the water treatment chamber 245, 245'. The reflector 274 may be formed of a reflective material, similar to those described in conjunction with the reactor body 201, 201' and including, for example, PTFE or polished aluminum.

Figure 42:
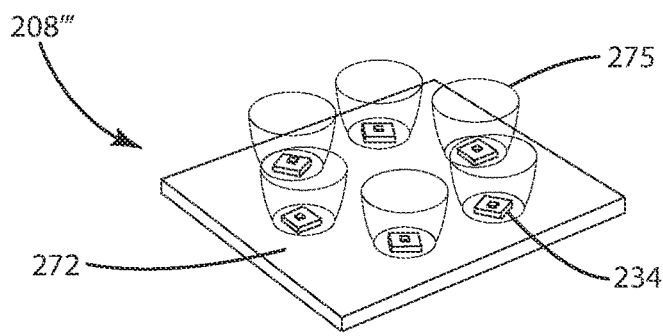
FIG. 42 shows the printed circuit board assembly of FIG. 41 with a reflector in accordance with one embodiment.
Figure 43:
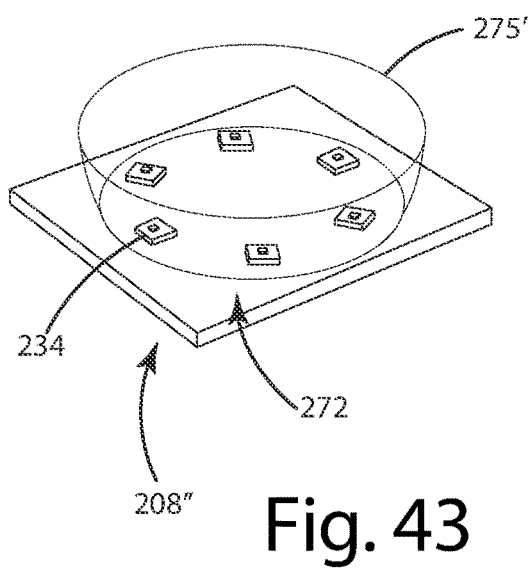
FIG. 43 shows the printed circuit board assembly of FIG. 41 with a reflector in accordance with one embodiment.
Figure 44:
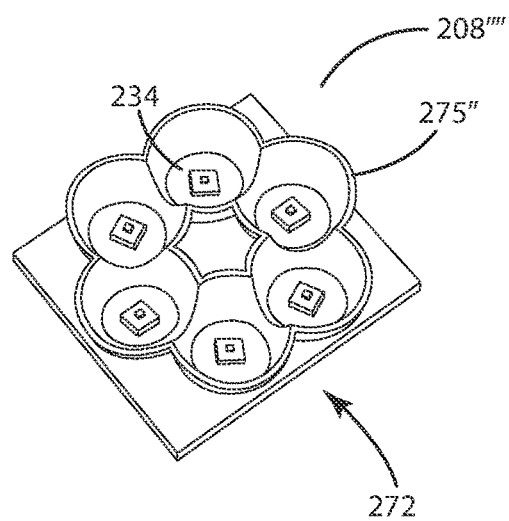
FIG. 44 shows the printed circuit board assembly of FIG. 41 with a reflector in accordance with one embodiment.

Additionally or alternatively with respect to the reflector 274, the UV light source assembly 208, 208', 208" may include a reflector 275 disposed to direct light from the UV light sources 234 to the water treatment chamber 245, 245'. The reflector 275 may be conical or parabolic, and may surround one or more UV light sources 234. For instance, the reflector 275' in the illustrated embodiment of FIG. 43 is disposed about all of the UV light sources 234 of the UV light source configuration 272; alternatively, as shown in the illustrated embodiments of FIGS. 44 and 42, there may be multiple reflectors 275, 275''' (joined with each other or separate from each other) that are associated respectively with each of the UV light sources 234 of the UV light source configuration 272.

In one embodiment, the reflector may be notched for the UV light sources 234, with either a flat reflective sheet or alternatively cone/parabolic collectors per UV light source 234, or a single, larger cone/collector for the UV light source configuration 272 (e.g., an LED array).

In the illustrated embodiment, the UV reactor 200, 200' includes the deflector 266 provided in the water flow path 238, 238' upstream of the water treatment chamber 245, 245' to generate turbulence flow within a turbulent flow region 296, 296' prior to flowing through the laminar flow element 216, 216'. The deflector 266, 266A', 266B', in one embodiment as discussed herein, may include a projection 263, 263' operably positioned directly within the flow path of water passing through the UV chamber inlet 232, 232' to facilitate changing the direction of flow in turbulent manner, and one or more vents peripherally disposed about the projection 263, 263' to facilitate directing water in a turbulent manner into the turbulent flow region 296, 296'. The turbulent flow region 296, 296' may be defined in part by the curved wall 294, 294' to further enhance turbulence within the turbulent flow region 296, 296'.

By providing a turbulent flow of water within the turbulent flow region 296, 296' directly upstream of the laminar flow element 216, 216', water is more evenly distributed across the flow paths of the laminar flow element 216, 216'. As a result, the flow rate of the water flowing within the water treatment chamber 245, 245' is more even. In other words, the flow rate of water flowing through a plane normal to the longitudinal axis 240, 240' of the UV reactor 200, 200' and within the water treatment chamber 245, 245' is more even than if the deflector 266, 266A', 266B' and turbulent flow region 296, 296' were absent. The flow velocity (m/s) and flow path of water through the UV reactor 200 is shown in the illustrated embodiment of FIG. 20, with the flow path and the flow velocity of water within the water treatment chamber 245 being respectively laminar and substantially uniform. The flow velocity and flow path of water through the UV reactor 200' may be similar.

In one embodiment, the laminar flow element 216, 216' may prevent regions of high flow velocity within the water treatment chamber 245, 245', particularly proximal to the UV transmissive window 205, 205'. Such high flow velocity regions may reduce the exposure time for any microorganisms present in the water flowing through the region. In other words, the laminar flow element 216, 216' may reduce the flow velocity through the water treatment chamber 245, 245', relative to no laminar flow element 216, 216' being present, as the flow approaches the UV transmissive window 205, 205'. Near or proximal to the UV transmissive window 205, 205', the intensity of UV energy in the water treatment chamber 245, 245' may be greater than the intensity of UV energy in other areas of the water treatment chamber 245, 245', as shown in FIG. 19 with the intensity values shown in the figure being convertible to mJ/cm^2 as described herein. By reducing the flow velocity through the water treatment chamber 245, 245' with the laminar flow element 216, 216', 205' as compared to no laminar flow element 216, 216' being present, water flowing proximal to the UV transmissive window 205, 205' may receive greater exposure to UV energy in order to prolong, potentially maximize, UV exposure to microorganisms carried in the water flowing through the water treatment chamber 245, 245' and proximal to the UV transmissive window 205. In this sense, the laminar flow element 216, 216' may be considered a flow restrictor to reduce the flow velocity of water through the water treatment chamber 245, 245'. In the illustrated embodiment of FIG. 20, the laminar flow element 216, 216' may potentially reduce the inlet velocity of 1.2-1.6 m/s to 0.6-1.0 m/s within the water treatment chamber 245, 245'. The laminar flow element 216, 216' in one embodiment may be configured as a flow restrictor without providing significant functionality related to facilitating laminar flow through the water treatment chamber 245, 245'. In one embodiment, the laminar flow element 216, 216' may be operable to enhance disinfection performance based on providing substantially even flow through the water treatment chamber 245, 245' and restricting flow through the water treatment chamber 245, 245'.

The laminar flow element 216 is shown in further detail in accordance with one embodiment in the illustrated embodiments of FIGS. 30-34 and 37. The laminar flow element 216, as discussed herein, includes a deflector 266 integrated therein. The deflector 266 may be separate from the laminar flow element 216 in an alternative embodiment. The deflector 266 in the illustrated embodiment includes a projection 263 disposed in the flow path of water flowing through the UV reactor inlet 232. This way, the projection 263 is operable to deflect water radially relative to the longitudinal axis 240 of the UV reactor 200. The deflector 266 may also include a plurality of deflector flow paths 298 defined by extensions 264 extending from a surface of the laminar flow element toward the UV reactor inlet 232. The plurality of deflector flow paths 298 may be arranged in an annular configuration about the projection 263 so that water is guided radially and turbulently relative to the longitudinal axis 240. The length of the extensions 264 and the spacing therebetween, as well as the size and angle of the projection 263, may affect the degree of turbulence generated in the turbulent flow region 296 and the flow rate through the deflector 266.

Figure 34:
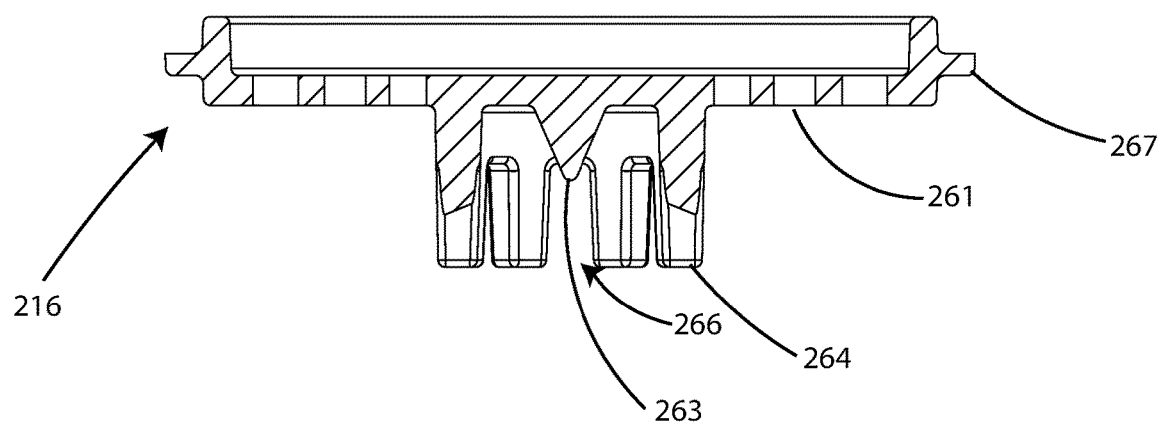
FIG. 34 shows a sectional view of the laminar flow element in FIG. 33 according to the sectional line.
Figure 35:
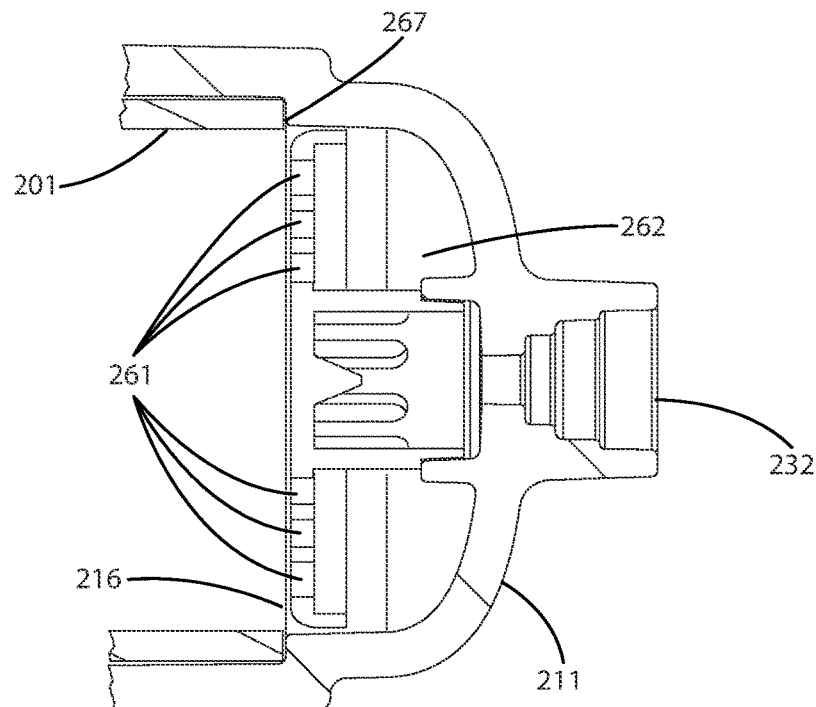
FIG. 35 shows a partial, sectional, and expanded view of the UV reactor in accordance with one embodiment.
Figure 36:
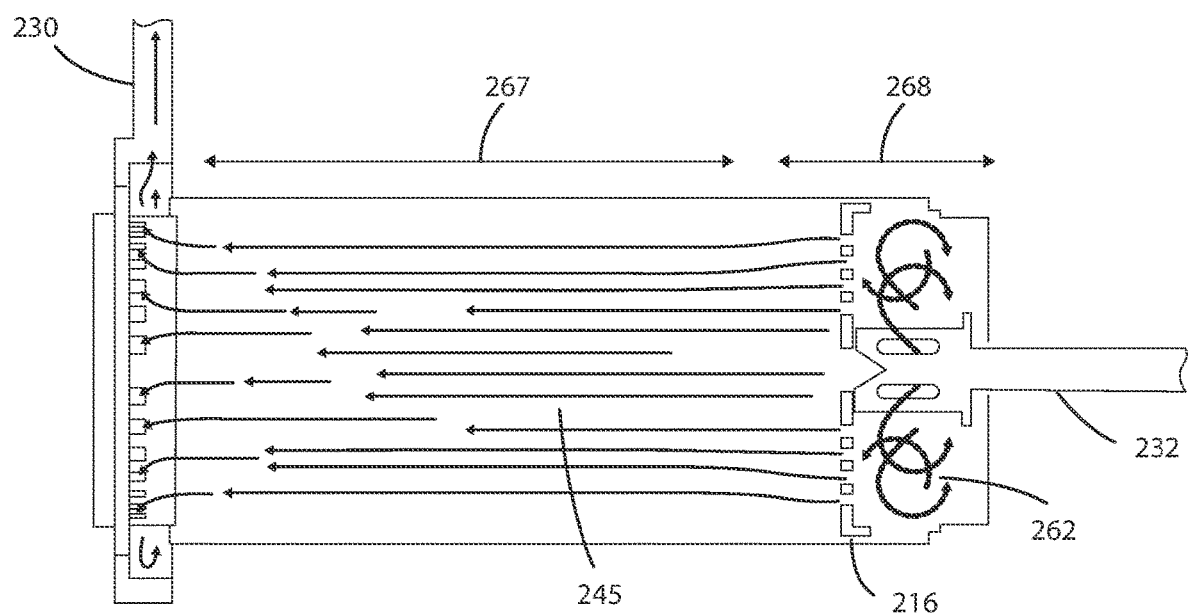
FIG. 36 shows a laminar flow and turbulent flow regions of the UV reactor in accordance with one embodiment.

The laminar flow element 216 in the illustrated embodiment of FIG. 34 includes a flange 267 operable to seat against a ledge of the reactor body support 211, and held in place by the reactor body 201. In other words, the flange 267 may be sandwiched by the ledge of the reactor body support 211 and the reactor body 201.

The laminar flow element 216 may include a laminar flow path 260 defined by a plurality of openings 261 through the laminar flow element 216. The laminar flow element 216 may include a laminar flow keepout region 265 defined in accordance with one or more embodiments described herein, in which the laminar flow path 260 is absent. In the illustrated embodiment, the laminar flow keepout region 265 may prevent direct flow of water into the water treatment chamber 245 through the laminar flow keepout region 265. The laminar flow keepout region 265 in the illustrated embodiment intersects the longitudinal axis 240 of the UV reactor 200 and aligns generally with the central area of the water treatment chamber 245. Because water flowing through the water treatment chamber 245 proximal the longitudinal axis 240 (including proximal to the laminar flow keepout region 265) has less resistance than water flowing closer to the interior side surface of the water treatment chamber 245, by preventing direct flow of water through the laminar flow keepout region 265, the flow rate of water through the water treatment chamber 245 may be more evenly distributed, as depicted in the illustrated embodiment of FIG. 20. The laminar flow keepout region 265 may be larger in diameter than the UV reactor inlet 232 to substantially prevent direct flow of water through the UV reactor inlet 232 into the water treatment chamber 245.

In the illustrated embodiments of FIG. 37A-D, various configurations of the laminar flow path 260 are shown in conjunction with the laminar flow keepout region 265. The laminar flow path 260 may include a plurality of openings 261. In the illustrated embodiment of FIG. 37A, first and second concentric paths 268, 269 are provided about the laminar flow keepout region 265. The openings 261 may be distributed evenly or symmetrically along the first concentric path 268 and the second concentric path 269 to form the laminar flow path 260. The openings 261 on the second concentric path 269 located farther from the center of the laminar flow element 216 or the laminar flow keepout region 265 may be larger than the openings 261 on the first concentric path 268, which is closer to the center of the laminar flow element 216 or the laminar flow keepout region 265. Likewise, each additional concentric path that is farther from the center of the laminar flow element 216 or the laminar flow keepout region 265 than another concentric path may include openings 261 that are larger. This progression of larger openings 261 with respect to the distance from the center of the laminar flow element 216 or the laminar flow keepout region 265 may facilitate providing a more even flow rate through the laminar flow element 216 and a more even flow rate through the water treatment chamber 245 (in addition to providing laminar flow). It is to be understood that the openings 261 may be different sizes as discussed herein; however, the openings 261 may be the same size in an alternative embodiment.

Figures 37A, 37C:
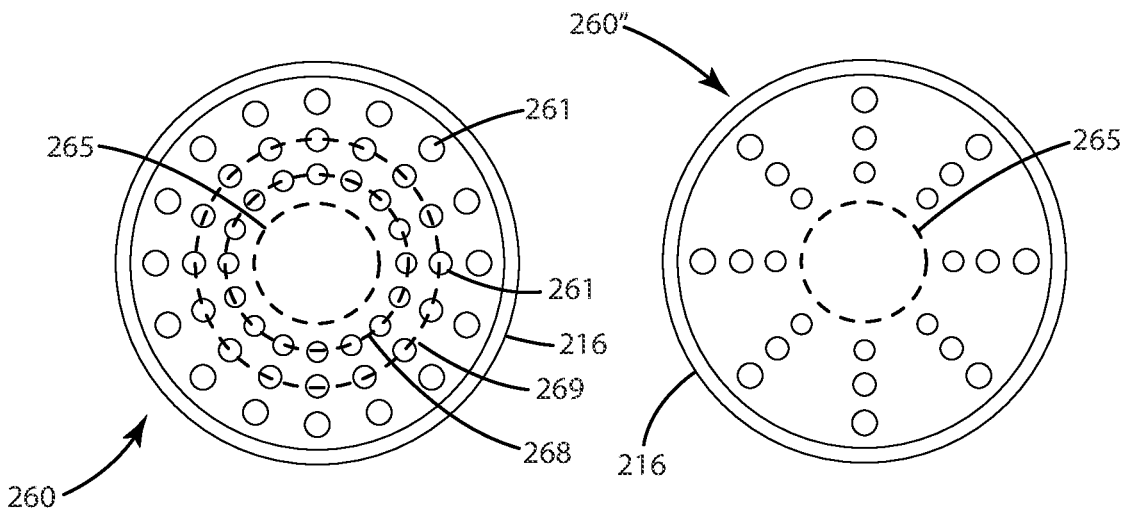
FIG. 37A depicts a top view of the laminar flow element in accordance with one embodiment.
FIG. 37C depicts a top view of the laminar flow element in accordance with one embodiment.
Figures 37B, 37D:
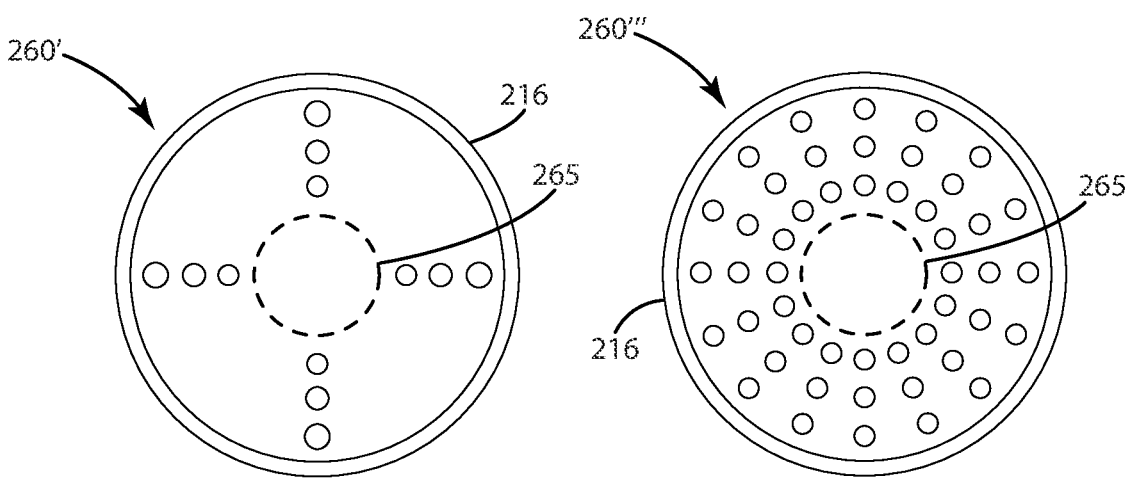
FIG. 37B depicts a top view of the laminar flow element in accordance with one embodiment.
FIG. 37D depicts a top view of the laminar flow element in accordance with one embodiment.

The spacing, size, and number of openings 261 in the laminar flow element 216 may vary from application to application, depending on factors such as a target flow rate and target uniformity of flow rate within the water treatment chamber 245. Examples of different spacing among the concentric paths for the laminar flow paths 260', 260", 260''' are shown in the illustrated embodiments of FIGS. 37B-D relative to FIG. 37A. For purposes of disclosure the concentric paths are not designated in FIGS. 37B-D; but it is to be understood that the concentric paths may be defined as shown in FIG. 37A.

In one embodiment, incorporation of the laminar flow element 216 (e.g., a baffle) in conjunction with correspondingly placed UV reactor inlet 232 and deflector 266 for flow to be perpendicular to the baffle surface may provide a two-zone reactor, with the water treatment chamber 245 and the turbulent flow region 296 corresponding to the two zones. The turbulent flow region 296 or zone facilitates slowing down fast "jets", and the water treatment chamber 245 may provide a pseudo laminar zone for uniform UV light exposure and disinfection.

To reduce overall system pressure drop across the laminar flow element 216, the sum of baffle opening areas of the openings 261 may be larger than the cross-sectional area of the UV reactor inlet 232:

$$A_{inlet} < \sum_{i}^{N} a_i$$

where $A_{inlet}$ is the cross-sectional area of inlet, $a_i$ is the individual opening area on the baffle, and N is the number of openings on the baffle.

In the illustrated embodiment, the pattern of openings 261 of the laminar flow path 260 may be concentric around the center of the laminar flow element 216 while being progressively larger the farther from the center. Alternatively, the openings 261 may be uniformly sized. In one embodiment, the pattern of the openings 261 may be uniformly distributed or centered around the center of the laminar flow element. No openings may be disposed above the location of the perpendicular flow from the deflector 266 (e.g., an inlet baffle) in the laminar flow keepout region 265. This keepout zone may be larger than the diameter of the UV reactor inlet 232.

As described herein, the laminar flow element 216' may be configured substantially similar to one or more embodiments described in conjunction with the laminar flow element 216, with the addition of deflectors 266A, B disposed on opposing sides of the laminar flow element 216. The deflectors 266A, B may each be similar to the deflector 266 described in conjunction with the laminar flow element 216. It is also noted that the laminar flow element 216' may include features similar to those of the laminar flow element 216, including, for instance, various configurations of the openings 261 and flange 267. The pair of deflectors 266A', 266B' in the illustrated embodiment of FIGS. 64-66 may enable the laminar flow element 216' to be installed without regard for which side is facing the upstream flow of water. This way, incorrect installation can be avoided with respect to orientation of the laminar flow element 216'.

Turning to the illustrated embodiment of FIGS. 12 and 63-66, the water path 238, 238' includes water flowing through a plurality of chamber outlets 246, 246' (arranged in a chamber outlet configuration 235, 235') into a thermal exchange region 236, 236' and then to the UV water outlet 230, 230'. The thermal exchange region 236, 236' may be annular and surround the second end 292, 292' of the water treatment chamber 245, 245', as discussed herein.

The thermal exchange region 236, 236' may provide the water flow path 238, 238' in direct contact with the water facing thermal coupler 206, 406, which in turn is thermal coupled to the source-side thermal coupler 207, 407. The source-side thermal coupler 207, 407 is configured as discussed herein to facilitate heat flow from the UV light sources 234 to the water facing thermal coupler 206, 406 and ultimately to the water flowing through the thermal exchange region 236, 236'. This heat flow path is designated 241 in the illustrated embodiment of FIG. 12 and shown with arrows leading from the UV light sources 234 to the thermal exchange region 236. Optionally, as discussed herein, the source-side thermal coupler 207, 407 may be disposed in thermal communication with the surrounding air via thermal paths 221 so that heat from the UV light sources 234 may be dissipated into the surrounding air via convection.

In one embodiment, the heat flow path 241 proceeds as follows: rear-side or back of the plurality of UV light sources 234; a thermal component (e.g., metal cladding) of the UV light source assembly 208; thermal paste (or pad or adhesive); the source-side thermal coupler 207 (e.g., a PCB assembly back support [such as, aluminum or copper or thermal plastic]); the water facing thermal coupler 206, such as a support ring for the UV transmissive window 205, that can be stainless-steel or "lead free" brass for direct water contact without substantial leaching of toxic substances into water); and the thermal exchange region 236 also described as a water outlet collection trough.

Optionally, heat may be dissipated from the plurality of UV light sources 234 via a convection cooling pathway designated 242 in the illustrated embodiment. The convection cooling pathway 242 for heat proceeds as follows in accordance with one embodiment: the rear-side or back of each of the plurality of UV light sources 234; a thermal component (e.g., metal cladding) of the UV light source assembly 208; thermal paste (or pad or adhesive); the source-side thermal coupler 207; and the air or environment via the thermal paths 221.

Figure 12:
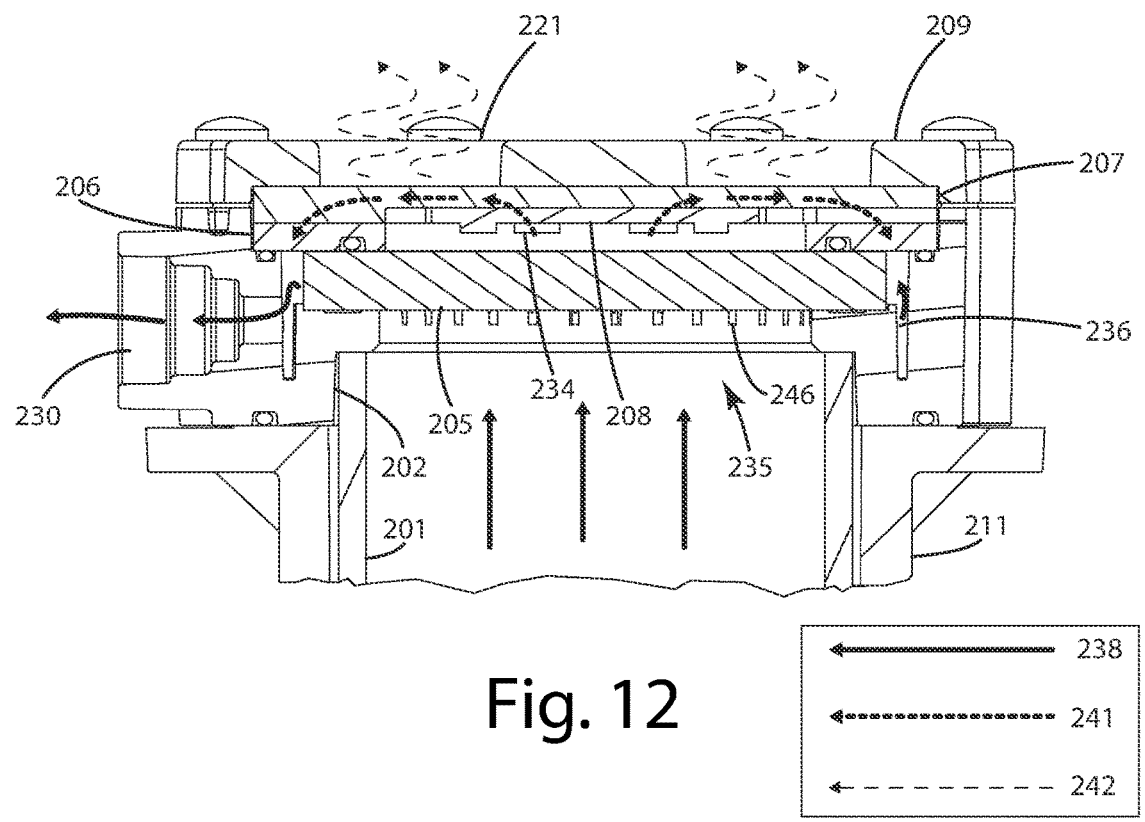
FIG. 12 shows an expanded, partial, and sectional view of the UV reactor in accordance with one embodiment.
Figure 13:
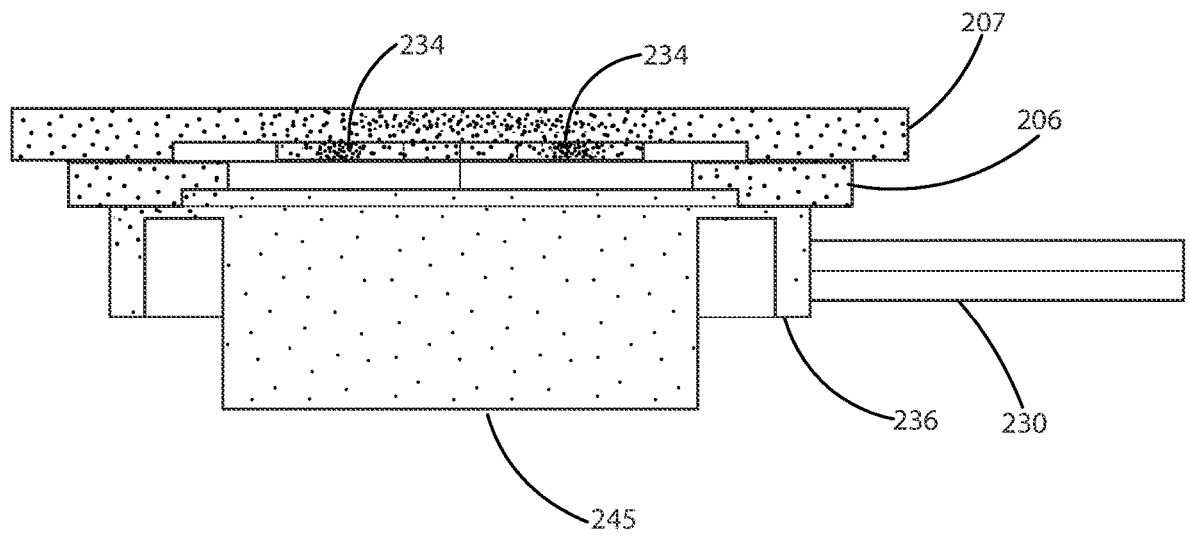
FIG. 13 shows a temperature profile of the UV reactor in accordance with one embodiment.
Figure 14:
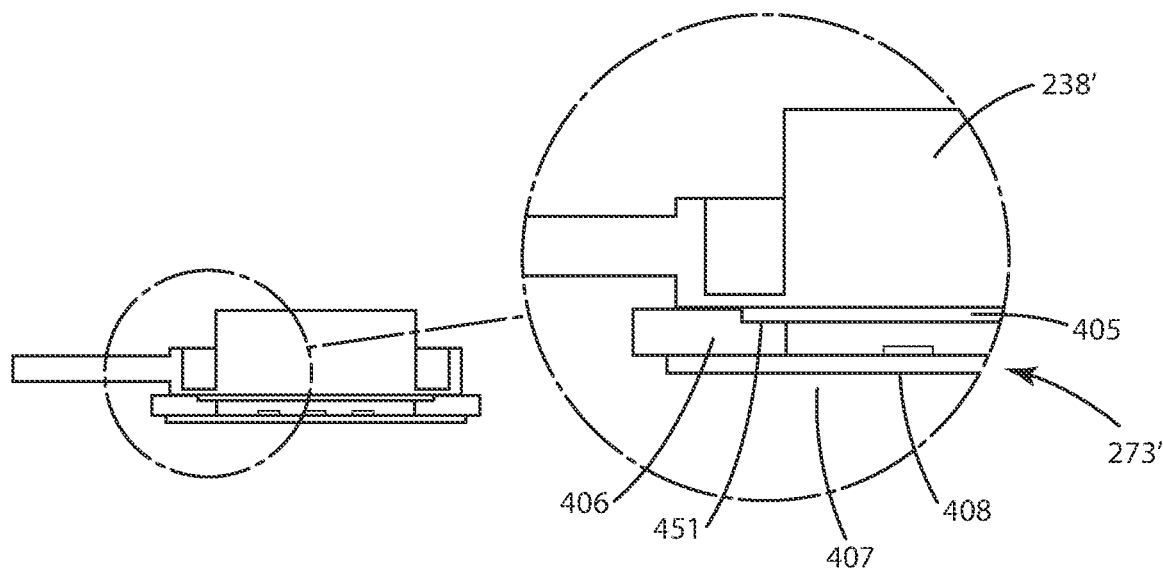
FIG. 14 shows a sectional view and an expanded partial view thereof of an alternative embodiment of the UV reactor in accordance with one embodiment.
Figure 15:
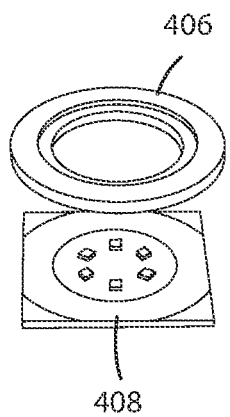
FIG. 15 shows perspective, exploded, and top views of a printed circuit board assembly and a thermal coupler in accordance with the embodiment of FIG. 14.
Figure 16:
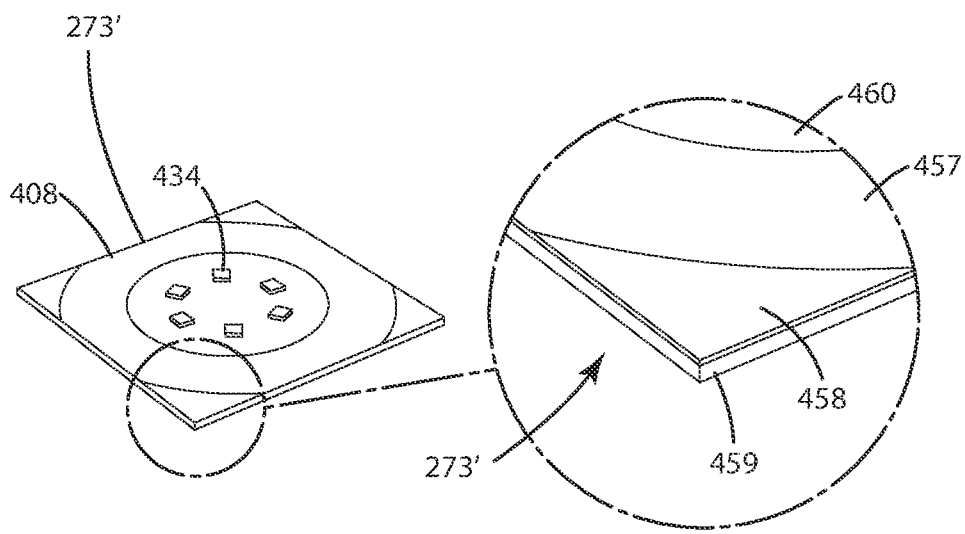
FIG. 16 shows an expanded partial perspective view of the printed circuit board assembly of FIG. 15.

The temperature profile of the UV reactor 200 configured in accordance with one embodiment with the water flow path 238, the heat flow path 241, and the convection cooling pathway is shown in the illustrated embodiment of FIG. 12.

In one or more alternative embodiments shown in FIGS. 14-18, a UV light source assembly 408 is shown in further detail and is configured such that the source-based thermal coupler 207 is integral as a source-based thermal coupler 407 provided in the UV light source assembly 408. The source-based thermal coupler 407 in the illustrated embodiment includes copper layer 457, which may be a heat conductive layer operable to conduct heat from the plurality of UV light sources 434 to the water facing thermal coupler 406. It is to be understood that the copper layer 457 may be formed of any type of material or multiple materials operable to provide a heat conducive layer to facilitate conduction of heat from the plurality of UV light sources 434 to the water facing thermal coupler 406.

In the illustrated embodiments, a water pathway 238', a UV transmissive window 405, and water facing thermal coupler 406 are provided similar in many respects to the water flow path 238, the UV transmissive window 205, and the water facing thermal coupler 206.

In the illustrated embodiment of FIGS. 14-17, the UV light source assembly 408 includes a plurality of layers, including a solder mask 460, a copper layer 457, a dielectric layer 458, and a metal layer 459. The UV light source assembly 408 may also include a plurality of UV light sources 434, similar to the UV light sources 234. The copper layer 457, which may include traces for supplying power to the UV light source 434, may provide a thermally conductive aspect and form at least a portion of the source-based thermal coupler 407 of the UV light source assembly 408. The copper layer 457 may provide a substrate on which one or more of the UV light sources 434 are soldered or mounted.

The water facing thermal coupler 406 in the illustrated embodiment may be thermally coupled to the copper layer 457 of the UV light source assembly 408. For instance, in the case of the water facing thermal coupler 406 being a ring, the copper layer 457 may be unmasked in an area corresponding to the ring of the water facing thermal coupler 406 in order to form a sufficient thermal interface therebetween for heat transfer. In other words, the solder mask 460 may be absent in the area of the copper layer 457 corresponding to the ring of the water facing thermal coupler 406.

Figure 17:
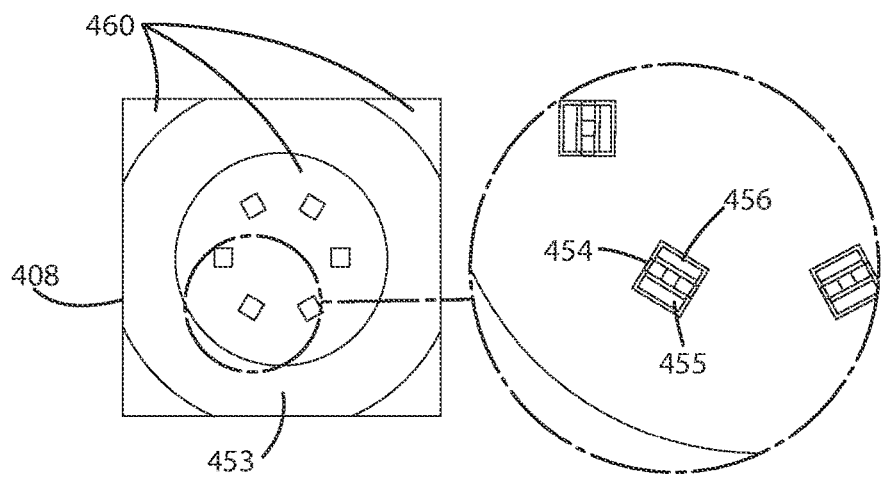
FIG. 17 shows an expanded partial top view of the printed circuit board assembly of FIG. 15.

The plurality of UV light sources 434 may be thermally coupled to the copper layer 457, as depicted in the illustrated embodiment of FIG. 17, via a thermal pad 454 that is provided as part of the copper layer 457. An anode pad 455 and a cathode pad 456 for providing power to the UV light source 434 may also form part of the copper layer 457, and one or both of the anode pad 455 and the cathode pad 456 may be electrically separate from the thermal pad 454. The thermal pad 454 may be electrically and thermally connected to the area of the copper layer 457 that interfaces with the water facing thermal coupler 406. This way, heat generated by the UV light source 434 may be transferred via the copper layer 457 to the water facing thermal coupler 406.

Figure 18:
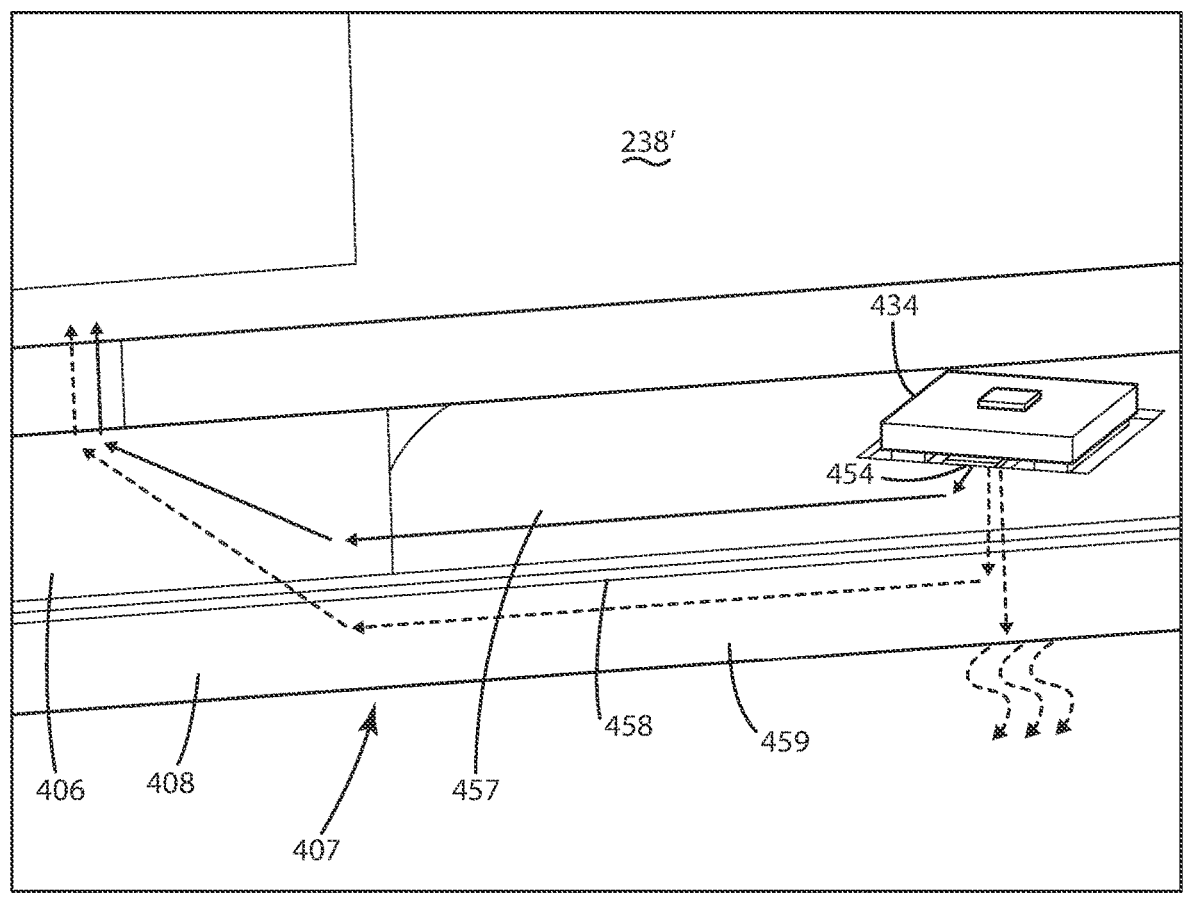
FIG. 18 shows a representative view of the thermal paths for one embodiment according to FIG. 14.

The heat and water flow paths in accordance with the embodiment of FIGS. 14-17 is shown in further detail in the illustrated embodiment of FIG. 18, with the solder mask 460 being hidden for purposes of disclosure. The thermal pad 454 is provided in thermal communication with the UV light source 434, and conducts thermal energy to the water facing thermal coupler 406 via the copper layer 457 via the thermal path shown with a solid line. Thermal energy via the thermal pad 454 may also be communicated to the metal layer 459 and ultimately to the water facing thermal coupler 406 via the thermal path shown in a broken line. Optionally, in one embodiment, thermal energy may be dissipated through the metal layer 459 to the surrounding air via convection, shown as the thermal path with a broken line in conjunction with wavy broken lines.

In one embodiment according to the present disclosure, cooling can be achieved using the front side of UV light source assembly 408 instead of using an additional aluminum backing heatsink, such as the source-based thermal coupler 207 in the illustrated embodiments of FIGS. 1-5. The front side cooling in one embodiment may use a copper layer 457 or a top layer copper trace with at least 4 oz Cu to achieve a target cooling effect. The solder mask 460 or solder resist may be strategically placed on the PCB assembly to ensure that it is not located in between the top layer copper trace and the cooling ring or water facing thermal coupler 406.

In one embodiment, thermal paste may be disposed between the copper trace and the water facing thermal coupler 406 in order to ensure efficient thermal communication therebetween. In one embodiment, for enhanced thermal conductivity and heat dissipation, graphene material can be inserted between the water facing thermal coupler 406 and the UV light source assembly 408 as well as coated on the water contact side of the water facing thermal coupler 406.

In the illustrated embodiment, cooling may be achieved through 3 pathways:
1) UV light source 434→thermal pad 454→copper layer 454→water facing thermal coupler 406→water path 238';
2) UV light source 434→thermal pad 454→dielectric 458→metal layer 459 metal core→water facing thermal coupler 406→water path 238'; and
3) UV light source 434→thermal pad 454→dielectric 458→metal layer 459 or metal core→air/environment (Optional).

It is worth noting that although the UV transmissive window 205 is shown interfacing with a continuous surface of the water facing thermal coupler 206 in the illustrated embodiments of FIGS. 1-5, the present disclosure is not so limited. For instance, in the illustrated embodiment of FIG. 14, the UV transmissive window 405 is recessed within the water facing thermal coupler 406 such that the UV transmissive window 405 interfaces with a recessed surface 451 and an adjacent step.

V. Chamber Outlet and Thermal Exchange Region

The UV reactor 200, 200' in accordance with one embodiment includes a plurality of chamber outlets 246, 246' arranged according to a chamber outlet configuration 235, 235', which may vary depending on the application. The chamber outlets 246, 246' may be defined at least in part by an aperture in the interior side surface of the water treatment chamber 245, 245'. In one embodiment, the aperture may be disposed directly adjacent to the second end 292, 292' of the water treatment chamber 245, 245' with no portion of the interior side surface being between the aperture and the second end 292, 292', which in the illustrated embodiment of FIGS. 1-5 corresponds to the water facing side of the UV transmissive window 205, 205'. In this way, the water flow path 238, 238' is provided such that water travels in a radial path perpendicular to the longitudinal axis 240, 240' of the UV reactor 200, 200' through the aperture into a chamber outlet 246, 246'. This flow path can be seen in the illustrated embodiment of FIGS. 21 and 64-66, with the water flowing through the water treatment chamber 245, 245' through one of the plurality of chamber outlets 246, 246' into the thermal exchange region 236, 236' and through the UV reactor outlet 230, 230'.

The number and configuration of the chamber outlets 246, 246' may vary from application to application. For instance, in the illustrated embodiments of FIGS. 21, 22, 63, and 64-66, the chamber outlets 246, 246' may be disposed adjacent to the periphery of the second end 292, 292' of the water treatment chamber 245, 245' and spaced evenly therearound in accordance with a chamber outlet configuration 235, 235'. In one embodiment, the plurality of chamber outlets 246, 246' may be radially distributed uniformly about the longitudinal axis 240, 240'. However, the present disclosure is not so limited. The plurality of chamber outlets 246, 246' may be disposed in any manner, including a pattern of uneven spacing, and cutoff regions as described herein.

In one embodiment, the total cross-sectional area of the plurality of chamber outlets 246, 246' may be larger than the cross-sectional area of the UV reactor inlet 232, 232' to avoid significant pressure drop, and possibly to minimize pressure drop.

The total cross-sectional area may be defined as follows:

$$A_{outlet} < \sum_i^N a_i$$

where $A_{outlet}$ is the cross-sectional area of outlet, $α_i$ is the individual opening area of the chamber outlet 246, 246' and N is the number of the chamber outlets 246, 246'.

Figure 63:
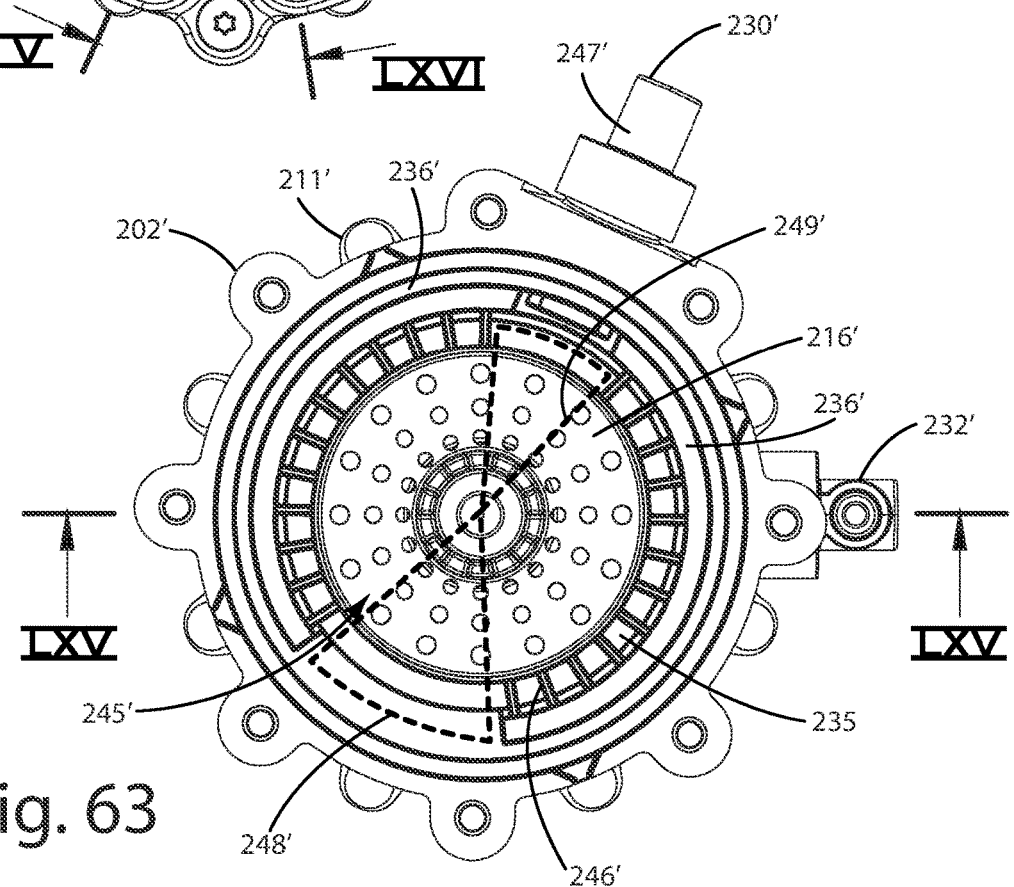
FIG. 63 shows a top view of the UV reactor in FIG. 57 without several components to show an end cap in accordance with one embodiment.

In one embodiment, shown in FIG. 24 and FIG. 63, a keepout region 249, 249' for the chamber outlets 246, 246' may be provided proximal to the UV reactor outlet 230, 230' and defined by an angle β relative to a line 247, 247' that intersects the longitudinal axis 240, 240' and the UV reactor outlet 230, 230'. In the illustrated embodiment, the keepout region 249, 249' may be symmetrical with respect to the line 247, 247'; however, it is to be understood that the present disclosure is not so limited—the keepout region 249, 249' may be defined asymmetrically with respect to the line 247, 247'. The keepout region 249, 249', in one embodiment, may facilitate control over the flow of water through the thermal exchange region 236, 236', thereby having an impact on the thermal conduction performance of the UV reactor 200, 200'.

Figure 25:
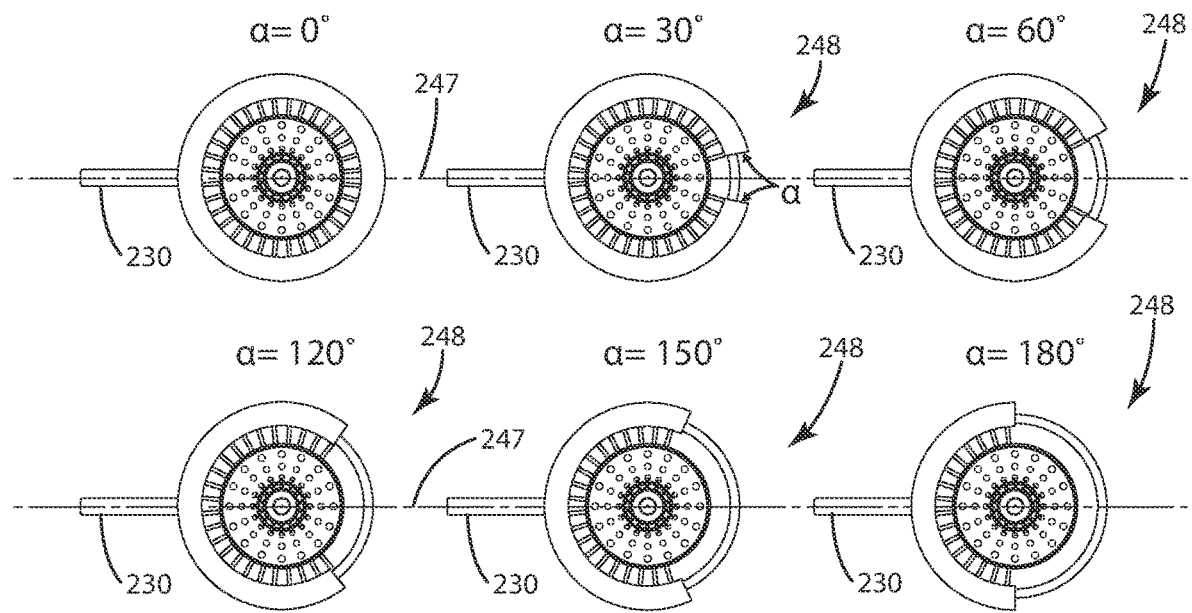
FIG. 25 shows outlet channels and a collection trough of an end cap of the UV reactor in accordance with various embodiments.

In one embodiment, shown in FIG. 25 and FIG. 63, a keepout region 248, 248' for the chamber outlets may be provided distal from the UV reactor outlet 230, 230' and defined by an angle α relative to the line 247, 247'. The keepout region 248, 248' may be symmetrical or asymmetrical about the line 247, 247'. Similar to the keepout region 249, 249', the keepout region 248, 248' may facilitate control over the flow of water through the thermal exchange region 236, 236', thereby having an impact on the thermal conduction performance of the UV reactor 200, 200'. In one embodiment, shown in the illustrated embodiment of FIG. 27 and FIG. 63, the angle β may be substantially the same as the angle α so that the keepout regions 248, 248', 249, 249' are symmetrical about a line (not shown) that is normal to the line 247, 247' and intersects the longitudinal axis 240, 240' of the UV reactor 200, 200'.

It is to be noted that the keepout region 248, 248', opposite the UV reactor outlet 230, 230', may be applied with respect to one or more chamber outlets 246, 246' as well as the thermal exchange region 236, 236'. For instance, in the case of a keepout region 248, 248' with an a of 30 deg., there may be no chamber outlets in this keepout region 248, 248' and also no flow path available within the thermal exchange region 236, 236' for the keepout region 248, 248'. In other words, the collection trough or thermal exchange region 236, 236' does not need to be encircling the water treatment chamber 245, 245', as shown in the illustrated embodiments of FIGS. 24 and 25. The keepout region 248, 248' may close off the thermal exchange region 236, 236' for enhanced performance. Several criteria may pertain to incorporation of one or more such keepout regions: 1) total area of the chamber outlets 246, 246' may be larger than or equal to the cross-sectional area of the UV reactor inlet 232, 232' to avoid restricting the flow and to avoid pressure loss; 2) the trough or thermal exchange region 236, 236' may provide sufficient surface in contact with the water facing thermal coupler 206, 206' for sufficient cooling effect; and 3) the trough partial block region or keepout region 249, 249' may be increased, potentially maximized, for better disinfection purpose.

Figure 26:
FIG. 26 shows a graph of a keepout area with respect to performance in accordance with the embodiments of FIG. 25.
Figure 27:
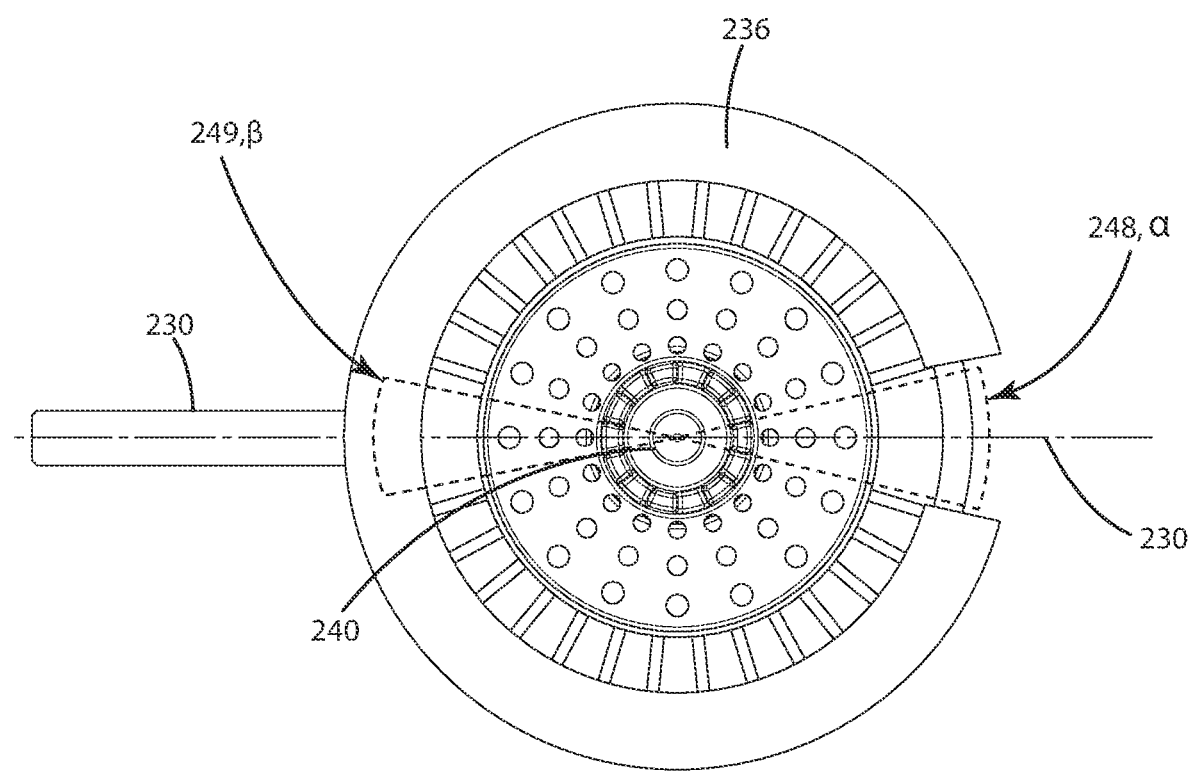
FIG. 27 shows outlet channels and a collection trough of an end cap of the UV reactor in accordance with one embodiment.

In one embodiment, it has been determined up to five channels can be blocked without significant impact of the disinfection performance as well as cooling of the UV light source assembly 208, 408. With this configuration, an a of 30 deg. yields an improvement in disinfection efficiency by ~8%, as depicted in the graph of FIG. 26. In the illustrated embodiment of FIG. 63, the keepout region 248' is approximately 60 deg., and the keepout region 249' is approximately 30 deg. Above 180 deg. for the keep out region 248, 248', it has been determined that in accordance with one embodiment the total area of the chamber outlets 246, 246' becomes a significant flow restriction and performance begins to degrade significantly.

It is noted that instead of a keepout region 248, 248' with respect to the thermal exchange region 236, 236', a partial keepout region may be defined in which the flow path of the thermal exchange region 236, 236' is restricted relative to portions of the thermal exchange region 236, 236' outside of the partial keepout region. In one embodiment, the depth of the thermal exchange region 236, 236' within the partial keepout region may be less than the depth of the thermal exchange region 236, 236' outside of the partial keepout region. The depth may correspond to the distance between the water facing thermal coupler 206, 206' and the bottom of the thermal exchange region 236, 236' (e.g., the bottom of the trough). As an example, the depth in the partial keepout region may be smaller such that the thermal exchange region 236, 236' does not encompass the water treatment chamber 245, 245' but still provides a flow path that potentially traverses a complete circle or a closed loop within the thermal exchange region 236, 236'.

In the illustrated embodiments of FIGS. 22-27, and 63-66, the plurality of chamber outlets 246, 246' are formed, as discussed herein, at least in part by an aperture of an interior side surface of the water treatment chamber 245, 245'. The aperture may be defined by a channel in the end cap 202, 202' and a surface of the UV transmissive window 205, 205'. The channels in the end cap 202 are depicted in the illustrated embodiments of FIGS. 22-27, and 63-66. Alternatively, one or more of the plurality of chamber outlets 246, 246' may be defined at least in part by an aperture disposed in the first end 292, 292' of the water treatment chamber 245, 245'.

Figure 5:
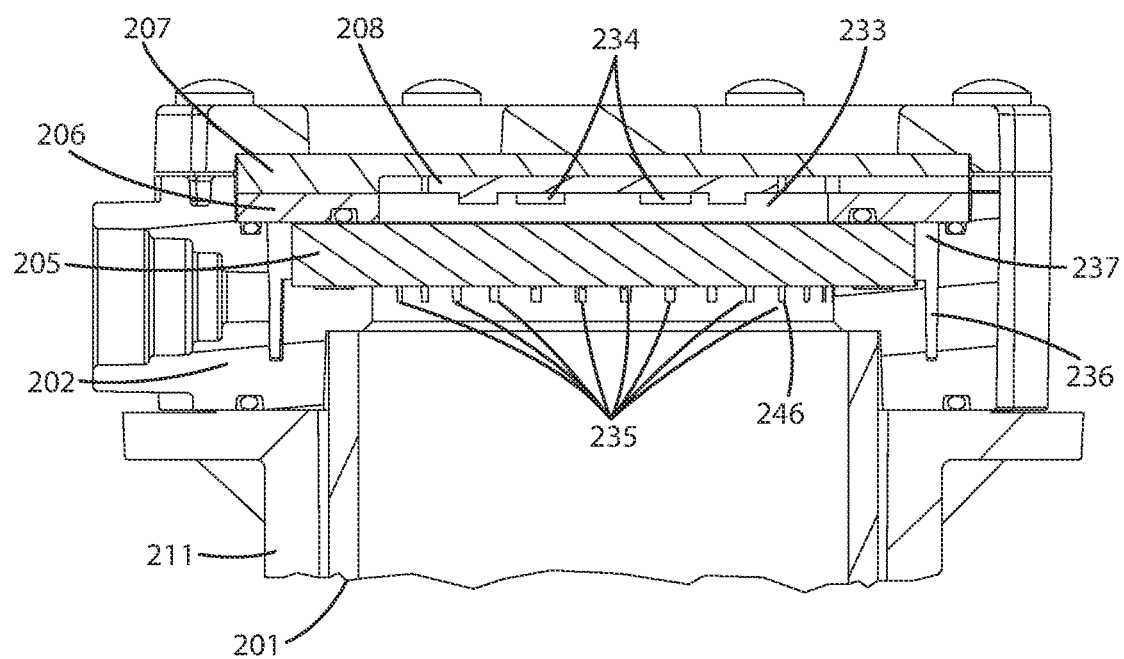
FIG. 5 shows an expanded, partial, and sectional view of the UV reactor in FIG. 4.

As shown in the illustrated embodiments of FIGS. 5 and 64, the thermal exchange region 236, 236' is defined by a trough in the end cap 202, 202', the UV transmissive window 205, 205', and the water facing thermal coupler 206, 206'. The thermal exchange region 236, 236' may, itself, be considered a collection trough through which water exiting the plurality of chamber outlets 246, 246' may be collected and flow toward the UV reactor outlet 230, 203'. The thermal exchange region 236, 236' may be configured to dispose water directly in contact with the water facing thermal coupler 206, 206' at a thermal contact region 237, 237' for transfer of heat energy. This heat energy may leave with the water as it exits the UV reactor 200, 200' via the UV reactor outlet 230, 230'.

Figure 28:
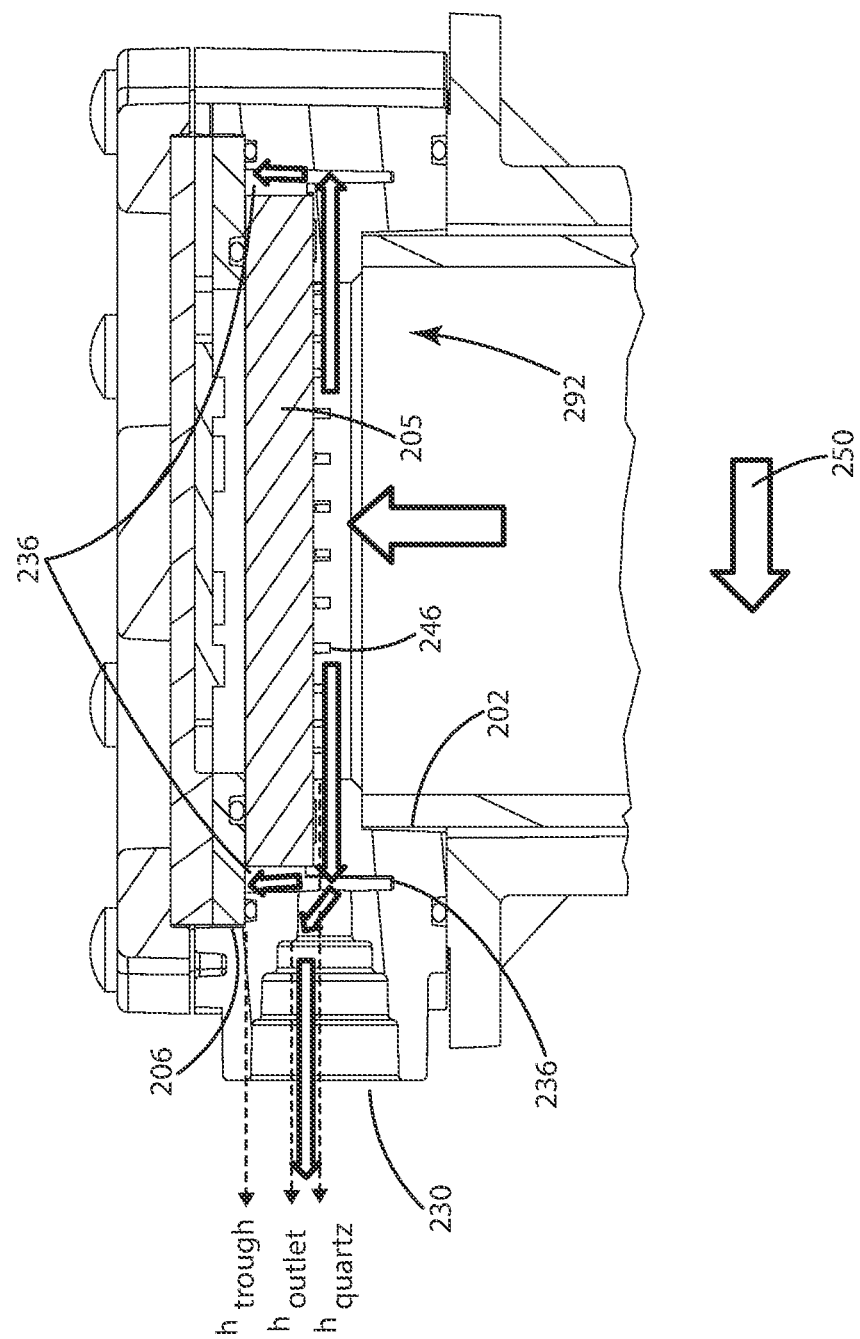
FIG. 28 shows gas flow through the UV reactor in a vertical position in accordance with one embodiment.

The plurality of chamber outlets 246, 246', in one embodiment, may be disposed so that there is no additional space between a chamber outlet 246, 246' and the second end 292, 292' (e.g., the water contacting surface of the UV transmissive window 205, 205') of the water treatment chamber 245, 245'. This may facilitate discharge of any gas that accumulates within the water treatment chamber 245, 245' through the plurality of chamber outlets 246, 246', or mitigate collection of gas bubbles within the water treatment chamber 245, 245' and/or other portions of the UV reactor 200, 200', such as the water outlet 230, 230' and the collection trough. The gas flow path 250 in accordance with one embodiment is depicted in FIG. 28. As depicted, gas accumulated on the second end 292 or one of the water contacting surfaces of the UV transmissive window 205 may flow through the plurality of chamber outlets 246 into the thermal exchange region 236 (e.g., the collection trough), and ultimately through the UV reactor outlet 230. The gas flow path provided by the UV reactor 200' may be similar to the gas flow path 250 described in conjunction with the UV reactor 200.

In one embodiment, the plurality of chamber outlets 246, 246' around the entire UV transmissive window 205, 205' direct fluid to the thermal exchange region 236, 236' (e.g., the collection trough) and distribute the fluid uniformly for uniform UV optical exposure. The water contacting surface of the UV transmissive window 205, 205' may function as a wall of each chamber outlet 246, 246' so that the chamber outlet 246, 246' is defined by a channel in the end cap 202, 202' and the UV transmissive window 205, 205'. Additionally or alternatively, the water facing thermal coupler 206, 206' may define at least a portion (e.g., a wall) of the chamber outlet 246, 246'.

In the illustrated embodiment, the water facing thermal coupler 206, 206' (e.g., a stainless steel cooling ring) functions as a wall of the thermal exchange region 236, 236' of the UV reactor 200, 200' (e.g., the outlet trough of the reactor).

Figure 67:
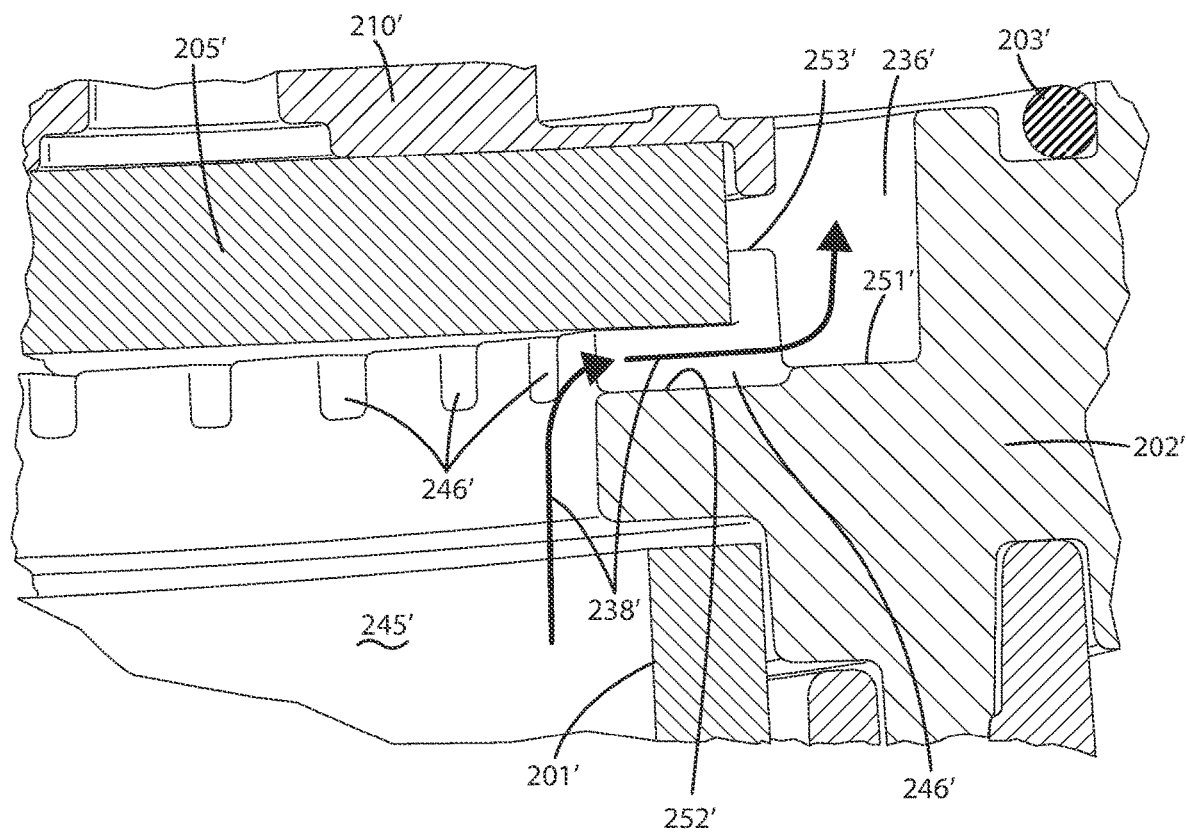
FIG. 67 shows an enlarged view of the sectional view in FIG. 66.
Figure 68:
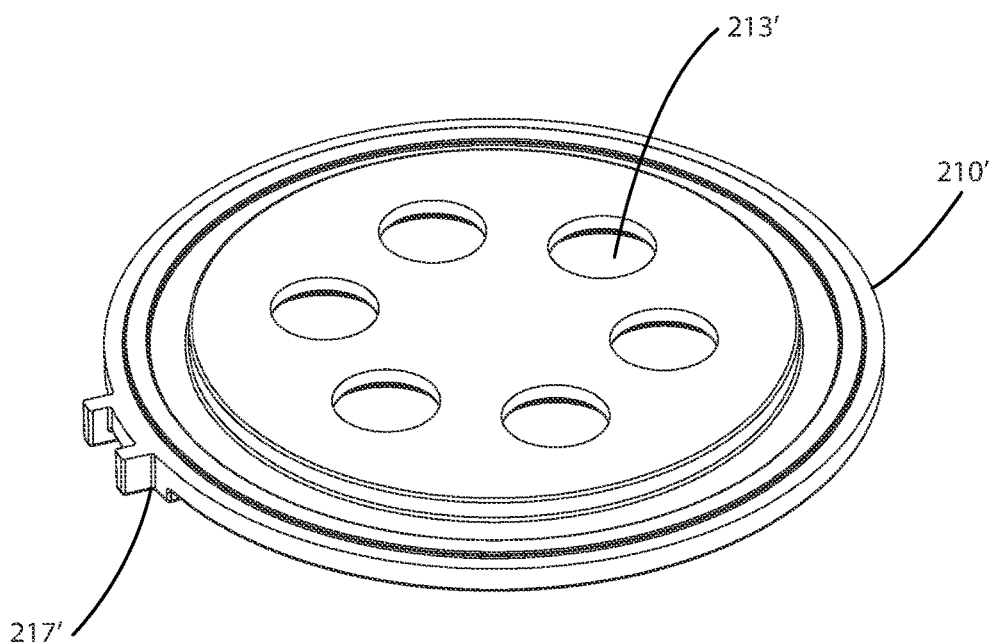
FIG. 68 shows a seal in accordance with one embodiment of the present disclosure.

In the illustrated embodiment of FIG. 67, the water flow path 238 for water entering a chamber outlet 246' and into the thermal exchange region 236' is shown in further detail. The chamber outlet 246' in the illustrated embodiment includes a lower surface 252' that defines a plane that does not intersect the thermal exchange region 236'—although it is to be understood that the chamber outlet 246' may be configured differently. The thermal exchange region 236' in the illustrated embodiment includes a lower surface 251' that defines a plane that is non-coplanar with respect to the lower surface 252' of the chamber outlet 246', and disposed upward relative to the lower surface 252' in the direction of the water flow path 238. The end cap 202' in the illustrated embodiment includes a plurality of steps that define the walls of the chamber outlets 246' and having an upper surface 253' with a recessed area to operable to receive the UV transmissive window 205'. The steps in conjunction with the upper surface 253' may help to maintain a position of the UV transmissive window 205'.

The UV transmissive window 205, 205' may include a smooth surface finish (inherently or through finishing efforts), and the UV transmissive window 205, 205' may allow gas bubbles in the water to escape easily across its surface and through the chamber outlets 246, 246'. This discharge of gas may be due in part to a wall of the chamber outlets 246, 246' corresponding to a surface of the UV transmissive window 205, 205'. It is noted that whether the UV reactor 200, 200' is in either a vertical or horizontal position, gas bubbles can flow out of the UV reactor due to pressure and natural buoyancy. The gas flow path 250 in the vertical configuration is shown in the illustrated embodiment of FIG. 28, and the gas flow path 250 in the horizontal configuration is shown in the illustrated embodiment of FIG. 29.

In the illustrated embodiment of FIG. 28, the relative heights of the second end 292 (e.g., the water contacting surface of the UV transmissive window 205), an upper surface of the UV reactor outlet 230, and the water contacting surface of the water facing thermal coupler 206 (e.g., an upper surface of the collection trough) are shown. With the cascading relationship, h_trough>=h_outlet>h_quartz, discharge of gas via the gas flow path is facilitated, particularly due to the cascading heights and the natural buoyancy of the gas within the water. Gas bubble accumulation near the steel ring or water facing thermal coupler may be considered acceptable in one embodiment because the presence of gas in this location may have an insubstantial effect on, or potentially minimally inhibit, the cooling performance. Gas bubble accumulation near the water contacting surface of the UV transmissive window may interfere with the UV radiation emitted by the UV LEDs. This can include blocking or redirecting the UV energy, creating a location within the UV water chamber where there is minimal UV intensity, and hence decreasing overall disinfection performance. It is also noted that the high flow velocity and temperature rise caused by the water facing thermal coupler (e.g., the cooling ring or stainless ring) may cause instability of gas pocket volume, resulting in a low likelihood of gas accumulation.

Figure 29:
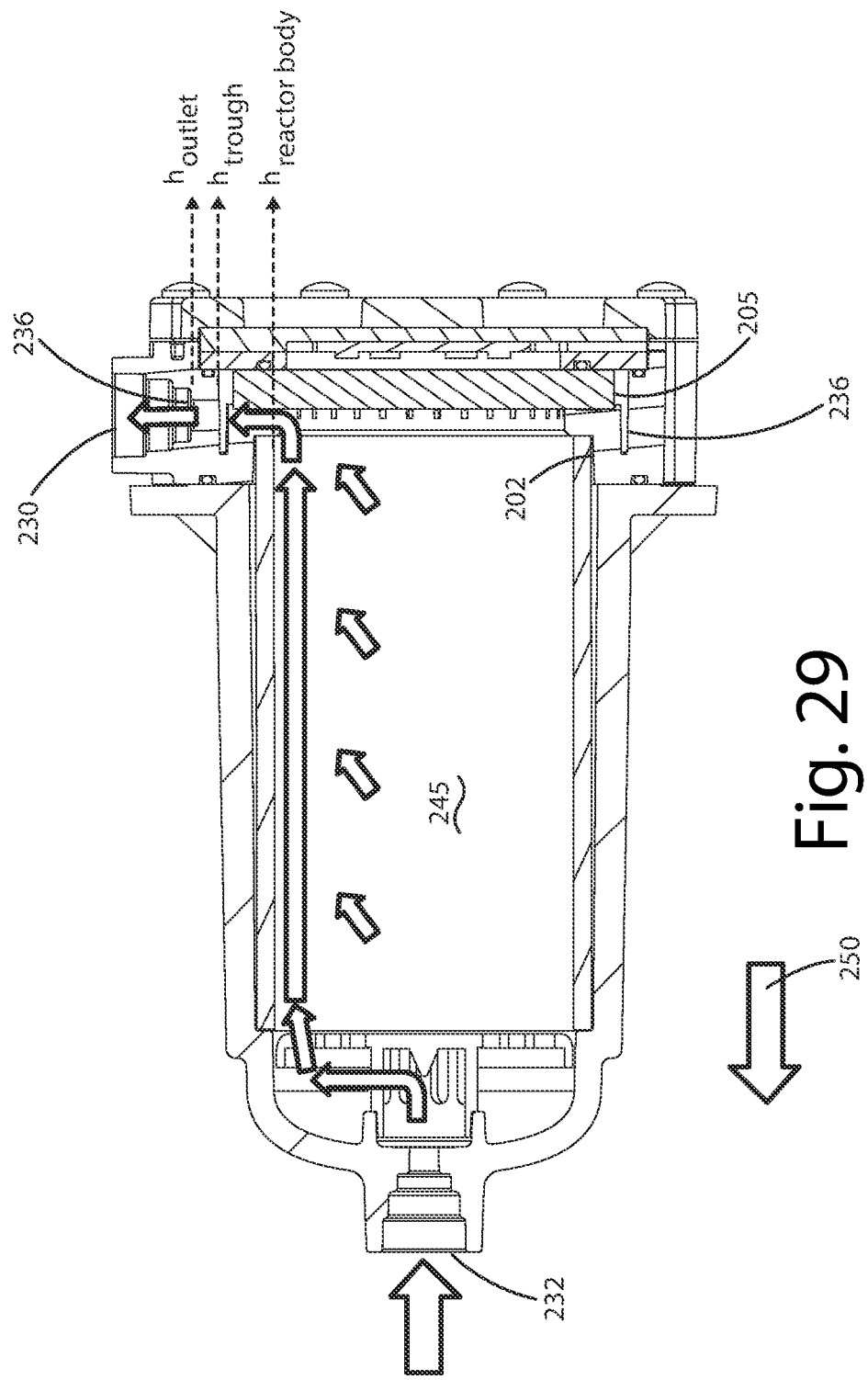
FIG. 29 shows gas flow through the UV reactor in a horizontal position in accordance with one embodiment.
Figure 33:
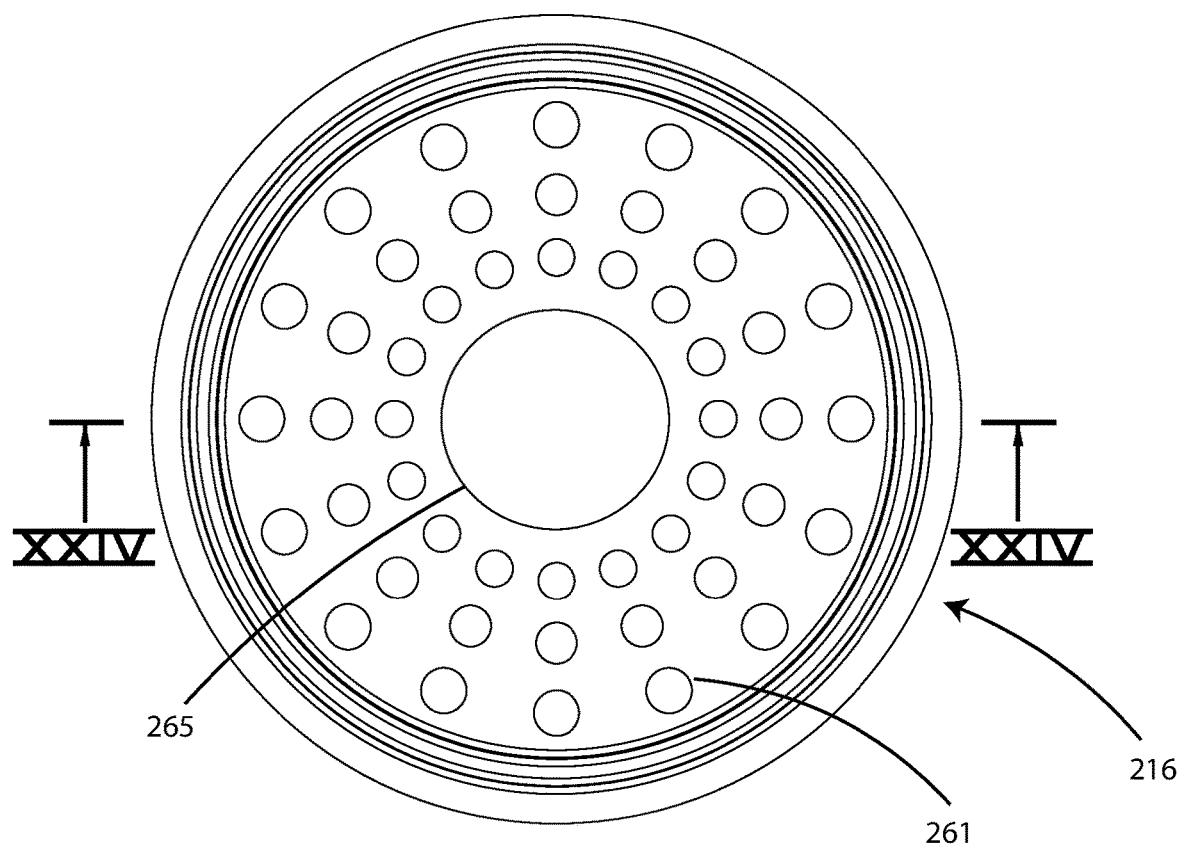
FIG. 33 shows a top view of the laminar flow element in FIG. 30.

In the illustrated embodiment of FIG. 29, with the UV reactor 200 in a horizontal position, the relative heights of the interior side surface of the reactor body 201, the thermal exchange region 236, and the UV reactor outlet 230 are shown with h_outlet>=h_trough>h_reactor_body. Due to the natural buoyancy of the gas within the water, gas can be readily discharged from the water treatment chamber 245, and gas accumulation can be avoided.

VI. Driver and Health Monitoring Circuitry

Figure 50:
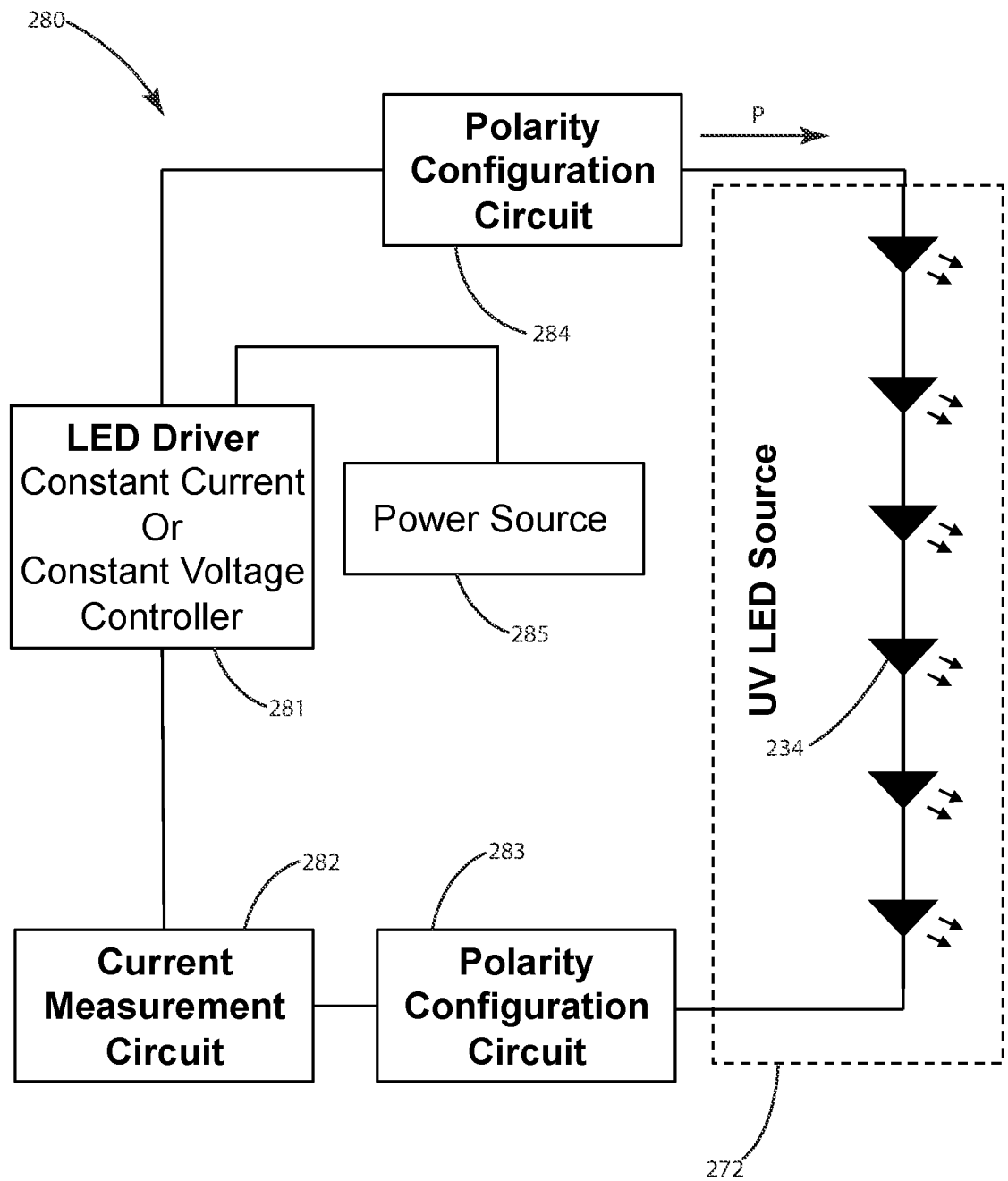
FIG. 50 depicts UV light source control circuitry for the UV reactor in accordance with one embodiment.

UV light source circuitry in accordance with one embodiment is shown in FIG. 50 and generally designated 280. The UV light source circuitry may include a power source 285, which may be power connection to an external power source, which itself may be external to the water treatment system. The power source 285 may be a DC power source capable of supplying power to a source control circuitry 281 of the UV light source circuitry 280.

The source control circuitry 281 may vary depending on the application, and may include a constant current or constant voltage driver for the plurality of UV light sources 234. The UV light sources 234 in one embodiment may be LEDs connected in series as the UV light source configuration 272 (e.g., an array). Although the UV light source control circuitry is described in conjunction with providing power to the UV light sources 234, it is to be understood that the UV light source circuitry 280 may be provided in conjunction with powering any UV light source described herein, including the UV light sources 434 of the UV reactor 200'.

Figure 51:
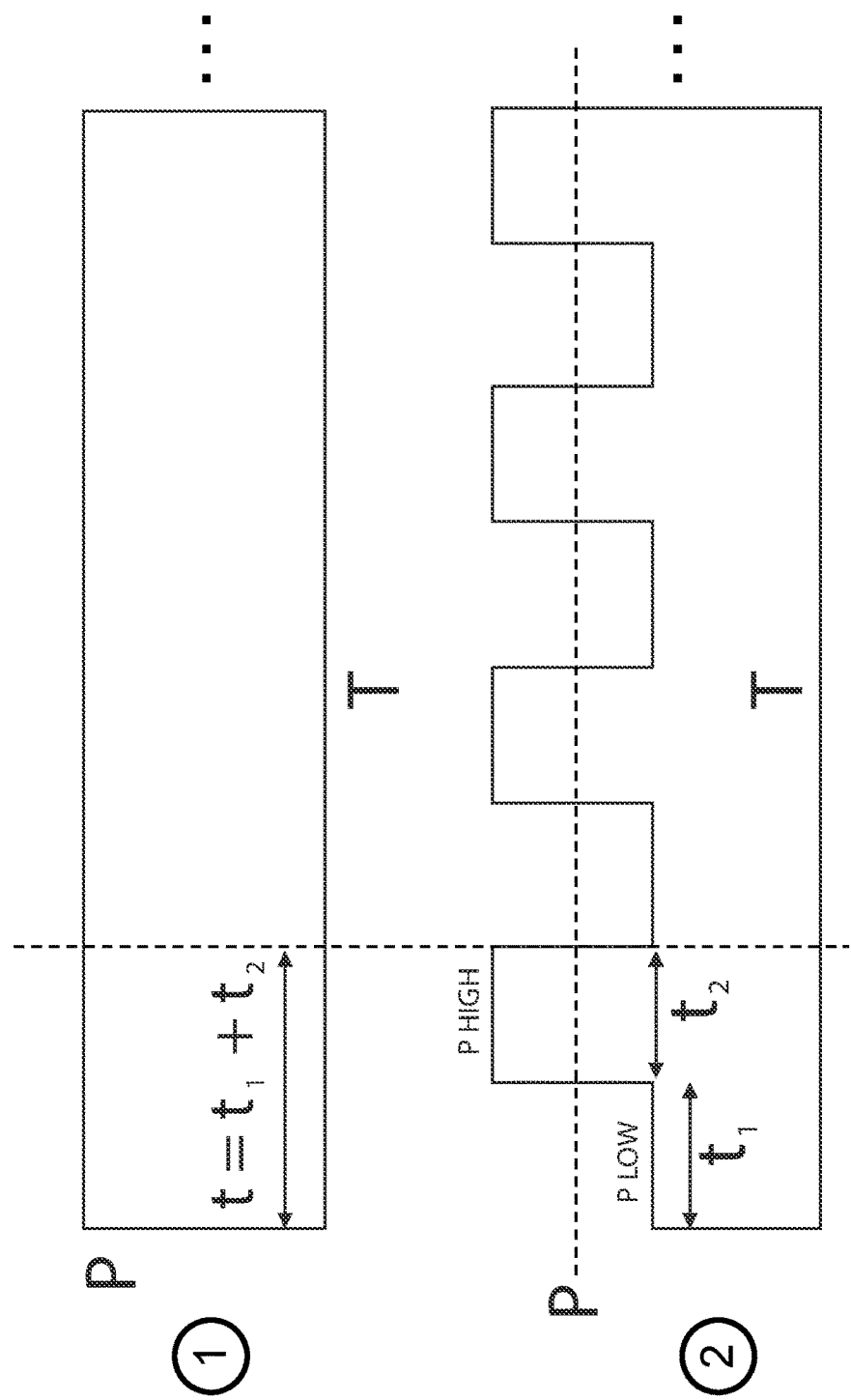
FIG. 51 shows a power supply control methodology in accordance with one embodiment.

The source control circuitry 281 may control power delivery to the UV light source configuration 272 in accordance with one or more embodiments described herein. Examples are provided in the illustrated embodiment of FIG. 51, and designated 1 and 2. The power delivered to the UV light source configuration 272 in the first example (1) is generally constant (either through constant voltage or constant current supply). For instance, in this example, the source control circuitry 281 in one embodiment may drive the UV light source configuration with constant current at 100% rated current.

In the second example (2), the power delivery may be pulse width modulated between a low and a high amount of power. The duration t2 of the high power state and the duration t1 of the low power state may be different and may vary dynamically based on sensor feedback or be predetermined based on design constraints. The low power state may be lower than the rated current of the UV LEDs as a baseline (e.g., 90% of rated current), and the high power state may be to overpower the UV LEDs relative to rated current (e.g., 110% of rated current). The low power state may be considered a constant DC bias current in one embodiment. It is noted that higher pulse repetition frequency (PRF) may be targeted in order to extend the life of the UV LEDs. As an example, the PRF may be determined as follows:

$$PRF = 1000 \cdot \frac{1}{\min(\text{Residence Time})}$$

where residence time corresponds to target flow rate divided by the reactor void volume. In one embodiment, estimated residence time is about 4.5 seconds at a flow rate of about 0.7 gallons per minute, resulting in a PRF of about 200 Hz.

In one embodiment, the source control circuitry 280 may be operable to determine a health status of the UV light source configuration 272, such as information pertaining to a status of the UV light sources 234. The source control circuitry 280 may include a sensor circuitry 282 capable of detecting one or more characteristics of power (e.g., current and/or voltage) with respect to circuit operation. The one or more characteristics may pertain to a health of the UV light sources 234. In one embodiment, the source control circuitry 280 may include first and second polarity control circuits 283, 284 operable to control the polarity of voltage applied to the UV light sources 234. Although the UV light sources 234 are diodes in the illustrated embodiment, and therefore generally do not conduct in a reverse bias direction, at least some leakage current in the reverse bias condition may be detected by the sensor circuitry 282. This leakage current may be indicative of the health of the UV light sources 234, alone or in conjunction with other measurements, such as previous leakage current measurements, an up-to-date measurement of current and/or voltage under a forward bias condition, or one or more prior measurements of current and/or voltage under the forward bias condition, or any combination thereof.

Figure 52:
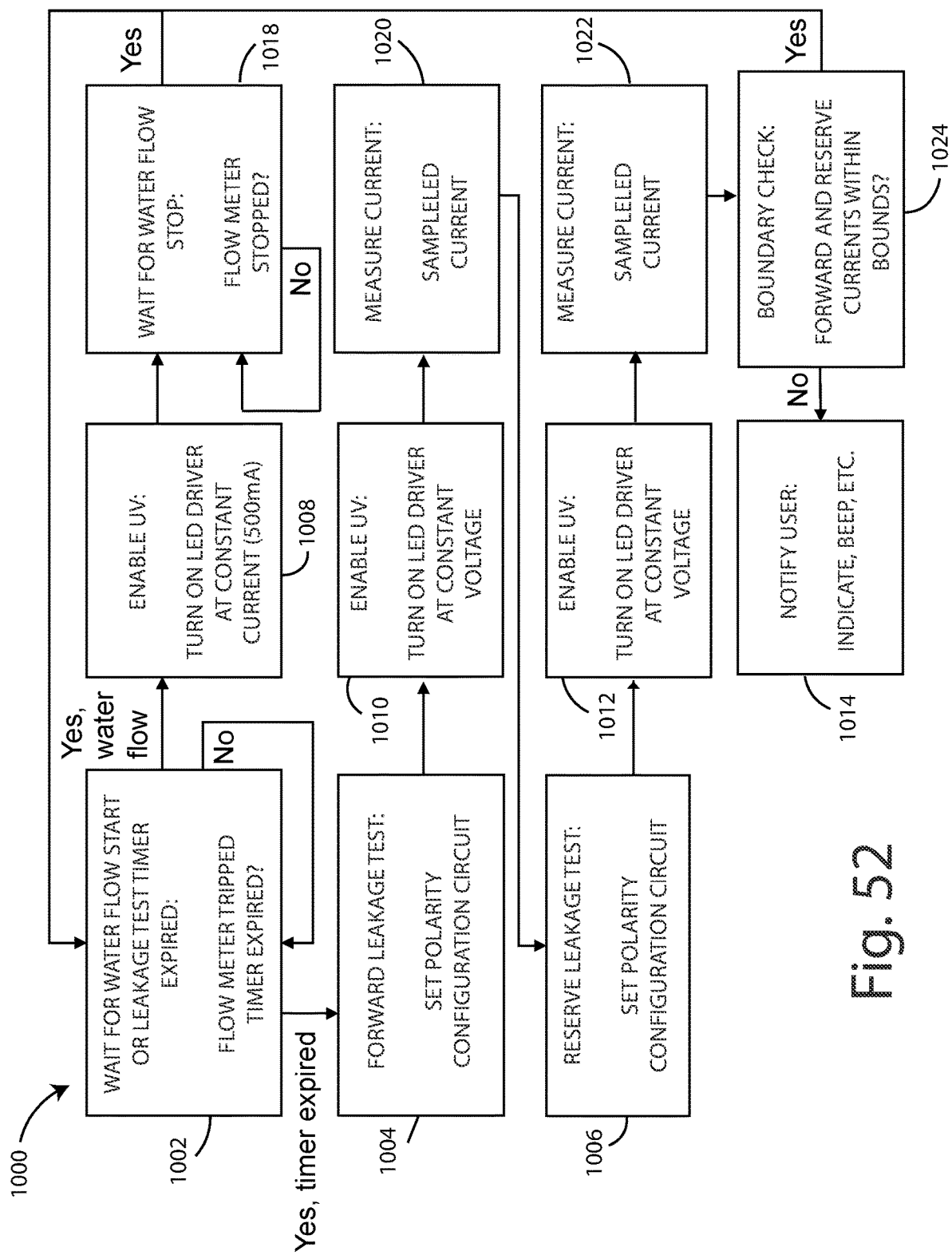
FIG. 52 depicts a control method for the UV reactor in accordance with one embodiment.

A method of powering the UV light sources 234, including detecting health of the UV light source configuration 272, is shown in the illustrated embodiment of FIG. 52 and generally designated 1000. The method may include determining if a flow meter, as discussed herein, is indicative of water flow, or whether a timer has expired. Step 1002. If neither, the source control circuitry 280 may remain idle.

If the flow meter is indicative of water flow, the source control circuitry 280 may take steps to power the UV light sources 234 for disinfection purposes. Step 1008. For instance, the source control circuitry 280 may power the UV light sources 234 in accordance with one of the power supply methodology described in connection with FIG. 51, including for instance at constant current. The source control circuitry 280 may monitor sensor output from the flow meter to determine whether water is flowing through the system in order to determine if the UV light sources 234 should remain powered. Step 1018. If the flow meter is indicative of no water flow, the source control circuitry 280 may discontinue powering the UV light sources 234, returning to waiting for the flow sensor or a timer to indicate action may be taken. Step 1002.

If there is no flow of water through the system and a timer has expired (e.g., a health check timer set for a daily check), the source control circuitry 280 may set the polarity control circuitry for a forward bias leakage test. Step 1004. The source control circuitry 280 may drive the UV light sources 234 with positive constant voltage (e.g., approximately 30 V or less for a series of 6 LEDs [approximately 5V per LED]) for the forward leakage test. Step 1010. The sensor circuitry 282 may sample current through the UV light sources 234 during the forward leakage test. Step 1020.

In one embodiment, the source control circuitry 280 may direct the polarity control circuitry for a reverse bias leakage test, and drive the UV light sources 234 with negative constant voltage (e.g., approximately −30 V or less for a series configuration of 6 LEDs [approximately −5 V per LED]). Steps 1006 and 1012. During this test, the sensor circuitry 282 may sample current through the UV light sources 234 during the reverse leakage test. Step 1022. The source control circuitry 280 may determine if the forward and reverse currents are within a bounds (e.g., within a range or above or below a threshold, or a combination thereof), and if so, continue to wait for the next timer to elapse or water to flow through the system. Steps 1024, 1002. If not, the source control circuitry 280 may facilitate notifying the user that the system health is not within target operating parameters and that maintenance may be advisable. Step 1014.

In one embodiment, the UV LED is driven using constant current during disinfection treatment. To detect the degradation of failure of UV LEDs, both forward and reverse voltages may be applied and recorded. When driving the UV LEDs with reverse voltage, µA level reading of leakage current can be used for detection of UV LEDs degradation. The threshold can be set where below the threshold (or above a threshold, or outside a range), the system may alarm the user the system disinfection efficacy is compromised, and the system needs maintenance.

VII. Water Treatment System Overview

Figure 54:
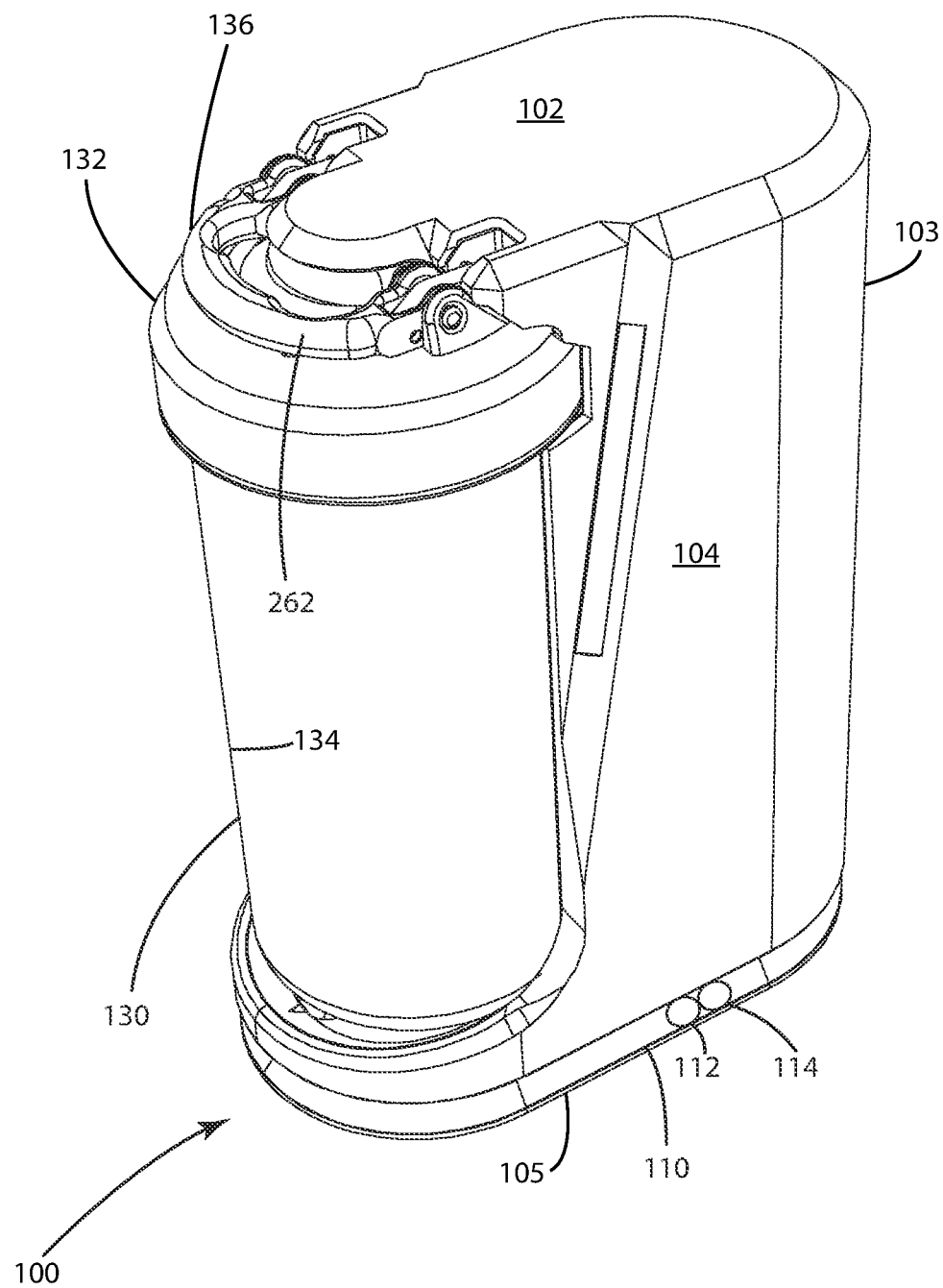
FIG. 54 depicts a perspective view of the water treatment system in accordance with one embodiment with a cover shown separate from the system.
Figure 55:
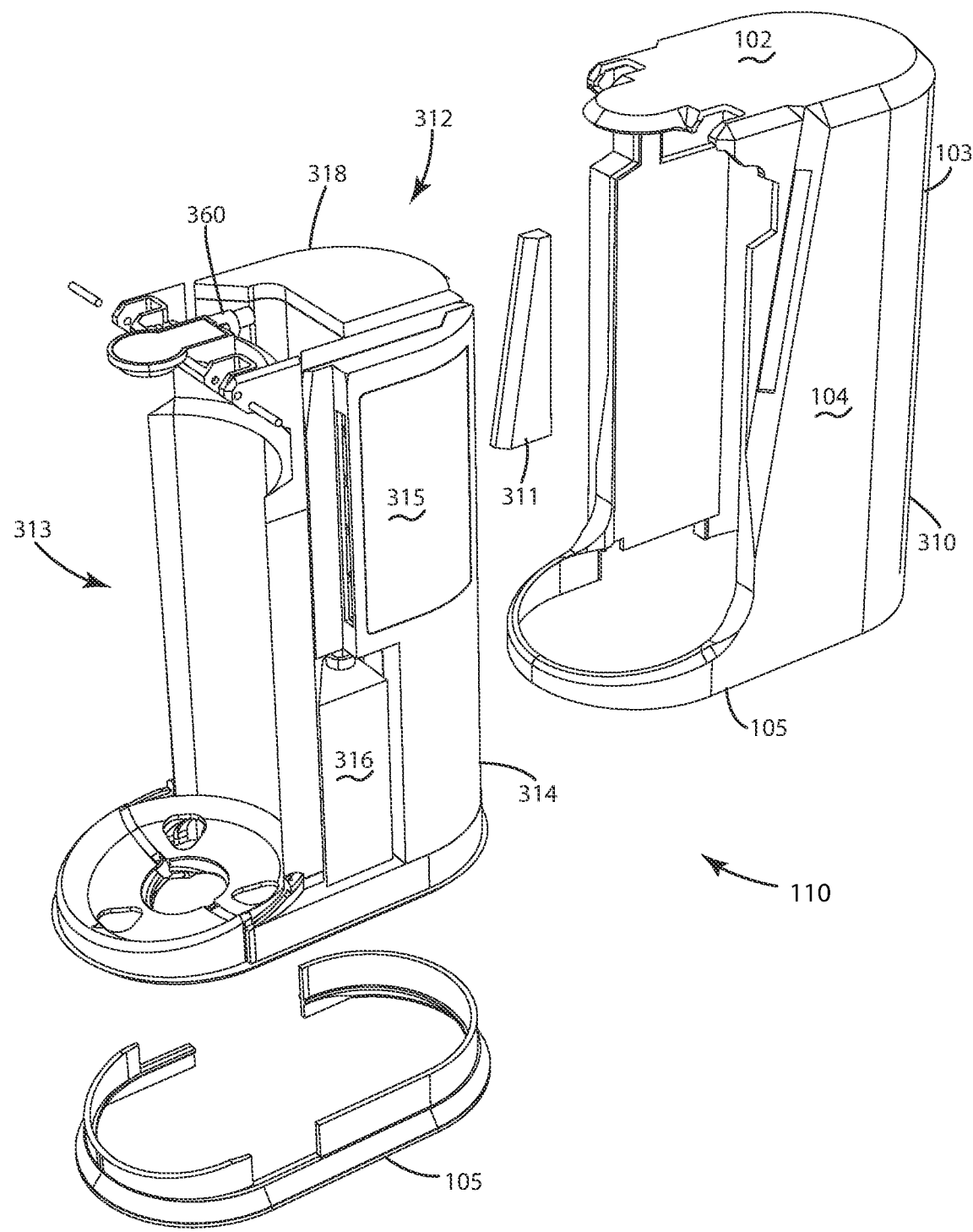
FIG. 55 shows the water treatment system of FIG. 54 in an exploded view.
Figure 56:
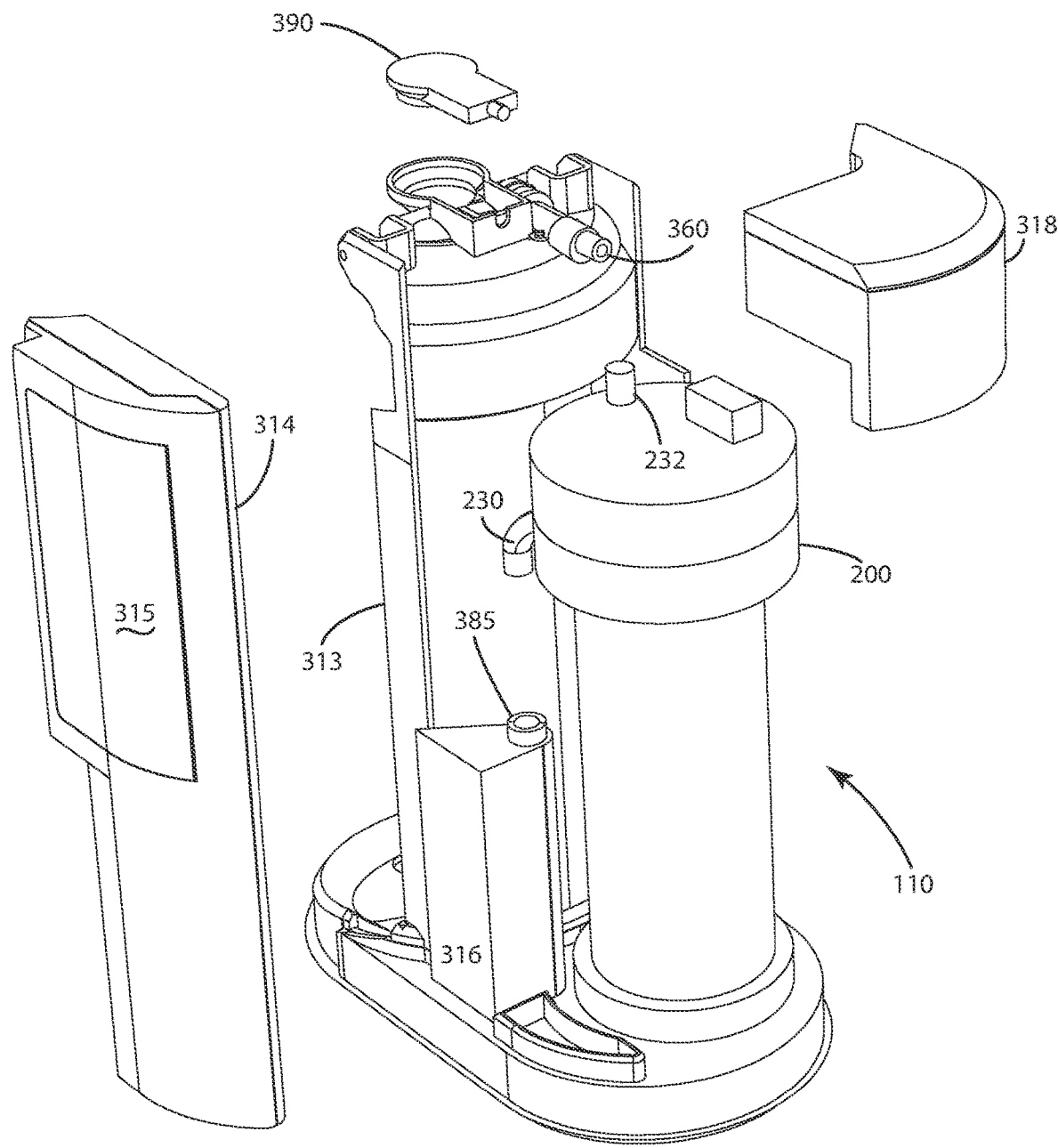
FIG. 56 depicts the water treatment system of FIG. 54 in another exploded view, showing a UV reactor within the system.
Figure 57:
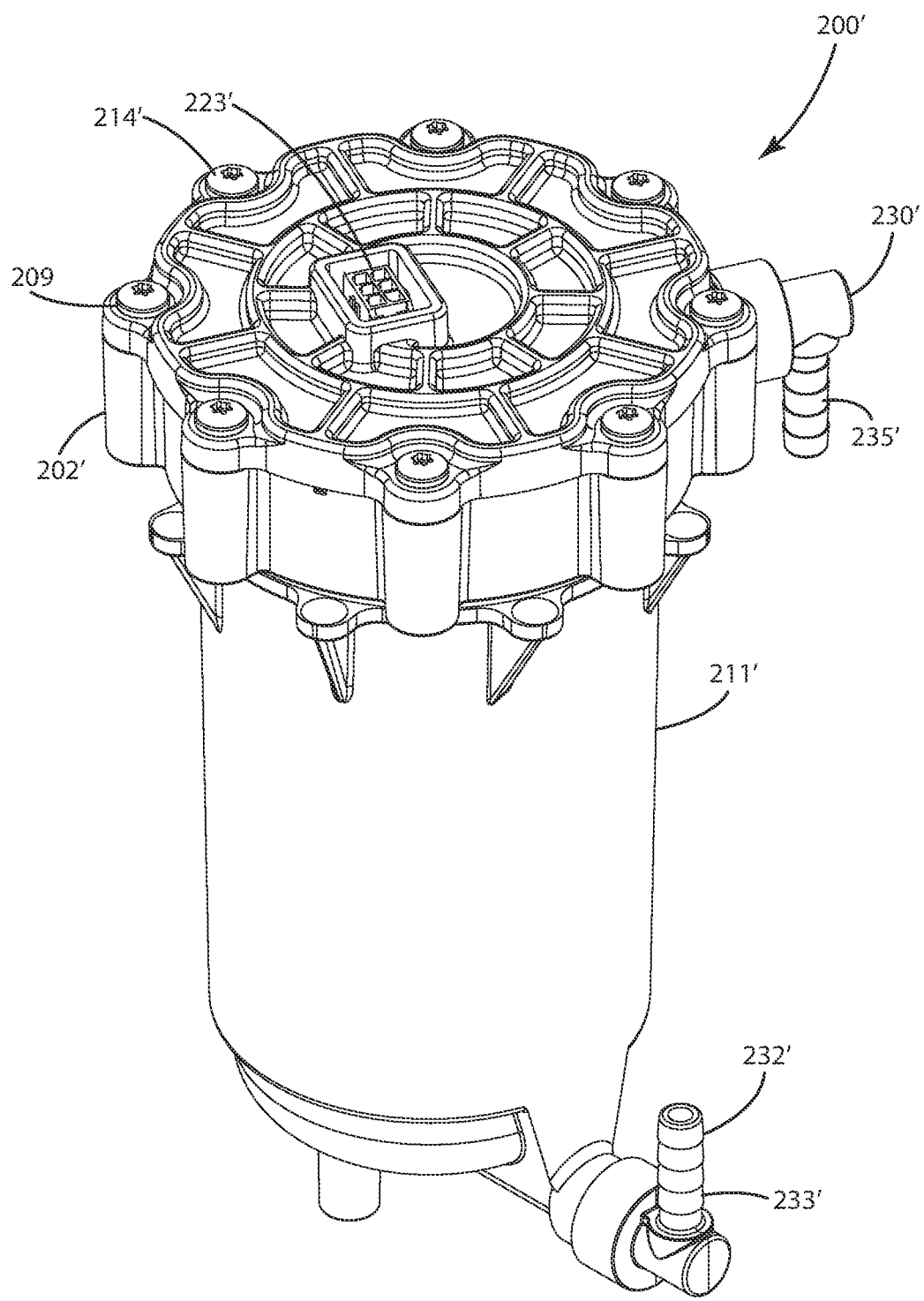
FIG. 57 shows a perspective view of a UV reactor in accordance with one embodiment.
Figure 58:
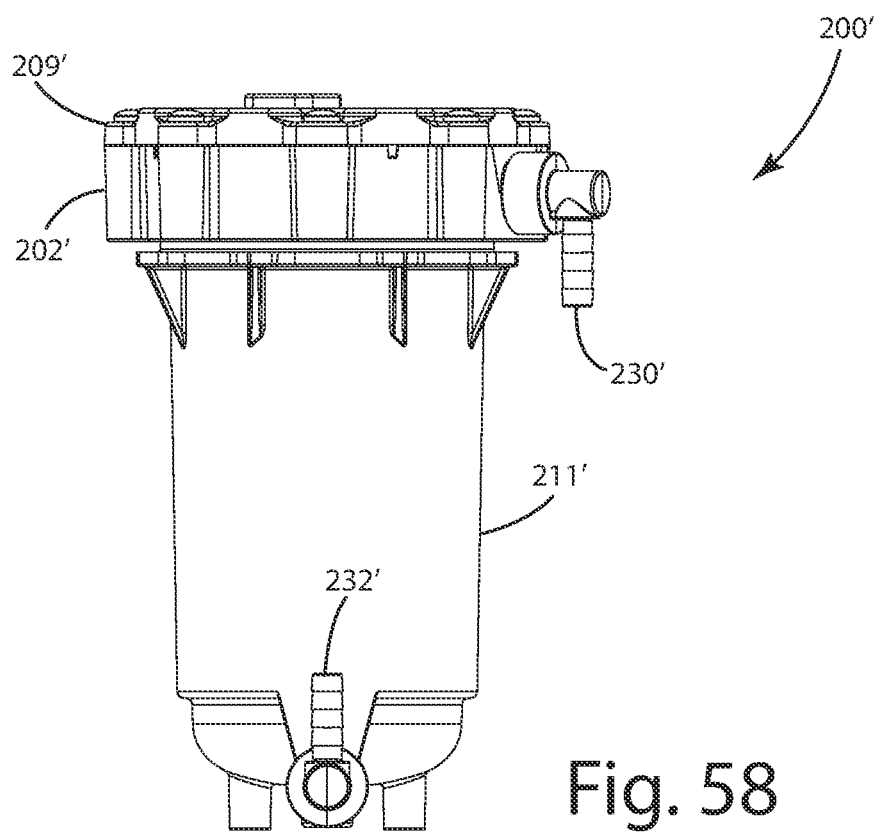
FIG. 58 shows a side view of the UV reactor in FIG. 57.
Figure 59:
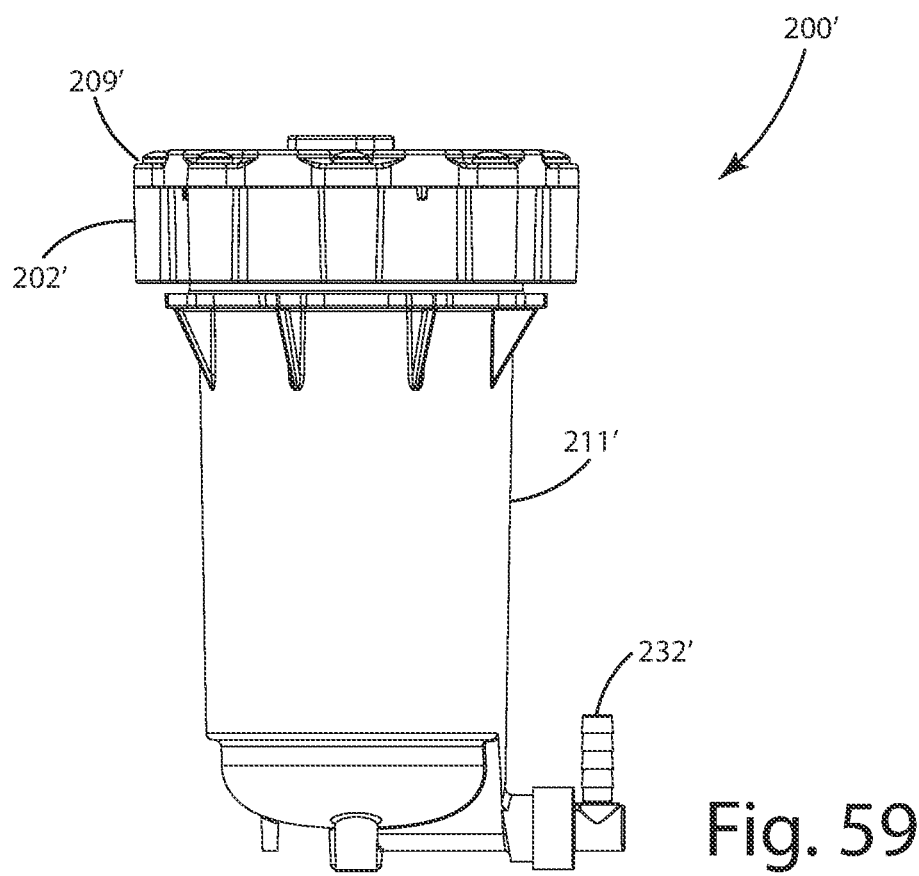
FIG. 59 shows a side view of the UV reactor in FIG. 57.
Figure 60:
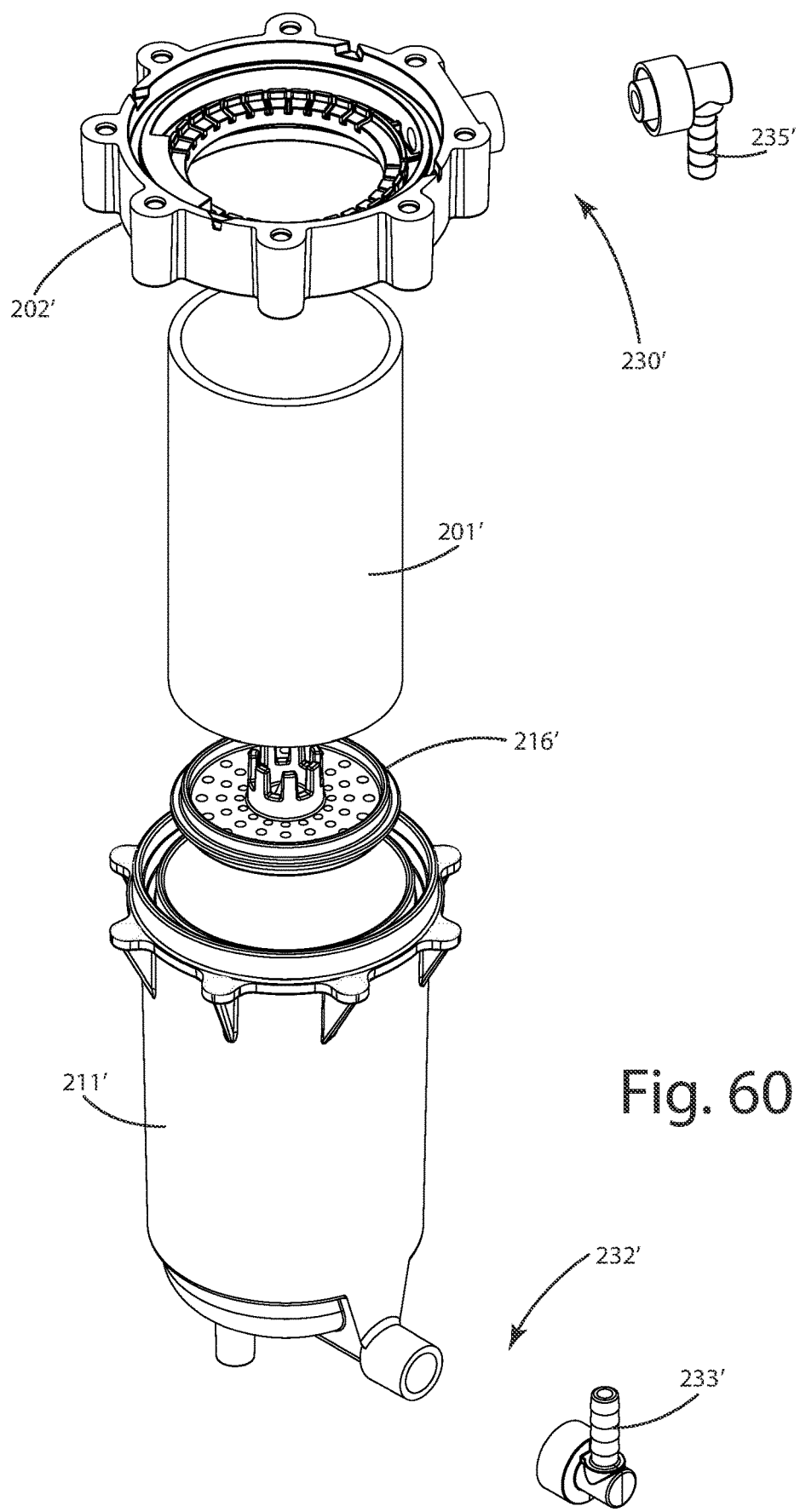
FIG. 60 shows an exploded view of the UV reactor in FIG. 57.
Figure 61:
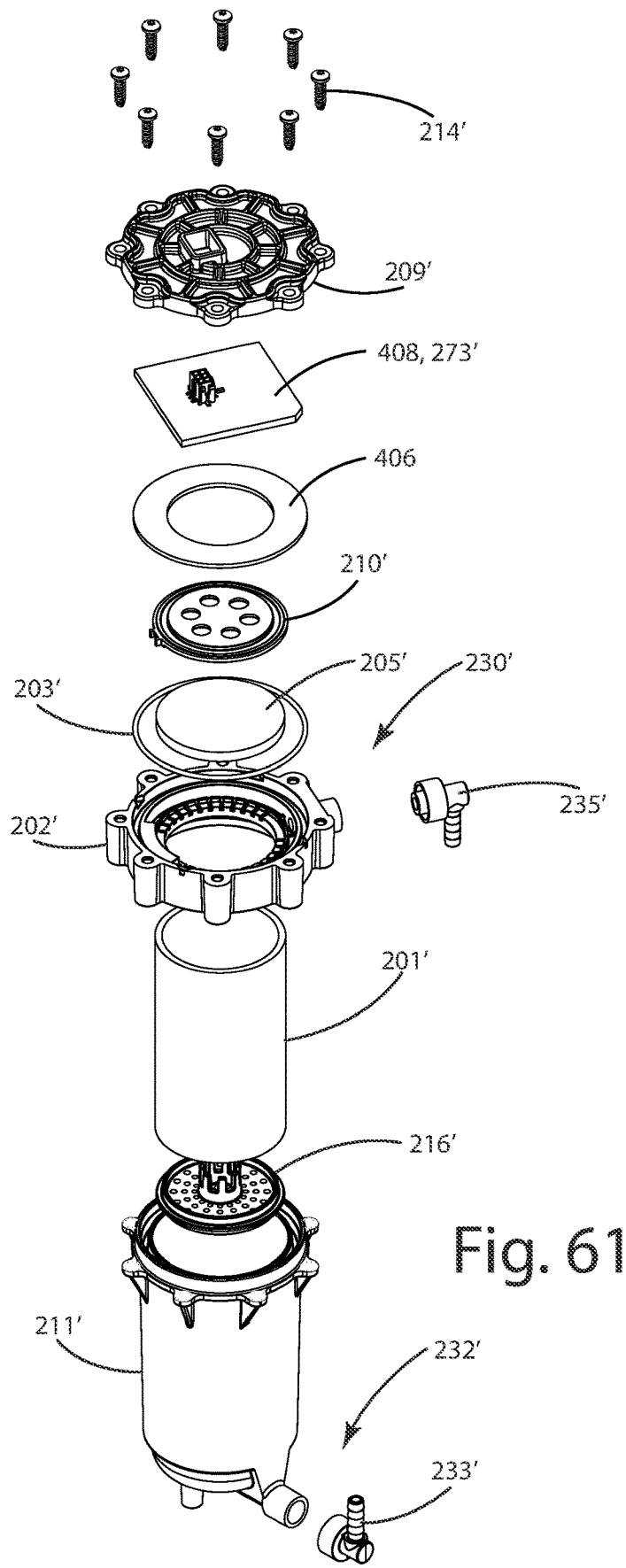
FIG. 61 shows an exploded view of the UV reactor in FIG. 57.
Figure 62:
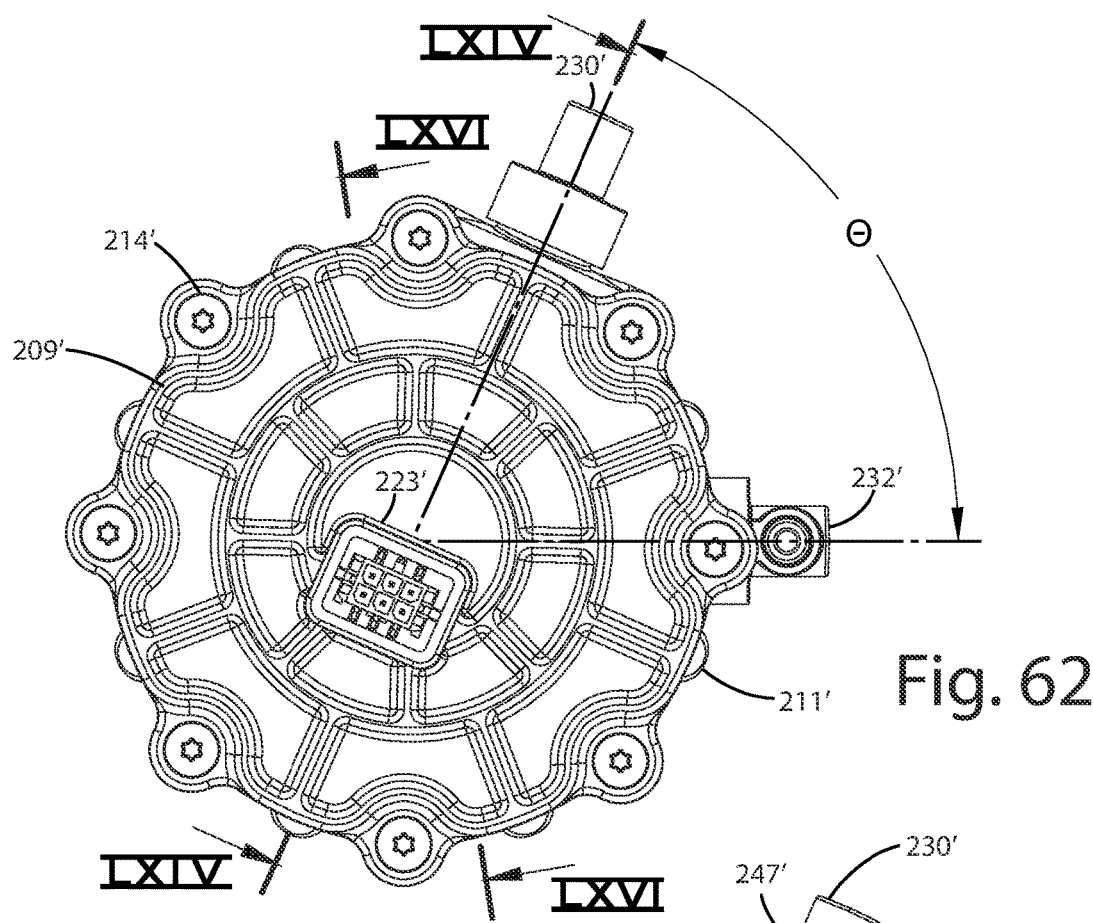
FIG. 62 shows a top view of the UV reactor in FIG. 57.

A water treatment system 100 in accordance with one embodiment of the present disclosure is shown in FIGS. 54-56 and generally designated 100. The water treatment system 100 in the illustrated embodiment includes a treatment assembly 130 and a base assembly 110. The water treatment system 100 may include a removable cover 120 configured to interface with the base assembly 110 to conceal one or more or all aspects of the treatment assembly 130. In one embodiment, the removable cover 120 may conceal the treatment assembly 130 to provide an aesthetic appeal to the water treatment system 100 for positioning the water treatment system 100 on a countertop or visible during daily use.

The removable cover 120 may provide a separable aesthetic shell structure that enables updates or changes to form, material, and color to the water treatment system 100. For instance, the removable cover 120 in one application may be replaced with another removable cover 120 with one or more different aspects related to form, material, or color, or a combination thereof.

In one embodiment, the water treatment system 100 may include UV disinfection capabilities. The water treatment system 100 may include a UV disinfection assembly or UV reactor 200, 200', described herein, that provides such UV disinfection capabilities. The UV reactor 200, 200', in one embodiment, may include a long life/permanent LED reactor assembly that requires substantially no routine maintenance or consumable lamp replacement, and is housed in a permanently installed position within the base assembly 110.

The treatment assembly 130 in the illustrated embodiments of FIGS. 54-56 may be removable from the base assembly 110 in a manner that facilitates storage or placement of the water treatment system 100 for operation in a space that limits access to one or more sides or portions of the water treatment system 100, such as an upper portion 102, a rear portion 103, a side portion 104, or a base portion 105, or a combination thereof. As an example, a space between the upper portion 102 and another object such as an upper cabinet, may be sufficiently small such that there is limited access to the upper portion 102 or limited vertical displacement of one or more components of the water treatment system 100 (e.g., the treatment assembly 130). In one embodiment, the water treatment system 100 may be considered to incorporate a 'flat' aspect ratio that preserves usable work space in on-counter installations and substantially minimizes storage space intrusion in below counter placements.

In the illustrated embodiment, as described in further detail herein, the treatment assembly 130 may pivot or tilt relative to a lower portion or the base portion 105 of the base assembly 110 such that an upper part of the treatment assembly 130 separates from the base assembly 110 while a lower part of the treatment assembly 130 maintains contact with the base assembly 110. In other words, the accessible filtration tank or treatment assembly 130 can disengage from the base assembly 110, which may be permanently installed over or under a countertop or sink. In under counter installations, the treatment assembly 130 may disengage from the base assembly 110 to facilitate extraction of a consumable filter from the treatment assembly 130 without disturbance of plumbing that connects the base assembly 110 to a water source and a treated water outlet in fluid communication with a point-of-use faucet outlet. In one embodiment, the treatment assembly 130 or tank assembly may disengage from a locked in position (in which the treatment assembly 130 is nested into the base assembly 110 or frame assembly) such that the treatment assembly 130 is pivoted relative to the base assembly 110. In a pivoted position, the treatment assembly 130 may be configured to rest securely in a tipped out arrangement, also described as a secure 'rest' position, to facilitate management of a hand placement and to satisfy lift parameters for lifting and carrying the treatment assembly 130 to a sink for opening and filter replacement activities. In other words, the treatment assembly 130 may pivot from an engaged position with the base assembly 110 to a pivoted position at which the treatment assembly remains substantially stable. The treatment assembly 130 may be prevented from further pivoting at the pivoted position such that the treatment assembly 130 does not simply fall out, or loosely disengage, from the base assembly 110. An example of this construction is described in further detail in U.S. Appl. No. 62/839,145, entitled WATER TREATMENT SYSTEM, filed Apr. 26, 2019, to Lautzenheiser et al. and U.S. application Ser. No. 16/857,253, entitled WATER TREATMENT SYSTEM, filed Apr. 24, 2020, to Lautzenheiser et al.—the disclosures of which are hereby incorporated by reference in their entirety.

It is to be understood that the present disclosure is not limited to the tilt configuration for removal of the treatment assembly 130 from the base assembly 110, and that the treatment assembly 130 and base assembly 110 may be configured differently for removal of the treatment assembly 130 from the base assembly 110.

In one embodiment, the removable cover 120 may engage and disengage from the base assembly 110 in a direction substantially parallel with a surface upon which the base assembly 110 is disposed. This way, the removable cover 120 may facilitate access to the treatment assembly 130 while the water treatment system 100 is positioned in a space constrained position as described herein, which may restrict access to the water treatment system 100 along one or more sides or portions thereof.

The water treatment system 100 may be operable to receive, via a water inlet tube 112, untreated water from a source, such as a cold water service line configured to supply water under pressure. The water treatment system 100 may also be operable to treat the untreated water received from the source and deliver treated water to a water outlet tube 114, which may be coupled to a faucet to deliver the treated water to a point-of-use. In one embodiment, the water connections for inlet and outlet piping or tubes are housed or provided in a space under the unit that is accessible to an installer. The connectors may provide rotation capabilities to align system parts during installation.

In one embodiment, the treatment assembly 130 may include a closure assembly 132 or lift off tank cover that enables tool-less access to a treatment vessel 134 (also described as a pressure vessel or removable tank) and that exposes surfaces of the treatment vessel 134 for cleaning (e.g., enabling access for simple cleaning methods).

The treatment assembly 130 may include a water inlet operable to receive water from the water inlet tube 112 via a base assembly inlet passage. The water inlet of the treatment assembly 130 may include a one-way valve or check valve coupled thereto (such as being disposed in line with the water inlet of the treatment vessel 134) to substantially prevent leakage of resident water in the treatment assembly 130 during transport to a maintenance location (e.g., often a water collecting vessel or more commonly the kitchen sink).

The closure assembly 132 of the treatment assembly 130 may include a handle assembly 136 operable to secure the treatment assembly 130 into a pocket provided by the base assembly 110. Operation of the handle assembly 136 from a disengaged position to an engaged position may form a water tight connection between the base assembly 110 and the treatment assembly 130 so that they resist the tendency of the water connections. For instance, the treatment assembly 130 and the base assembly 110 may engage in response to operation of the handle assembly 136 and engage in a position such that, under pressure as a structural system, both top and bottom of the treatment assembly 130 are prevented from expanding and the inlets and outlets are prevented from leaking.

In one embodiment, the handle assembly 136 may be operable to move to an engaged position 262 at which the handle assembly 136 is rotated or folded flat relative to an upper surface of the treatment assembly 130. The treatment assembly 130 and the base assembly 110 may be constructed such that the handle assembly 136 may be disposed in the engagement position (e.g., disposed flat) only when orientation is correct and a water tight connection can be made between the treatment assembly 130 and the base assembly 110.

The treatment assembly 130 in the illustrated embodiment includes the closure assembly 132 operable to seal an opening 138 of a vessel 134. The vessel 134 may be a walled structure, sized and shaped to receive a preliminary filter 150 (also described as a pre-stage filter) and a filter assembly 170. The vessel 134, as mentioned previously, may include an opening 138 sufficiently sized to allow replacement of the pre-stage filter (e.g., the preliminary filter 150) or the filter assembly 170, or both. The opening 138 may also be sufficiently sized to enable cleaning of an interior space of the vessel 134 with conventional cleaning methods.

In the illustrated embodiment, a preliminary filter of the treatment assembly 130, also described as a pre-stage filter, may provide filtration for particulates disposed in the untreated water received via a treatment assembly inlet. Water flowing through the preliminary filter may be communicated to a downstream filter, such as a filter assembly, which may operate to further treat water that has passed through the preliminary filter. In one embodiment, the preliminary filter may be configured to provide filtration for particulates that, if not removed upstream of the filter assembly, might significantly reduce the usable life of the filter assembly. For instance, the filter assembly may be constructed for filtration of particulates considered to be fine or small for a target flow rate, and the preliminary filter may be constructed for filtration of particulates considered larger (e.g., 30-500 microns) at the target flow rate. Without the preliminary filter, such larger particles might clog or reduce the effective filtration of the filter assembly and its effective life.

The filtration media of the filter assembly may include a carbon block filter operable to adsorb or filter (or both) particulates and contaminants included in the water so that water discharged from the filtration media is considered filtered and ready for downstream disinfection by the UV reactor 200.

The base assembly 110 in accordance with one embodiment includes the upper portion 102, the rear portion 103, the side portion 104, and the base portion 105, as described herein. The base assembly 110 is operable to removably couple to the treatment assembly 130, such as by facilitating formation of a watertight seal between a water supply connector and a treatment assembly coupling and between a treatment assembly outlet and a treatment assembly connector of the base assembly 110. In one embodiment, the base assembly 110 may include a main body that provides a demountable structure to hold and connect the treatment assembly 130.

The base assembly 110 in the illustrated embodiment includes a cover 310 that can be removed from a frame assembly 313 of the base assembly 110 to expose internal components 312 of the base assembly 110, including, for example a sensor unit 316 (e.g., a flow sensor) and a control system 318. The frame assembly 313 may provide the structural core of the water treatment system 100, providing a platform for positioning a set of assemblies, which may be modularized, and which may facilitate one or more aspects of treating water for consumption. This configuration may enable continued evolution of the water treatment system 100 (e.g., changes to components of the water treatment system such as the display or control unit) while keeping substantially the same form factor. Accordingly, the water treatment system 100 can be updated to remain current into the future.

The base assembly 110 may include a display unit 314 having a display 315, which can provide visual feedback to a user regarding operation of the water treatment system 100. In the illustrated embodiment, the cover 310 conceals the display 315 as well as the display unit 314. Alternatively, the display 315 and the cover 310 may be constructed such that the display 315 is partially or completely concealed by the cover 310.

A lens 311 may be optically coupled between the display 315 and an external area of the water treatment system 100 to enable optical communication with respect to the display 315 and the external area. For instance, the lens 311 or optical component may be optically translucent or transparent to facilitate providing visual cues or information to the user from the display 315. The cover 310 in the illustrated embodiment may provide an aesthetic appearance to the water treatment system, which may vary from application to application. The location and shape of the optical component may be varied depending on the application.

The base assembly 110 may include a pedestal or base portion 105 operable to stabilize the base assembly 110 on a horizontal surface, such as a countertop or within a cabinet. The base portion 105 may be constructed with a perimeter edge that contacts the horizontal surface while supporting the frame assembly 313 in a spaced relationship relative to the horizontal surface, such that, to the extent water or other elements become present on the horizontal surface, the frame assembly 313 may remain spaced above such water or other elements. The base portion 105 may include one or more access points operable to receive the water inlet tube 112 and water outlet tube 114 for connection respectively to the water supply inlet and the treated water outlet.

The control system 318 in the illustrated embodiment may include circuitry configured to direct operation of the water treatment system 100, including directing the display unit 314 to provide visual feedback to a user, and including receiving sensor information obtained from the sensor unit 316. As described herein, the control system 318 may also be operable to direct operation of the UV reactor 200 to disinfect the water discharged from the treatment assembly 130 and to discharge the treated water to the treated water outlet 364. Water discharged from the UV reactor 200, 200' may flow through the sensor unit 316 to the treated water outlet 364, which is in fluid communication with the water outlet tube 114.

In the illustrated embodiment, internal components of the base assembly 110, such as wet and electrical unit assemblies, mounted on the frame assembly 313 may be covered by a rear cover assembly (e.g., the cover 310) that may provide aesthetic look and feel, potentially protect the internal components, and accommodate light conducting structures that provide a system health indication as an extension of the display unit 314.

The base portion 105 (e.g., a base pedestal part) maybe secured to the unit body assembly to provide aesthetic, plumbing management, and stabilizing, structural, or protective accommodations to assist the desired positioning means.

The internal components of the base assembly 110 may include, as discussed herein, a display unit 314, a control system 318, a sensor unit 316, and a UV reactor 200, 200'. In the illustrated embodiment, the UV reactor 200, 200' includes a water inlet 232, 232' that is provided in fluid communication with the UV reactor fluid passageway 360 to receive water discharged from the treatment assembly 130. The UV reactor 200, 200' may be operable to supply UV light energy to water received via the water inlet 232, 232' in order to disinfect the water. Disinfected water may be discharged or output via the UV reactor outlet 230, 230', which is in fluid communication with a water inlet 385 of the sensor unit 316.

In the illustrated embodiment, the components include an RFID communicator or wireless communication circuitry 390, which may be capable of communicating wirelessly with one or more components external to the base assembly 110. As an example, the wireless communication circuitry 390 may communicate with the RFID component (e.g., an RFID tag) provided in the filter assembly.

The internal components of the water treatment system 100 in one embodiment may include an electrical and control system that is arranged around the water path systems of the frame assembly 313. The electrical and control system may include the display unit 314 with the unit being secured to the frame assembly 313 proximate to a front side of the water treatment system 100, making information features of the display unit 314 visible to a user in the installed placement of the water treatment system 100. In the illustrated embodiment, the display unit may be connected by a detachable tether to the control system 318.

In one embodiment, the wireless communication circuitry 390 may include an RFID antenna that is attached to the frame assembly 313 proximate to the treatment assembly 130 in an installed position, and is connected to the control system 318 (or main electronics) by a detachable tether.

The electrical and control system is not limited to the system described in conjunction with the illustrated embodiment of the water treatment system 100; it is to be understood that the electrical control system may be updated, replaced, or substituted for other technical systems as determined, independent of other system components.

The water path components (e.g., the sensor unit 316 and UV reactor 200, 200') of the base assembly 110 may be arranged and secured to the frame assembly 313.

In the illustrated embodiment, the water path is accepted from the treatment assembly 130 by a top component (e.g., a treatment assembly connector) affixed to the frame assembly 313, placed to align and structurally support the mechanical forces to connect and seal the passage under flow and pressure conditions. The treatment assembly connector 362 may be fluidly coupled to the UV reactor fluid pathway 360 to deliver water to the UV reactor 200 via the UV reactor inlet 232, which is shown being provided near an upper portion of the UV reactor 200 and fluidly conveys water to a lower portion of the UV reactor 200. The UV reactor 200 may be operable to accept power and control from the control system 318 to operate the disinfection process. The UV reactor 200 may discharge disinfected water via a UV reactor outlet 230 to the sensor unit 316 for delivery to the point-of-use.

The sensor unit 316 in the illustrated embodiments is operable to receive water discharged from the UV reactor 200, 200' via a water inlet 385 and to discharge the water to outlet, which serves as the outlet for the water treatment system 100. In other words, the sensor unit 316 is integrated with the exit connection of the water treatment system 100 in the illustrated embodiment and forms the end of the water path. Alternatively, the sensor unit 316 may discharge the water to another fluid pathway component so that the water is ultimately discharged from the water treatment system to an outlet in fluid communication with the point-of-use.

The sensor unit 316 may monitor and measure water flow. Additionally, or alternatively, the sensor unit 316 may measure water temperature.

The control system 318 in one embodiment may be directly plugged into or connected to the UV reactor 200, 200' after connections to the control system 318 have been established between the wireless communication circuitry 390, the display unit 314, and any sensors (e.g., the sensor unit 316). The connection to the UV reactor 200, 200' may be formed via a connection panel on the underside of the control system 318. The connection panel may also provide connectors for the wireless communication circuitry 390, the display unit 314, and any sensors. The connection panel being disposed on the underside of the control system 318 may facilitate hiding the connections from casual view to improve the aesthetic of the assembly overall and to substantially shield the electronic connections from any casual water splashing.

The control system 318 may be configured to accept power by connection though the shell or cover 310 from a separate power supply connection, which may also be configured to condition and distribute power to other systems of the water treatment system 100 according to design constraints.

The control system 318 in the illustrated embodiment may be configured to accept sensor and system operation inputs and to generate data (e.g., a data stream) for use by the user and/or other components of the system. The control system 318 may be operable to wirelessly communicate with an external device, such as a smartphone. Data generated by the control system 318 may be made available for user monitoring, service diagnostics, a digital smartphone app, or various programmed responses of system operating components, or any combination thereof.

In one embodiment, wireless communication capabilities to and from remote interests or devices may be provided by the circuitry or the control board of the control system 318.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. An ultraviolet (UV) reactor for treating water, the UV reactor comprising:
   a water inlet operable to receive water;
   a water outlet for discharging water from the UV reactor;
   a water treatment chamber having an interior side surface defined between first and second end surfaces, the water treatment chamber having a longitudinal axis extending from the first end surface to the second end surface, the water treatment chamber having a chamber inlet in fluid communication with the water inlet to receive water to be decontaminated, the water treatment chamber having a chamber outlet in fluid communication with the water outlet;
   a laminar flow element disposed within the water treatment chamber to define the first end surface, the laminar flow element operable to condition water downstream of the laminar flow element to flow in a substantially laminar manner;

the laminar flow element including a plurality of flow paths, a first flow path of the plurality of flow paths being larger than a second flow path of the plurality of flow paths and closer to the interior side surface of the water treatment chamber than the second flow path; and a flow director in fluid communication with the water inlet and upstream of the plurality of flow paths of the laminar flow element, the flow director being directly downstream of the water inlet and operable to redirect water laterally relative to the longitudinal axis of the water treatment chamber.

2. The UV reactor of claim 1 wherein:
the laminar flow element is a plate disposed with a perimeter of the plate in proximity to the interior side surface of the water treatment chamber;
the plate intersects the longitudinal axis of the water treatment chamber;
the first flow path is farther from the longitudinal axis than the second flow path; and
the plate includes a keepout region that intersects the longitudinal axis and in which the plurality of flow paths are absent.

3. The UV reactor of claim 2 wherein the flow director is upstream of the plate, wherein the longitudinal axis intersects the flow director, and wherein the flow director is positioned to direct water away from the keepout region.

4. The UV reactor of claim 3 wherein the flow director is operable to direct water radially relative to the longitudinal axis.

5. The UV reactor of claim 2 wherein the plurality of the flow paths are arranged in first and second concentric paths, wherein the first concentric path includes a first plurality of the flow paths, wherein the second concentric path includes a second plurality of the flow paths, wherein the first plurality of flow paths is evenly spaced along the first concentric path about the longitudinal axis, and wherein the second plurality of flow paths is evenly spaced along the second concentric path about the longitudinal axis.

6. The UV reactor of claim 1 wherein the plurality of flow paths define the chamber inlet, wherein the laminar flow element is operable as a flow restrictor to reduce a flow rate of water through the water treatment chamber.

7. The UV reactor of claim 3 wherein the flow director includes a deflector operable to change a direction of a flow of water and to generate turbulence in water.

8. The UV reactor of claim 7 wherein the flow director includes a plurality of vents arranged annularly with respect to the longitudinal axis and in fluid communication with the deflector.

9. A flow restrictor for an ultraviolet (UV) reactor operable to treat water, the UV reactor including a water treatment chamber with a longitudinal axis extending from a first end to a second end, the water treatment chamber including a chamber inlet in fluid communication with a water inlet and a chamber outlet in fluid communication with a water outlet, the flow restrictor comprising:

a plate having a perimeter edge and a central axis, the plate including a downstream side and an upstream side relative to a flow direction of water;

the plate including a plurality of openings that define a plurality of flow paths for water to pass through the plate, a first opening of the plurality of openings being farther from the central axis than a second opening of the plurality of openings, the first opening being larger than the second opening; and a flow director provided in a flow path of water received by the water inlet and being directly downstream of the water inlet, the flow director in fluid communication with the plurality of openings of the plate, the flow director being operable to direct water laterally relative to the central axis of the plate.

10. The flow restrictor of claim 9 wherein the plate is operable to condition water downstream of the plate to flow in a substantially laminar manner.

11. The flow restrictor of claim 9 wherein the flow director is upstream of the plurality of openings of the plate.

12. The flow restrictor of claim 9 wherein the flow director intersects the central axis of the plate.

13. The flow restrictor of claim 12 wherein the flow director is operable to direct water radially relative to the central axis of the plate.

14. The flow restrictor of claim 9 wherein the plurality of the openings are arranged in first and second concentric paths, wherein the first concentric path includes a first plurality of openings, wherein the second concentric path includes a second plurality of openings, wherein the first plurality of openings is evenly spaced along the first concentric path about the central axis, and wherein the second plurality of openings is evenly spaced along the second concentric path about the central axis.

15. The flow restrictor of claim 9 wherein the plurality of openings define a chamber inlet of the water treatment chamber.

16. The flow restrictor of claim 9 wherein the plate is operable as a flow restrictor to reduce a flow rate of water through the flow restrictor.

17. The flow restrictor of claim 9 wherein a perimeter of the plate includes a flange that defines the perimeter edge of the plate.

18. The flow restrictor of claim 9 wherein the plurality of openings are absent from the plate in a keep out region, and wherein the keep out region intersects the central axis of the plate.

19. The flow restrictor of claim 18 wherein the flow director is positioned to direct water away from the keep out region.

20. The flow restrictor of claim 9 wherein the flow director includes a deflector operable to change a direction of a flow of water and to generate turbulence in water.

* * * * *